US009909065B2

(12) United States Patent
Ooki et al.

(10) Patent No.: US 9,909,065 B2
(45) Date of Patent: Mar. 6, 2018

(54) LIQUID CRYSTAL ALIGNING AGENTS FOR FORMING PHOTO-ALIGNING LIQUID CRYSTAL ALIGNMENT LAYERS, LIQUID CRYSTAL ALIGNMENT LAYERS AND LIQUID CRYSTAL DISPLAY DEVICES USING THE SAME

(71) Applicants: JNC CORPORATION, Tokyo (JP); JNC PETROCHEMICAL CORPORATION, Tokyo (JP)

(72) Inventors: Youichiro Ooki, Chiba (JP); Yuko Katano, Chiba (JP); Tomoyuki Matsuda, Chiba (JP); Keisuke Izawa, Chiba (JP); Rika Hisada, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/395,578

(22) PCT Filed: Apr. 10, 2013

(86) PCT No.: PCT/JP2013/060856

§ 371 (c)(1),
(2) Date: Oct. 20, 2014

(87) PCT Pub. No.: WO2013/161569

PCT Pub. Date: Oct. 31, 2013

(65) Prior Publication Data

US 2015/0119522 A1 Apr. 30, 2015

(30) Foreign Application Priority Data

Apr. 24, 2012 (JP) ................................ 2012-099144
Mar. 28, 2013 (JP) ................................ 2013-069499

(51) Int. Cl.

| | |
|---|---|
| ***C09D 179/08*** | (2006.01) |
| ***C09K 19/56*** | (2006.01) |
| ***G02F 1/1337*** | (2006.01) |
| ***C08G 73/10*** | (2006.01) |

(52) U.S. Cl.

CPC ............ *C09K 19/56* (2013.01); *C08G 73/106* (2013.01); *C08G 73/1075* (2013.01); *C08G 73/1096* (2013.01); *C09D 179/08* (2013.01); *G02F 1/133723* (2013.01); *G02F 1/133788* (2013.01); *G02F 1/133719* (2013.01)

(58) Field of Classification Search

CPC .............. C08G 73/106; C08G 73/1075; C08G 73/1096; C09D 179/08; C09K 19/56; G02F 1/133723; G02F 1/133788; G02F 1/133719

See application file for complete search history.

(56) References Cited

U.S. PATENT DOCUMENTS

| | | | | |
|---|---|---|---|---|
| 4,778,872 | A * | 10/1988 | Sasaki ................ | C08G 73/1007 525/436 |
| 6,063,829 | A | 5/2000 | Endou et al. | |
| 6,224,788 | B1 | 5/2001 | Ogawa et al. | |
| 2002/0080127 | A1 | 6/2002 | Park et al. | |
| 2010/0297367 | A1 | 11/2010 | Hirai et al. | |

FOREIGN PATENT DOCUMENTS

| | | |
|---|---|---|
| JP | 9-297313 | 11/1997 |
| JP | 10-251646 | 9/1998 |
| JP | 2005-275364 | 10/2005 |
| JP | 2007-248637 | 9/2007 |
| JP | 2009-058928 | 3/2009 |
| JP | 2009-69493 | 4/2009 |
| JP | 2009-175684 | 8/2009 |
| JP | 2010-49230 | 3/2010 |
| JP | 2010-156953 | 7/2010 |
| JP | 2010197999 A * | 9/2010 |
| JP | 2011-8218 | 1/2011 |
| JP | 2011-53693 | 3/2011 |
| JP | 2011-85901 | 4/2011 |
| JP | 2011-207786 | 10/2011 |

OTHER PUBLICATIONS

Machine translation of JP2010049230 downloaded Mar. 7, 2016.*
International Search Report dated Jul. 9, 2013 in International (PCT) Application No. PCT/JP2013/060856.
Liquid Crystal, vol. 3, No. 4, 1999, pp. 262-271.

* cited by examiner

*Primary Examiner* — Irina S Zemel
*Assistant Examiner* — Jeffrey S Lenihan
(74) *Attorney, Agent, or Firm* — Wenderoth, Lind & Ponack, L.L.P.

(57) ABSTRACT

A photo-aligning liquid crystal aligning agent for forming a liquid crystal alignment layer capable of materializing a liquid crystal display device, which has a high transmittance while maintaining a liquid crystal aligning property, a voltage holding ratio and the like, and in which flickering is inhibited from being caused after operating for a long time. The photo-aligning liquid crystal aligning agent contains [A] polyamic acid or a derivative thereof which is synthesized by reacting tetracarboxylic acid dianhydride and diamine, and [B] polyamic acid or a derivative thereof obtained by reacting tetracarboxylic acid dianhydride having no photoreactive structure and diamine having no photoreactive structure.

20 Claims, No Drawings

LIQUID CRYSTAL ALIGNING AGENTS FOR FORMING PHOTO-ALIGNING LIQUID CRYSTAL ALIGNMENT LAYERS, LIQUID CRYSTAL ALIGNMENT LAYERS AND LIQUID CRYSTAL DISPLAY DEVICES USING THE SAME

BACKGROUND OF THE INVENTION

The present invention relates to a photo-aligning liquid crystal aligning agent used for a photo-aligning method, a photo-alignment layer and a liquid crystal display device which are prepared by using the same.

RELATED ART

Display devices prepared by using nematic liquid crystals are mainly used for liquid crystal display devices which are produced in an industrial scale at present and usually distributed, including various display devices such as monitors for personal computers, liquid crystal televisions, view finders of video cameras, projection type displays and the like, optoelectronics-related devices such as optical printer heads, optical Fourier transformer, light valves and the like. A TN (twisted nematic) mode and an STN (super twisted nematic) mode are known well as a display mode of a nematic liquid crystal display device. In recent years, TN type liquid crystal display devices prepared by using an optical compensation film, an MVA (multi-domain vertical alignment) mode in which vertical alignment and a technique of a projection structure are used in combination, an IPS (in-plane switching) mode of a lateral electric field system, an FFS (fringe field switching) mode and the like are proposed in order to improve a narrow viewing angle which is one of the problems of the above modes, and they are put into practical use.

The development of the technologies of liquid crystal display devices have been achieved not only merely by improving the above drive methods and device structures but also by improving constitutional members used for the devices. Among the constitutional members used for the devices, particularly a liquid crystal alignment layer is one of important materials related to the display quality, and as liquid crystal display devices are provided with a higher quality, it has come to be important to enhance the performances of the alignment layers.

Liquid crystal alignment layers are formed by liquid crystal aligning agents. Liquid crystal aligning agents which are mainly used at present are solutions (vanishes) prepared by dissolving polyamic acid or soluble polyimide in organic solvents. The above solutions are applied on a substrate, and then layers are formed therefrom by means such as heating and the like to form polyimide base liquid crystal alignment layers.

A rubbing method which is simple and makes it possible to carry out high speed treatment in a large area is widely used as an alignment treating method in an industrial scale. The rubbing method is treatment in which a cloth made of fibers comprising nylons, rayons, polyesters and the like is used to rub the surface of a liquid crystal alignment layer in a single direction, and this treatment makes it possible to obtain uniformly aligned liquid crystal molecules. However, problems such as dusts, static electricity and the like which are involved in the rubbing method are pointed out, and alignment treating methods in place of the rubbing method are actively tried to be developed.

A photo-alignment treating method in which light is irradiated to carry out aligning treatment is paid attentions as an alignment treating method in place of the rubbing method. Many aligning mechanisms such as a photodecomposition method, a photoisomerization method, a photodimerization method, a photocrosslinking method and the like are proposed for the photo-alignment treating method (refer to, for example, a non-patent document 1 and patent documents 1 and 2). The photo-alignment treating method is a non-contact photo-alignment treating method having a high uniformity of alignment as compared with the rubbing method, and therefore it involves the advantages that the layer is prevented from being scratched and can be reduced in a cause of bringing about inferior display of the liquid crystal display devices by dusts, a static electricity and the like.

Various characteristics are required to liquid crystal alignment layers regardless of alignment treating methods. One of them includes a reduction in flickering. In order to decrease flashing called flickering in a liquid crystal display device, a level of a common electrode potential (hereinafter called Vcom) is usually controlled, and voltages applied to liquid crystal in a positive polarity and a negative polarity are controlled so that they are equivalent. However, when a light of a back light is irradiated on a liquid crystal alignment layer for a long time in a long operation, caused is the problem that a volume resistivity thereof is reduced and that a voltage holding ratio thereof is reduced as well, whereby flickering is brought about is (refer to, for example, a patent document 3).

The present inventors have continued to investigate liquid crystal alignment layers having a photoreactive group which brings about photoisomerization or photodimerization in a polyamic acid structure (refer to, for example, patent documents 4 to 6). The above photo-alignment layers have had a large anchoring energy and a good aligning property and have been excellent in electrical characteristics such as a voltage holding ratio and the like. However, the problem that the transmittance is lowered since the above photoreactive group absorbs light has been involved therein, and the room of improving it has been left. Also, the foregoing problem that flickering is brought about has not sufficiently been investigated and evaluated.

PRIOR ARTS

Patent Documents

Patent document 1: JP-A 1997-297313
Patent document 2: JP-A 1998-251646
Patent document 3: JP-A 2011-053693
Patent document 4: JP-A 2005-275364
Patent document 5: JP-A 2007-248637
Patent document 6: JP-A 2009-069493

Non-Patent Document

Non-patent document 1: Liquid Crystal, vol. 3, No. 4, p. 262, 1999

DISCLOSURE OF THE INVENTION

An object of the present invention is to provide a photo-aligning liquid crystal aligning agent for forming a liquid crystal alignment layer materializing a liquid crystal display device which has a high transmittance while maintaining various characteristics such as a liquid crystal aligning property, a voltage holding ratio and the like and in which flickering is inhibited from being caused after operated for a long time.

The present inventors have found that a liquid crystal display device which can satisfy the required characteristics described above is obtained by using a photo-aligning liquid crystal aligning agent containing at least two polymers of [A] polyamic acid or a derivative thereof having a photoreactive structure which is synthesized by reacting tetracarboxylic acid dianhydride and diamine, wherein at least one of the tetracarboxylic acid dianhydride and the diamine which are raw material monomers is a compound having a photoreactive structure and [B] polyamic acid or a derivative thereof obtained by reacting tetracarboxylic acid dianhydride having no photoreactive structure and diamine having no photoreactive structure, and they have completed the present invention. In the present specification, the [polymer A] is referred to merely as [A], and the [polymer B] is referred to merely as [B].

The present invention comprises the following constitutions.

[1] A photo-aligning liquid crystal aligning agent containing:

[A] polyamic acid or a derivative thereof having a photoreactive structure which is synthesized by reacting tetracarboxylic acid dianhydride and diamine, wherein the tetracarboxylic acid dianhydride and the diamine contain at least one of tetracarboxylic acid dianhydride having a photoreactive structure and diamine having a photoreactive structure which are selected from the group of compounds represented by the following Formulas (I) to (VII) and

[B] polyamic acid or a derivative thereof obtained by reacting tetracarboxylic acid dianhydride having no photoreactive structure and diamine having no photoreactive structure:

$$R^2—C≡C—R^3 \quad (I)$$

$$R^2—C≡C—C≡C—R^3 \quad (II)$$

$$R^2—C≡C—CH=CH—R^3 \quad (III)$$

$$R^2—C≡C—R^4—C≡CH—R^3 \quad (IV)$$

$$R^2—C≡C—R^4—CH=CH—R^3 \quad (V)$$

$$R^2—CH=CH—R^3 \quad (VI)$$

$$R^2—N=N—R^3 \quad (VII)$$

in Formulas (I) to (VII), $R^2$ and $R^3$ each are independently a monovalent organic group having $—NH_2$ or a monovalent organic group having —CO—O—CO—, and $R^4$ is a divalent organic group having an aromatic ring.

[2] The photo-aligning liquid crystal aligning agent as described in the above item [1], wherein in [A], the photoreactive structure is present in a principal chain of the polyamic acid or the derivative thereof.

[3] The photo-aligning liquid crystal aligning agent as described in the above item [1] or [2], wherein in [A], the tetracarboxylic acid dianhydride having a photoreactive structure and the diamine having a photoreactive structure are at least one selected from the group of compounds represented by the following Formulas (I-1), (II-1), (III-1), (IV-1), (IV-2), (V-1), (VI-1) and (VII-1) to (VII-3):

(I-1)

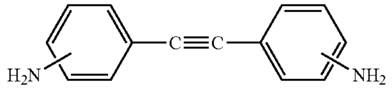

(II-1)

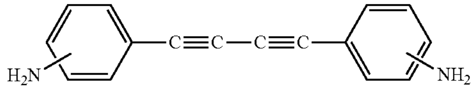

(III-1)

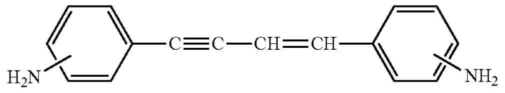

(IV-1)

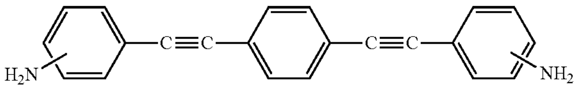

(IV-2)

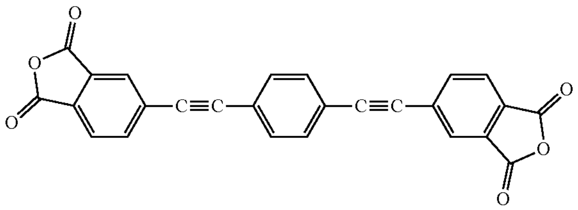

(V-1)

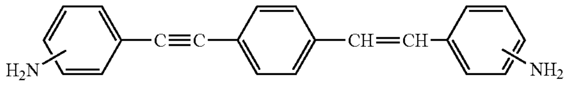

(VI-1)

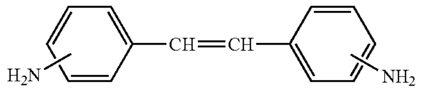

(VII-1)

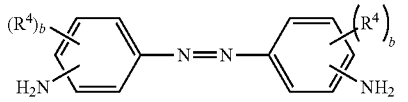

(VII-2)

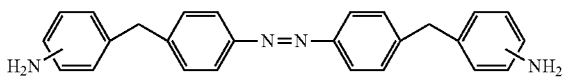

(VIII-3)

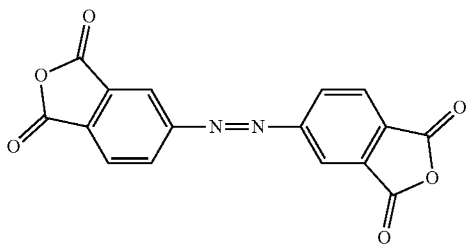

in Formulas (I-1), (II-1), (III-1), (IV-1), (V-1), (VI-1), (VII-1) and (VII-2), groups in which bonding positions are not fixed to any of carbon atoms constituting the rings show that the bonding positions thereof in the rings are optional; in Formula (VII-1), plural $R^4$ each are independently $—CH_3$, $—OCH_3$, $—CF_3$ or $—COOCH_3$; and plural b each are independently an integer of 0 to 2.

[4] The photo-aligning liquid crystal aligning agent as described in the above item [3], wherein in [A], the tetracarboxylic acid dianhydride having a photoreactive structure and the diamine having a photoreactive structure are at least one selected from the group of compounds represented by the following Formulas (II-1-1), (VI-1-1), (VII-1-1) and (VII-3):

(II-1-1)

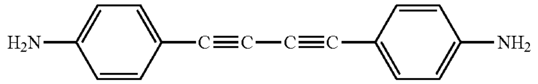

(VI-1-1)

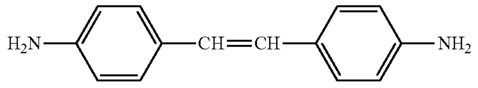

(VII-1-1)

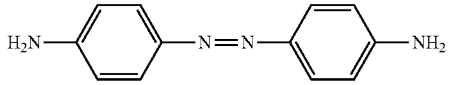

-continued (VII-3)

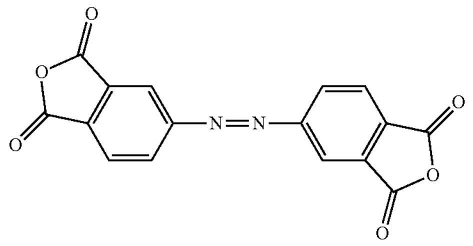

[5] The photo-aligning liquid crystal aligning agent as described in any one of the above items [1] to [4], wherein in [A] and [B], the tetracarboxylic acid dianhydride having no photoreactive structure is at least one selected from the group of compounds represented by the following Formulas (AN-1) to (AN-VII):

(AN-I)

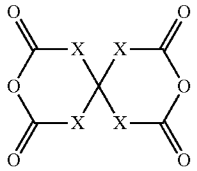

(AN-II)

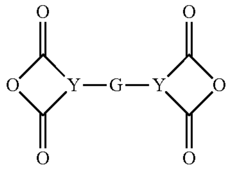

(AN-III)

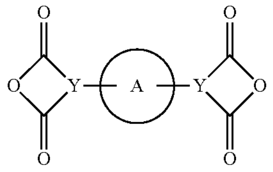

(AN-IV)

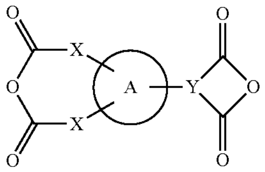

(AN-V)

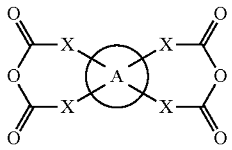

(AN-VI)

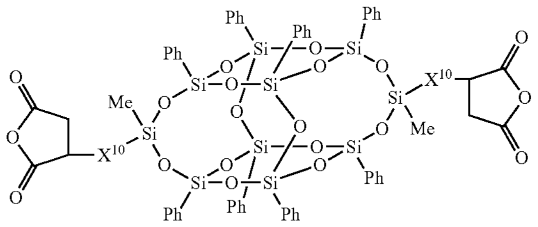

-continued (AN-VII)

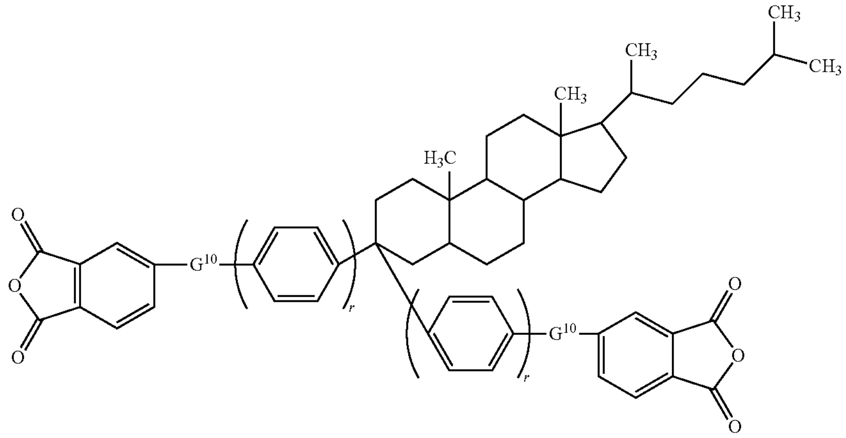

in Formulas (AN-I) (AN-IV) and (AN-V), plural X each are independently a single bond or $—CH_2—$;

in Formula (AN-II), G is a single bond, alkylene having 1 to 20 carbon atoms, —CO—, —O—, —S—, $—SO_2—$, $—C(CH_3)_2—$ or $—C(CF_3)_2—$;

in Formulas (AN-II) to (AN-1V), plural Y each are independently one selected from the group of the following trivalent groups:

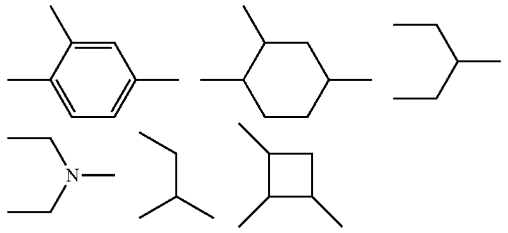

at least one hydrogen of the above groups may be substituted with methyl, ethyl or phenyl;

in Formulas (AN-III) to (AN-V), a ring A is a monocyclic hydrocarbon group having 3 to 10 carbon atoms or a condensed polycyclic hydrocarbon group having 6 to 30 carbon atoms; at least one hydrogen of the above groups may be substituted with methyl, ethyl or phenyl; an atomic bonding coupled with the ring is connected with optional carbon constituting the ring, and two atomic bondings may be connected with the same carbon;

in Formula (AN-VI), $X^{10}$ is alkylene having 2 to 6 carbon atoms; Me represents methyl; and Ph represents phenyl;

in Formula (AN-VII), plural $G^{10}$ each are independently —O—, —COO— or —OCO—; and plural r each are independently 0 or 1.

[6] The photo-aligning liquid crystal aligning agent as described in the above item [5], wherein in [A], the tetracarboxylic acid dianhydride having no photoreactive structure is at least one selected from the group of compounds represented by the following Formulas (AN-2-1), (AN-3-2) and (AN-4-17):

(AN-2-1)

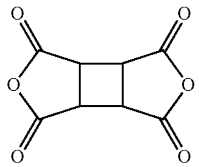

(AN-3-2)

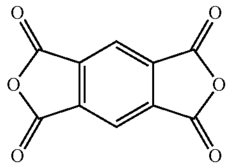

(AN-4-17)

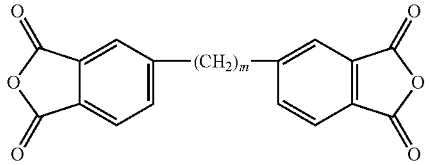

in Formula (AN-4-17), m is an integer of 1 to 12.

[7] The photo-aligning liquid crystal aligning agent as described in any one of the above items [1] to [6], wherein in [A] and [B], the diamine having no photoreactive structure is at least one selected from the group of compounds represented by the following Formulas (DI-1) to (DI-17):

(DI-1)

$H_2N\text{—}(CH_2)_m\text{—}NH_2$ (DI-2)

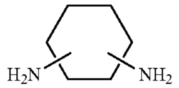

(DI-3)

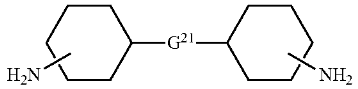

-continued (DI-4)

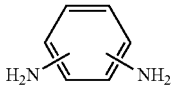

(DI-5)

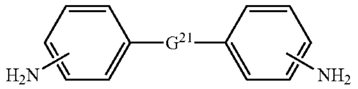

(DI-6)

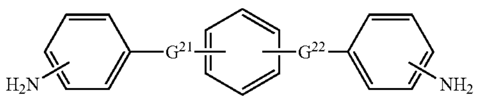

(DI-7)

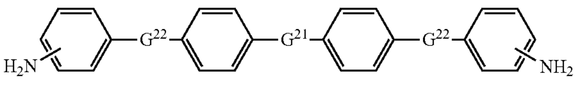

in Formula (DI-1), m is an integer of 1 to 12;

in Formulas (DI-3) and (DI-5) to (DI-7), plural $G^{21}$ each are independently a single bond, —NH—, —O—, —S—, —S—S—, —$SO_2$—, CO—, —CONH—, —NHCO—, —$C(CH_3)_2$—, $(CF_3)_2$, —$C(CH_2)_{m'}$—, —O—$(CH_2)_{m'}$—O—, —$N(CH_3)$—$C(CH_2)_k$—$N(CH_3)$— or —S—$(CH_2)_{m'}$—S—; plural m' each are independently an integer of 1 to 12, and k is an integer of 1 to 5;

in Formulas (DI-6) and (DI-7), plural $G^{22}$ each are independently a single bond, —O—, —S—, CO—, —$C(CH_3)_2$—, —$C(CF_3)_2$— or alkylene having 1 to 10 carbon atoms;

at least one hydrogen of a cyclohexane ring and a benzene ring in Formulas (DI-2) to (DI-7) may be substituted with —F, —$CH_3$, —OH, —$CF_3$, —$CO_2H$—, —$CONH_2$ or benzyl, and in addition thereto, in Formula (DI-4), at least one hydrogen of the benzene ring may be substituted with at least one of groups represented the following Formulas (DI-4-a) to (DI-4-c):

(DI-4-a)

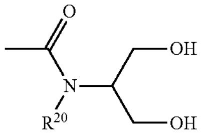

(DI-4-b)

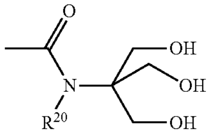

(DI-4-c)

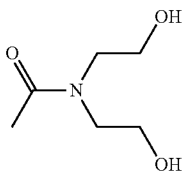

in Formulas (DI-4-a) and (DI-4-b), plural $R^{20}$ each are independently hydrogen or —$CH_3$;

in Formulas (DI-2) to (DI-7), groups in which bonding positions are not fixed to any of carbon atoms constituting the rings show that the bonding positions thereof in the rings are optional; and the bonding position of —$NH_2$ in the cyclohexane ring or the benzene ring is an optional position excluding the bonding position of $G^{21}$ or $G^{22}$;

(DI-8)

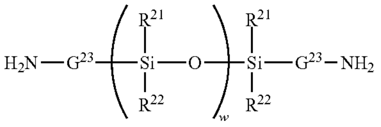

(DI-9)

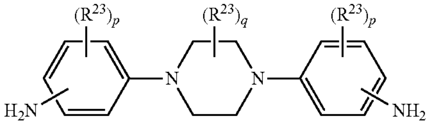

(DI-10)

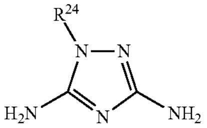

(DI-11)

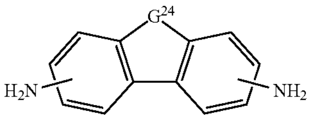

(DI-12)

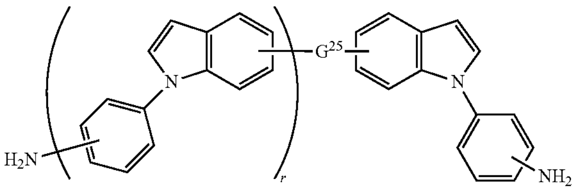

in Formula (DI-8), $R^{21}$ and $R^{22}$ each are independently alkyl having 1 to 3 carbon atoms or phenyl;

plural $G^{23}$ each are independently alkylene having 1 to 6 carbon atoms, phenylene or phenylene substituted with alkyl;

w is an integer of 1 to 10;

in Formula (DI-9), plural $R^{23}$ each are independently alkyl having 1 to 5 carbon atoms, alkoxy having 1 to 5 carbon atoms or Cl; plural p each are independently an integer of 0 to 3, and q is an integer of 0 to 4;

in Formula (DI-10), $R^{24}$ is hydrogen, alkyl having 1 to 4 carbon atoms, phenyl or benzyl;

in Formula (DI-11), $G^{24}$ is —$CH_2$— or —NH—;

in Formula (DI-12), $G^{25}$ is a single bond, alkylene having 2 to 6 carbon atoms or 1,4-phenylene; and r is 0 or 1;

in Formula (DI-12), groups in which bonding positions are not fixed to any of carbon atoms constituting the rings show that the bonding positions thereof in the rings are optional;

in Formulas (DI-9), (DI-11) and (DI-12), the bonding positions of —$NH_2$ bonded to the benzene rings are optional positions:

(DI-13)

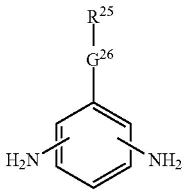

in Formula (DI-13), $G^{26}$ is a single bond, —O—, —COO—, —OCO—, —CO—, —CONH—, —$CH_2O$—, —$OCH_2$—, —$CF_2O$—, —$OCF_2$— or —O—$(CH_2)_{m'}$—, and m' is an integer of 1 to 12;

$R^{25}$ is alkyl having 3 to 20 carbon atoms, phenyl, cyclohexyl, a group having a steroid skeleton or a group represented by the following Formula (DI-4-a); in the above alkyl, at least one hydrogen may be substituted with —F, and at least one —$CH_2$— may be substituted with —O—; hydrogen of the above phenyl may be substituted with —F, —$CH_3$, —$OCH_3$, —$OCH_2F$, —$OCHF_2$, —$OCF_3$, alkyl having 3 to 20 carbon atoms or alkoxy having 3 to 20 carbon atoms; hydrogen of the above cyclohexyl may be substituted with alkyl having 3 to 20 carbon atoms or alkoxy having 3 to 20 carbon atoms; the bonding position of —$NH_2$ bonded to the benzene ring shows that it is an optional position in the above ring:

(DI-13-a)

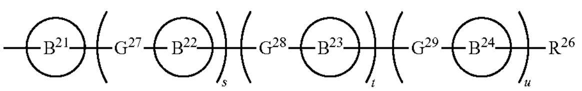

in Formula (DI-4-a), $G^{27}$, $G^{28}$ and $G^{29}$ represent a bonding group, and they each are independently a single bond or alkylene having 1 to 12 carbon atoms; at least one —$CH_2$— in the above alkylene may be substituted with —O—, —COO—, —OCO—, —CONH— or —CH═CH—;

a ring $B^{21}$, a ring $B^{22}$, a ring $B^{23}$ and a ring $B^{24}$ each are independently 1,4-phenylene, 1,4-cyclohexylene, 1,3-dioxane-2,5-diyl, pyrimidine-2,5-diyl, pyridine-2,5-diyl, naphthalene-1,4-diyl, naphthalene-1,5-diyl, naphthalene-2,6-diyl, naphthalene-2,7-diyl or anthracene-9,10-diyl;

in the ring $B^{21}$, the ring $B^{22}$, the ring $B^{23}$ and the ring $B^{24}$, at least one hydrogen may be substituted with —F or —$CH_3$;

s, t and u each are independently an integer of 0 to 2, and a total thereof is 1 to 5;

when s, t or u is 2, two bonding groups in the respective parentheses may be the same or different, and two rings may be the same or different;

$R^{26}$ is —F, —OH, alkyl having 1 to 30 carbon atoms, fluorine-substituted alkyl having 1 to 30 carbon atoms, alkoxy having 1 to 30 carbon atoms, —CN, —$OCH_2F$, —$OCHF_2$ or —$OCF_3$, and at least one —$CH_2$— in the above alkyl having 1 to 30 carbon atoms may be substituted with a divalent group represented by the following Formula (DI-13-b):

(DI-13-b)

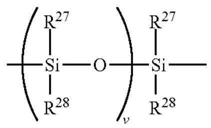

in Formula (DI-13-b), $R^{27}$ and $R^{28}$ each are independently alkyl having 1 to 3 carbon atoms; and v is an integer of 1 to 6;

(DI-14)

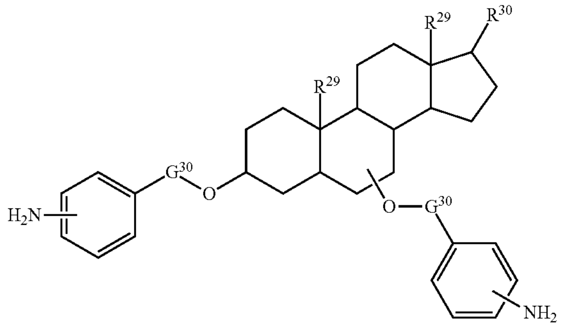

(DI-15)

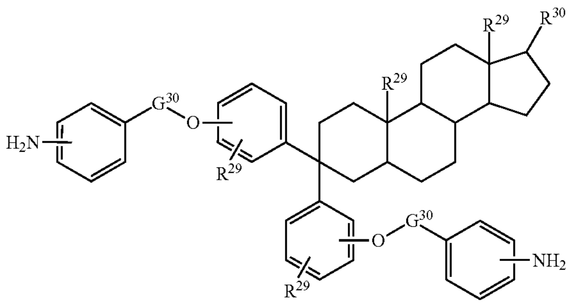

in Formulas (DI-14) and (DI-15), plural $G^{30}$ each are independently a single bond, —CO— or —$CH_2$—;

plural $R^{29}$ each are independently hydrogen or —$CH_3$;

$R^{30}$ is hydrogen, alkyl having 1 to 20 carbon atoms or alkenyl having 2 to 20 carbon atoms;

one hydrogen of a benzene ring in Formula (DI-15) may be substituted with alkyl having 1 to 20 carbon atoms or phenyl; in Formulas (DI-14) and (DI-15), groups in which bonding positions are not fixed to any of carbon atoms constituting the rings show that the bonding positions thereof in the rings are optional;

—$NH_2$ bonded to the benzene ring shows that the bonding position thereof in the ring is optional:

(DI-16)

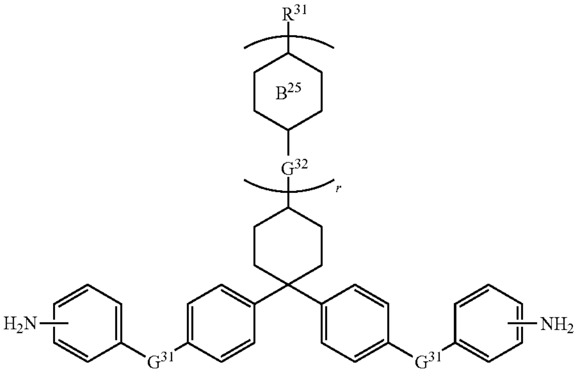

(DI-17)

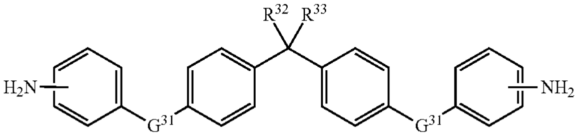

in Formulas (DI-16) and (DI-17), plural $G^{31}$ each are independently —O— or alkylene having 1 to 6 carbon atoms;

$G^{32}$ is a single bond or alkylene having 1 to 3 carbon atoms;

$R^{31}$ is hydrogen or alkyl having 1 to 20 carbon atoms, and at least one —$CH_2$— of the above alkyl may be substituted with —O—;

$R^{32}$ is alkyl having 6 to 22 carbon atoms;

$R^{33}$ is hydrogen or alkyl having 1 to 22 carbon atoms;

a ring $B^{25}$ is 1,4-phenylene or 1,4-cyclohexylene;

r is 0 or 1; and

—$NH_2$ bonded to the benzene ring shows that the bonding position thereof in the ring is optional.

[8] The photo-aligning liquid crystal aligning agent as described in the above item [7], wherein in [A], the diamine having no photoreactive structure is at least one of compounds represented by the following Formula (DI-5-1):

(DI-5-1)

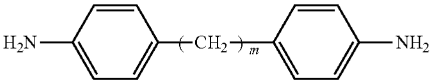

in Formula (DI-5-1), m is an integer of 1 to 12.

[9] The photo-aligning liquid crystal aligning agent as described in any one of the above items [1] to [8], wherein in [B], the tetracarboxylic acid dianhydride having no photoreactive structure is at least one selected from the group of compounds represented by the following Formulas (AN-1-1), (AN-1-13), (AN-2-1), (AN-3-1), (AN-3-2), (AN-4-5), (AN-4-21), (AN-5-1) and (AN-16-1), and the diamine having no photoreactive structure is at least one selected from the group of compounds represented by the following Formulas (DI-1-3), (DI-2-1), (DI-4-1), (DI-5-1), (DI-5-5), (DI-5-9), (DI-5-12), (DI-5-27) to (DI-5-30), (DI-7-3), (DI-8-1) and (DI-9-1):

(AN-1-1)

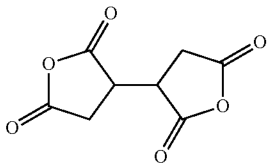

(AN-1-13)

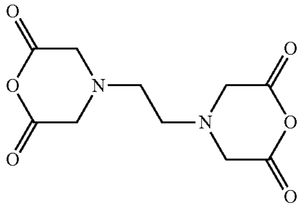

(AN-2-1)

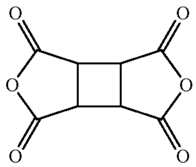

(AN-3-1)

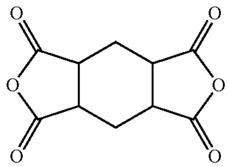

(AN-3-2)

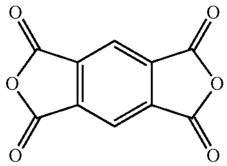

(AN-4-5)

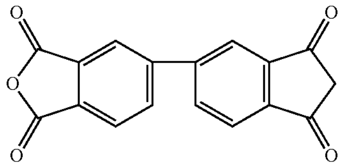

-continued (AN-4-21)

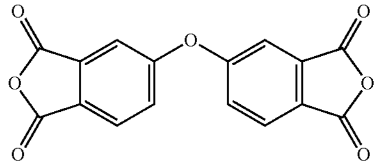

(AN-5-1)

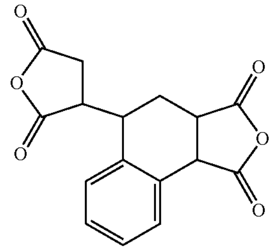

(AN-16-1)

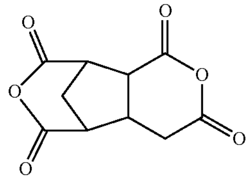

(DI-1-3)

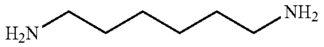

(DI-2-1)

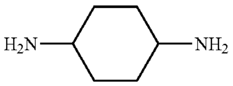

(DI-4-1)

(DI-5-1)

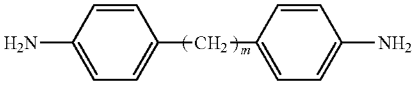

(DI-5-5)

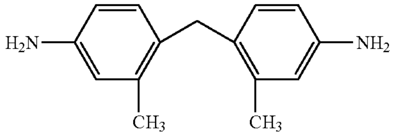

(DI-5-9)

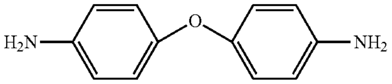

(DI-5-12)

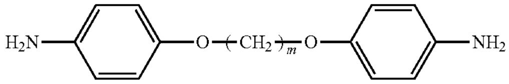

(DI-5-27)

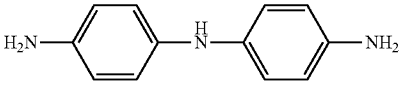

(DI-5-28)

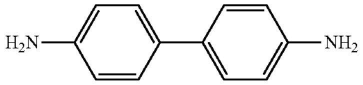

(Di-5-29)

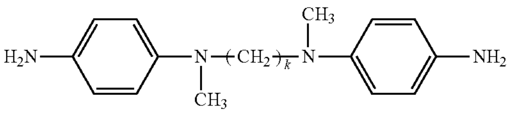

(DI-5-30)

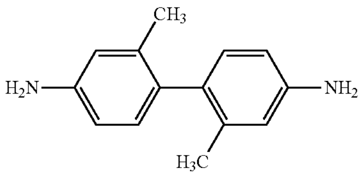

(DI-7-3)

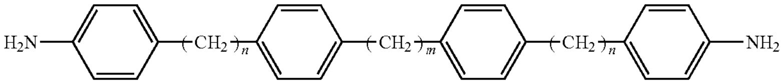

(DI-8-1)

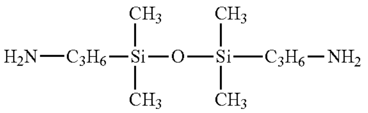

(DI-9-1)

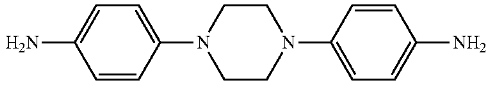

in Formulas (DI-5-1), (DI-5-12) and (DI-7-3), m is an integer of 1 to 12;

in Formula (DI-5-29), k is an integer of 1 to 5; and in Formula (DI-7-3), n is 1 or 2.

[10] The photo-aligning liquid crystal aligning agent as described in the above item [9], wherein in [B], the tetracarboxylic acid dianhydride having no photoreactive structure is at least one selected from the group of the compounds represented by the following Formulas (AN-1-1), (AN-1-13), (AN-2-1), (AN-3-1), (AN-3-2) and (AN-4-5), and the diamine having no photoreactive structure is at least one selected from the group of the compounds represented by the following Formulas (DI-7-3), (DI-2-1), (DI-4-1), (DI-5-1), (DI-5-5), (DI-5-29) and (DI-9-1):

(AN-1-1)

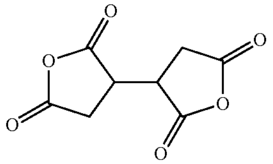

(AN-1-13)

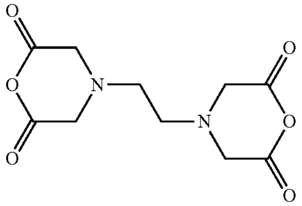

(AN-2-1)

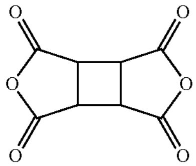

(AN-3-1)

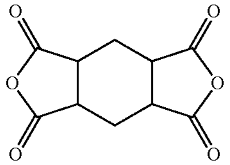

(AN-3-2)

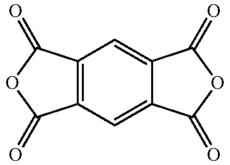

(AN-4-5)

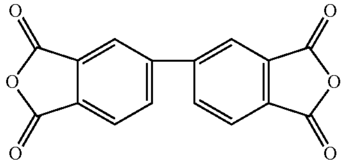

(DI-1-3)

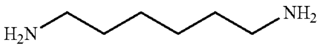

(DI-2-1)

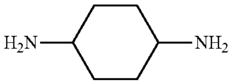

(DI-4-1)

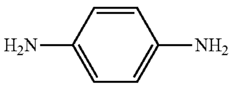

(DI-5-1)

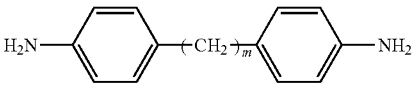

(DI-5-5)

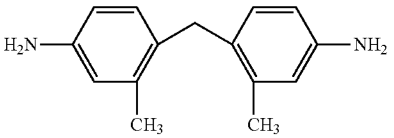

-continued (DI-5-29)

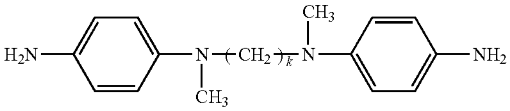

(DI-9-1)

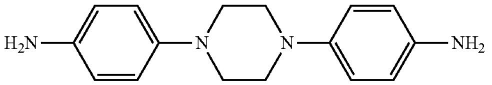

in Formula (DI-5-1), m is an integer of 1 to 12; and in Formula (DI-5-29), k is an integer of 1 to 5.

[11] The photo-aligning liquid crystal aligning agent as described in any one of the above items [1] to [10], further comprising at least one selected from the group of compounds consisting of alkenyl-substituted nadiimide compounds, compounds having a radically polymerizable unsaturated double bond, oxazine compounds, oxazoline compounds, epoxy compounds and silane coupling agents.

[12] The photo-aligning liquid crystal aligning agent as described in the above item [11], wherein the alkenyl-substituted nadiimide compound is at least one selected from the group of compounds consisting of bis{4-(allylbicyclo[2.2.1]hept-5-ene-2,3-dicarboxylmide) phenyl}methane, N,N'-m-xylylene-bis(allylbicyclo [2.2.1]hept-5-ene-2,3-dicarboxylmide) and N,N'-hexamethylene-bis(allylbicyclo[2.2.1]hept-5-ene-2,3-dicarboxylmide).

[13] The photo-aligning liquid crystal aligning agent as described in the above item [11], wherein the compound having a radically polymerizable unsaturated double bond is at least one selected from the group of compounds consisting of N,N'-ethylenebisacrylamide, N,N'-(1,2-dihydroxyethylene)bisacrylamide, ethylenebisacrylate and 4,4'-methylenebis(N,N-dihydroxyethyleneacrylateaniline).

[14] The photo-aligning liquid crystal aligning agent as described in the above item [11], wherein the epoxy compound is at least one selected from the group of compounds consisting of N,N,N',N'-tetraglycidyl-m-xylylenediamine, 1,3-bis(N,N-diglycidylaminomethyl)cyclohexane, N,N,N',N'-tetraglycidyl-4,4'-diaminodiphenylmethane, 2-[4-(2,3-epoxypropoxy)phenyl]-2-[4-[1,1-bis[4-([2,3-epoxypropoxy]phenyl)]ethyl]phenyl]propane, 3,4-epoxycyclohexenylmethyl-3',4'-epoxycyclohexenecarboxylate, N-phenylmaleimide-glycidyl methacrylate copolymers, 2-(3,4-epoxycyclohexyl)ethyltrimethoxysilane, paraminophenyltrimethoxysilane and 3-aminopropyltriethoxysilane.

[15] The photo-aligning liquid crystal aligning agent as described in the above item [11], wherein the silane coupling agent is at least one selected from the group of compounds consisting of 2-(3,4-epoxycyclohexyl)ethyltrimethoxysilane, paraminophenyltrimethoxysilane and 3-aminopropyltriethoxysilane.

[16]A photo-aligning liquid crystal alignment layer formed by the photo-aligning liquid crystal aligning agent as described in any one of the above items [1] to [15].

[17]A photo-aligning liquid crystal alignment layer formed by passing through a step of coating the photo-aligning liquid crystal aligning agent as described in any one of the above items [1] to [15] on a substrate, a step of heating and drying the substrate coated with the aligning agent and a step of irradiating the layer with a polarized UV ray.

[18]A photo-aligning liquid crystal alignment layer formed by passing through a step of coating the photo-aligning liquid crystal aligning agent as described in any one of the above items [1] to [15] on a substrate, a step of heating and drying the substrate coated with the aligning agent, a step of irradiating the dried layer with a polarized UV ray and then a step of heating and baking the layer.

[19]A photo-aligning liquid crystal alignment layer formed by passing through a step of coating the photo-aligning liquid crystal aligning agent as described in any one of the above items [1] to [15] on a substrate, a step of heating and drying the substrate coated with the aligning agent, a step of heating and baking the dried layer and then a step of irradiating the layer with a polarized UV ray.

[20]A liquid crystal display device comprising the photo-aligning liquid crystal alignment layer as described in any one of the above items [16] to [19].

Use of the photo-aligning liquid crystal aligning agent of the present invention makes it possible to form a liquid crystal alignment layer materializing a liquid crystal display device which has a high transmittance while maintaining various characteristics such as a liquid crystal aligning property, a voltage holding ratio and the like and in which flickering is inhibited from being caused after operated for a long time.

MODE FOR CARRYING THE INVENTION

The terms used in the present invention shall be explained. The term "optional" used in defining chemical structural formulas shows that not only the positions but also the numbers are optional. In the chemical structural formulas, groups in which characters (for example, A or $B^{21}$ to $B^{26}$) are surrounded by circles mean groups (A or $B^{21}$ to $B^{26}$) of a ring structure. Groups in which characters (for example, $A^{11}$ or $B^{25}$) are surrounded by hexagons mean groups ($A^{11}$ or $B^{25}$) of a six-membered ring structure.

<Photo-Aligning Liquid Crystal Aligning Agent>

The photo-aligning liquid crystal aligning agent of the present invention contains polyamic acid or a derivative thereof which is a reaction product of tetracarboxylic acid dianhydride with diamine. The derivative of the polyamic acid described above is a component dissolved in the solvent when a liquid crystal aligning agent containing a solvent is prepared, and it is a component from which a liquid crystal alignment layer comprising polyimide as a principal component can be formed when a liquid crystal alignment layer described later is prepared by the liquid crystal aligning agent. The above derivative of the polyamic acid includes, for example, soluble polyimides, polyamic acid esters, polyamic acid amides and the like, and it includes, to be more specific, 1) polyimides prepared by subjecting all aminos and carboxyls of polyamic acid to dehydration cyclization, 2) partial polyamides prepared by partially subjecting them to dehydration cyclization, 3) polyamic acid esters obtained by converting carboxyls of polyamic acid to esters, 4) polyamic acid-polyamide copolymers obtained by replacing a part of dianhydride contained in tetracarboxylic acid dianhydride by organic dicarboxylic acid and reacting it with diamine and 5) polyimides prepared by subjecting a part or a whole part of the above polyamic acid-polyamide copolymers to dehydration cyclization. The polyamic acid or the derivative thereof described above may comprise a single compound or two or more compounds.

The photo-aligning liquid crystal aligning agent of the present invention is a photo-aligning liquid crystal aligning agent containing [A] polyamic acid or a derivative thereof obtained by reacting tetracarboxylic acid dianhydride and diamine, wherein the tetracarboxylic acid dianhydride and the diamine which are monomers contain at least one of tetracarboxylic acid dianhydride having a photoreactive structure and diamine having a photoreactive structure which are selected from the group of the compounds represented by the following Formulas (I) to (VII) and [B] polyamic acid or a derivative thereof obtained by reacting tetracarboxylic acid dianhydride having no photoreactive structure and diamine having no photoreactive structure:

$$R^2—C{\equiv}C—R^3 \quad (I)$$

$$R^2—C{\equiv}C—C{\equiv}C—R^3 \quad (II)$$

$$R^2—C{\equiv}C—CH{=}CH—R^3 \quad (III)$$

$$R^2—C{\equiv}C—R^4—C{\equiv}CH—R^3 \quad (IV)$$

$$R^2—C{\equiv}C—R^4—CH{=}CH—R^3 \quad (V)$$

$$R^2—CH{=}CH—R^3 \quad (VI)$$

$$R^2—N{=}N—R^3 \quad (VII)$$

in Formulas (I) to (VII), $R^2$ and $R^3$ each are independently a monovalent organic group having $—NH_2$ or a monovalent organic group having —CO—O—CO—, and $R^4$ is a divalent organic group having an aromatic ring.

The photoreactive structure is a structure which makes it possible to cause photoisomerization or photodimerization.

The photo-aligning liquid crystal aligning agent of the present invention is a liquid crystal aligning agent containing at least two polymers of [A] and [B]. In this regard, it is considered that controlling a weight average molecular weight of [A] to a lower level than that of [B] makes it possible to segregate [A] having a photoreactive structure on an upper layer of a polymer film formed in a step of coating the liquid crystal aligning agent containing the mixture of both polymers on the substrate and pre-drying the film and segregate [B] having no photoreactive structure on a lower layer thereof. Accordingly, the polymer [A] having a photoreactive structure is present predominantly on the surface of the alignment layer, and even at a smaller content of the polymer [A] having a photoreactive structure based on a whole amount of the polymer forming the alignment layer, the alignment layer formed by the photo-aligning liquid crystal aligning agent of the present invention shows a high liquid crystal aligning property.

Known is the phenomenon that in a step of forming a thin layer by using a liquid crystal aligning agent containing two polymers as described above, a polymer having a smaller surface energy is separated to an upper layer and that a polymer having a larger surface energy is separated to a lower layer. Whether or not the alignment layer described above is separated into two layers can be confirmed, for example, by that a measured surface energy of the layer formed is the same as or close to that of a layer formed by a liquid crystal aligning agent containing only the polymer [A].

In order to obtain the good photo-aligning property as described above, a content of the polymer [A] contained in the photo-aligning liquid crystal aligning agent of the present invention has to be 20% by weight or more, preferably 30% by weight or more and more preferably 50% by weight or more assuming that a whole amount of the polymers contained is 100. Also, in order to maintain well a transmittance of the liquid crystal alignment layer, a content of the polymer [A] has to be 90% by weight or less, preferably 70% by weight or less and more preferably 50% by weight or less. The preferred content of [A] described above is one guideline and varied in a certain case according to the combination of the tetracarboxylic acid dianhydride or the diamine which is used for the raw material. Particularly when the raw material compound having a structure of azobenzene is used, a content of [A] is set to a level which is lower by about 10 to 20% by weight than that of that the proportions described above in order to maintain well the transmittance.

A weight average molecular weight (Mw) of the polymer [A] is controlled to 8,000 to 40,000, preferably 10,000 to 30,000, and a weight average molecular weight (Mw) of the polymer [B] is controlled to 50,000 to 200,000, preferably 80,000 to 160,000, whereby the layer separation described above can be brought about. The weight average molecular weights of the polymers can be controlled, for example, by time for reacting the tetracarboxylic acid dianhydride and the diamine. A small amount of the reaction liquid during the polymerization reaction is sampled to determine the weight average molecular weights of the polymers contained therein by a gel permeation chromatographic (GPC) method, and an end point of the reaction can be determined by the measured values thereof. Also, known well is a method in which the considerable amounts of the tetracarboxylic acid dianhydride and the diamine are substituted with monocarboxylic acid or monoamine in starting the reaction, whereby the polymerization reaction is terminated to control the weight average molecular weights.

<Polymer [A]>

The polymer [A] of the present invention is polyamic acid or a derivative thereof obtained by reacting tetracarboxylic acid dianhydride and diamine, wherein the tetracarboxylic acid dianhydride and the diamine contain at least one of the tetracarboxylic acid dianhydride having a photoreactive structure and the diamine having a photoreactive structure which are selected from the group of the compounds represented by Formulas (I) to (VII) described above.

In the polymer [A], at least one of the tetracarboxylic acid dianhydride having a photoreactive structure and the diamine having a photoreactive structure which are selected from the group of the compounds represented by Formulas (I) to (VII) described above is used for the raw material, whereby the good photosensitivity can be exerted. Tetracarboxylic acid dianhydride and diamine represented by the following Formulas (I-1), (II-1), (III-1), (IV-1), (IV-2), (V-1), (VI-1) and (VII-1) to (VII-3) can be listed as the suitable compounds:

(I-1)

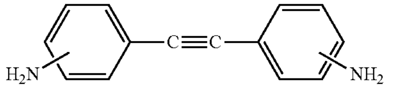

(II-1)

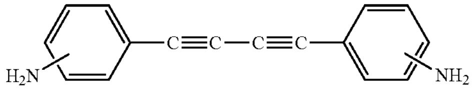

(III-1)

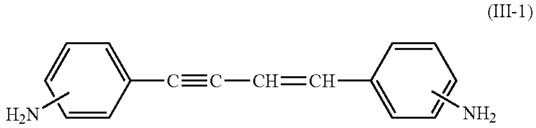

-continued (IV-1)

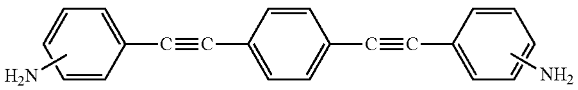

(IV-2)

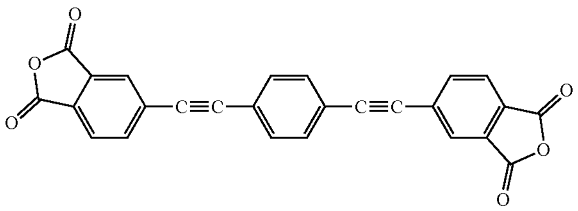

(V-1)

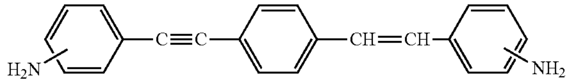

(VI-1)

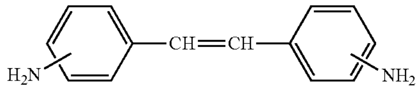

(VII-1)

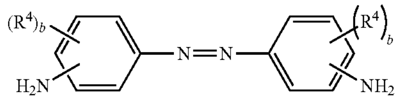

(VII-2)

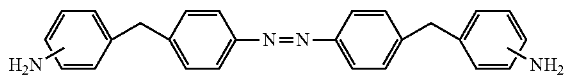

(VII-3)

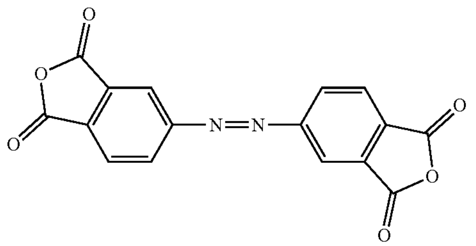

in Formulas (I-1), (II-1), (III-1), (IV-1), (V-1), (VI-1), (VII-1) and (VII-2), groups in which bonding positions are not fixed to any of carbon atoms constituting the rings show that the bonding positions thereof in the rings are optional;

in Formula (VII-1), plural $R^4$ each are independently —$CH_3$, —$OCH_3$, —$CF_3$ or —$COOCH_3$; and plural b each are independently an integer of 0 to 2.

The tetracarboxylic acids dianhydride or the diamines represented by Formulas (II-1), (VI-1), (VII-1) and (VII-3) described above can suitably be used from the viewpoint of a reactivity and a photosensitivity. The compounds in which a bonding position of an amino group is a para position in Formulas (II-1), (VI-1) and (VII-1) can particularly suitably be used, and among them, the compound in which b is 0 in Formula (VII-1) can more suitably be used.

In [A], tetracarboxylic acid dianhydride having no photoreactive structure and diamine having no photoreactive structure can be used together with the tetracarboxylic acid dianhydride having a photoreactive structure and the diamine having a photoreactive structure each. However, the use amounts thereof are limited in order to maintain well the photoaligning property described above. When the tetracarboxylic acid dianhydride having a photoreactive structure and the tetracarboxylic acid dianhydride having no photoreactive structure are used in combination, a proportion of the tetracarboxylic acid dianhydride having a photoreactive structure has to be 30% by mole or more, preferably 50% by mole or more and more preferably 70% by mole or more based on a whole amount of the tetracarboxylic acids dianhydride. When the diamine having a photoreactive structure and the diamine having no photoreactive structure are used in combination, a proportion of the diamine having a photoreactive structure has to be 30% by mole or more, preferably 50% by mole or more and more preferably 70% by mole or more based on a whole amount of the diamines.

<Polymer [B]>

The polymer [B] of the present invention is polyamic acid or a derivative thereof obtained by reacting tetracarboxylic acid dianhydride having no photoreactive structure and diamine having no photoreactive structure. In [B], the tetracarboxylic acid dianhydride having no photoreactive structure and the diamine having no photoreactive structure can be used without limits.

<Tetracarboxylic Acid Dianhydride Having No Photoreactive Structure>

The photo-aligning liquid crystal aligning agent of the present invention contains the polyamic acid or the derivative thereof of [A] and [B] described above. In producing [A], tetracarboxylic acid dianhydride other than the foregoing tetracarboxylic acid dianhydride having a photoreactive structure can be further used, and it can be selected from publicly known tetracarboxylic acids dianhydride without limits. Also, in producing [B], it can be selected from publicly known tetracarboxylic acids dianhydride without limits. The above tetracarboxylic acids dianhydride may be compounds belonging to either group of aromatic compounds (including heteroaromatic compounds) in which dicarboxylic acid anhydride is bonded directly to an aromatic ring and aliphatic compounds (including heterocyclic compounds) in which dicarboxylic acid anhydride is not bonded directly to an aromatic ring.

The suitable examples of the above tetracarboxylic acids dianhydride include tetracarboxylic acids dianhydride represented by Formulas (AN-I) to (AN-VII) from the viewpoints of an availability of the raw materials, easiness in producing the polymer and the electric characteristics of the layer:

(AN-I)

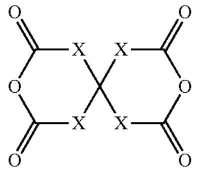

(AN-II)

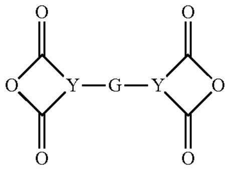

(AN-III)

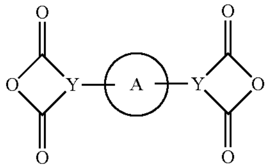

(AN-IV)

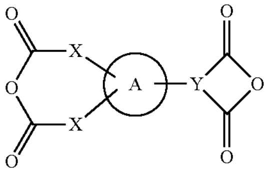

(AN-V)

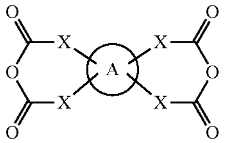

(AN-VI)

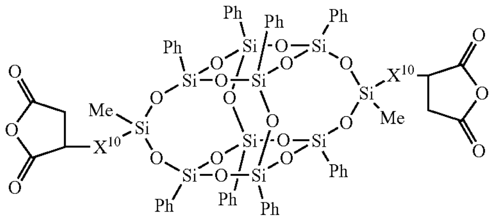

-continued (AN-VII)

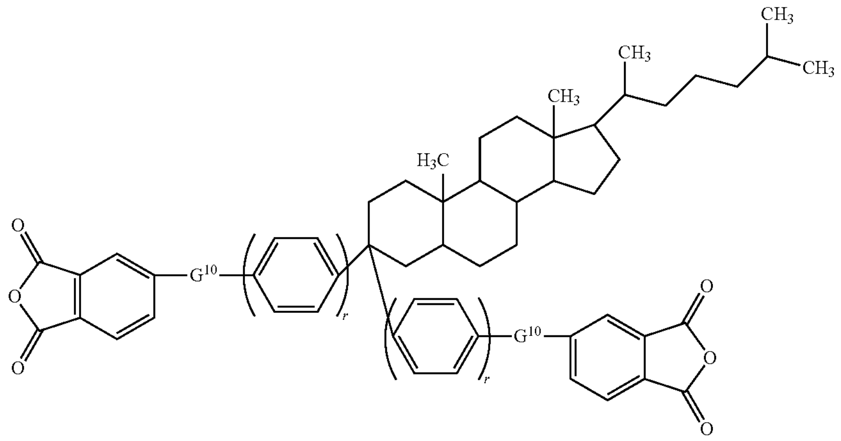

in Formulas (AN-I), (AN-1V) and (AN-V), plural X each are independently a single bond or $—CH_2—$;

in Formula (AN-II), G is a single bond, alkylene having 1 to 20 carbon atoms, —CO—, —O—, —S—, $—SO_2—$, $—C(CH_3)_2—$ or $—C(CF_3)_2—$;

in Formulas (AN-II) to (AN-1V), plural Y each are independently one selected from the group of the following trivalent groups, and the atomic bondings are connected with optional carbons; at least one hydrogen of the above groups may be substituted with methyl, ethyl or phenyl;

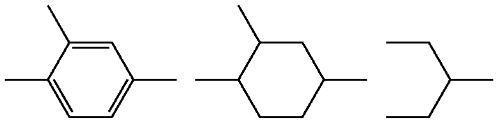

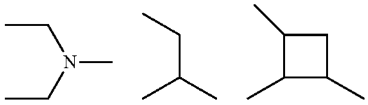

in Formulas (AN-III) to (AN-V), a ring A is a monocyclic hydrocarbon group having 3 to 10 carbon atoms or a condensed polycyclic hydrocarbon group having 6 to 30 carbon atoms; at least one hydrogen of the above group may be substituted with methyl, ethyl or phenyl; an atomic bonding coupled with the ring is connected with optional carbon constituting the ring, and two atomic bondings may be connected with the same carbon;

in Formula (AN-VI), $X^{10}$ is alkylene having 2 to 6 carbon atoms; Me is methyl; and Ph is phenyl;

in Formula (AN-VII), plural $G^{10}$ each are independently —O—, —COO— or —OCO—; and plural r each are independently 0 or 1.

To be more specific, tetracarboxylic acids dianhydride represented by Formulas (AN-1) to (AN-16-14) are listed:

(AN-1)

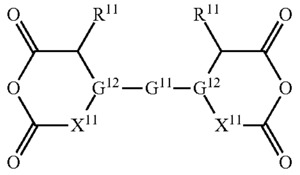

in Formula (AN-1), $G^{11}$ is a single bond, alkylene having 1 to 12 carbon atoms, 1,4-phenylene or 1,4-cyclohexylene; plural $X^{11}$ each are independently a single bond or $—CH_2—$; plural $G^{12}$ each are independently >CH— or >N—; when $G^{12}$ is >CH—, hydrogen of >CH— may be substituted with $—CH_3$; when $G^{12}$ is >N—, $G^{11}$ is not a single bond and $—CH_2—$, and $X^{11}$ is not a single bond; and $R^{11}$ is hydrogen or $—CH_3$. Compounds represented by the following formulas can be listed as the examples of the tetracarboxylic acid dianhydride represented by Formula (AN-1):

(AN-1-1)

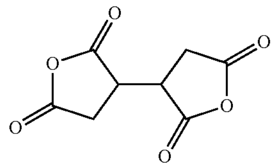

(AN-1-2)

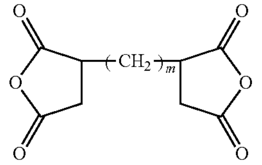

(AN-1-3)

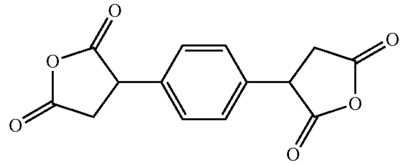

-continued
(AN-1-4)
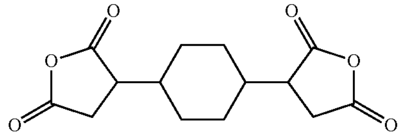
(AN-1-5)
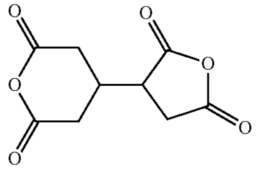
(AN-1-6)
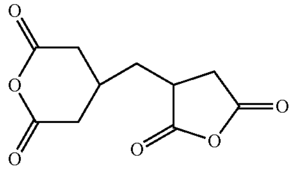
(AN-1-7)
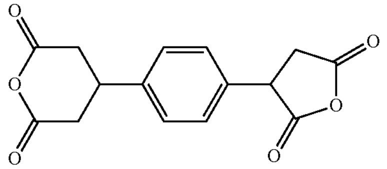
(AN-1-8)
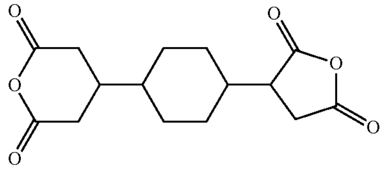
(AN-1-9)
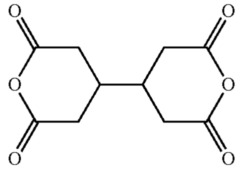
(AN-1-10)
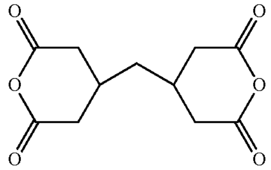
(AN-1-11)
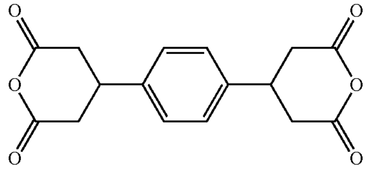
(AN-1-12)
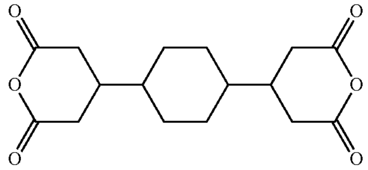
-continued
(AN-1-13)
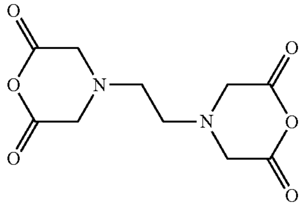
(AN-1-14)
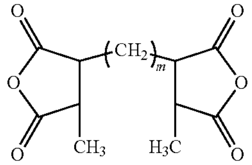
(AN-1-15)
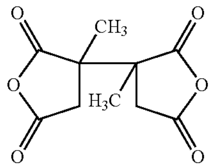
in Formulas (AN-1-2) and (AN-1-3), m is an integer of 1 to 12.
(AN-2)
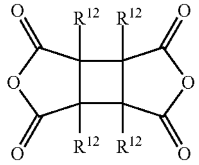
in Formula (AN-2), plural $R^{12}$ each are independently hydrogen, $-CH_3$, $-CH_2CH_3$ or phenyl. Compounds represented by the following formulas can be listed as the examples of the tetracarboxylic acid dianhydride represented by Formula (AN-2):
(AN-2-1)
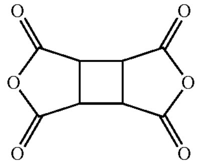
(AN-2-2)
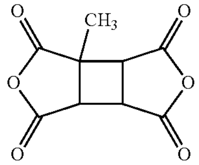
(AN-2-3)
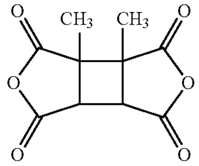

-continued (AN-2-4)

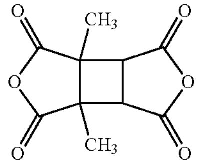

(AN-2-5)

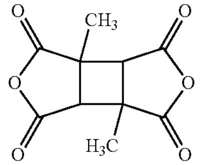

(AN-2-6)

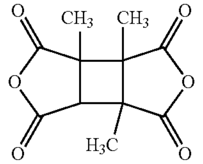

(AN-2-7)

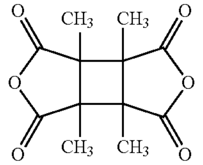

(AN-3)

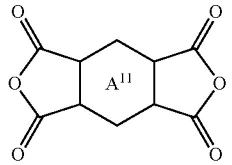

in Formula (AN-3), a ring $A^{11}$ is a cyclohexene ring or a benzene ring. Compounds represented by the following formulas can be listed as the examples of the tetracarboxylic acid dianhydride represented by Formula (AN-3):

(AN-3-1)

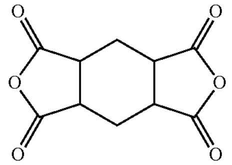

(AN-3-2)

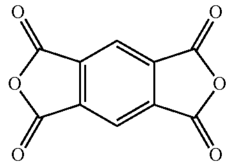

(AN-4)

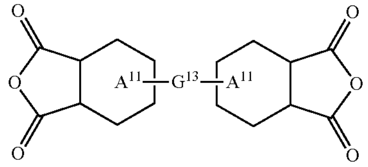

in Formula (AN-4), $G^{13}$ is a single bond, $-(CH_2)_m-$, $-O-$, $-S-$, $-C(CH_3)_2-$, $-SO_2-$, $-CO-$ or $-C(CF_3)_2$; m is an integer of 1 to 12; plural rings $A^{11}$ each are independently a cyclohexane ring or a benzene ring; $G^{13}$ may be bonded to an optional position of the ring $A^{11}$. Compounds represented by the following formulas can be listed as the examples of the tetracarboxylic acid dianhydride represented by Formula (AN-4):

(AN-4-1)

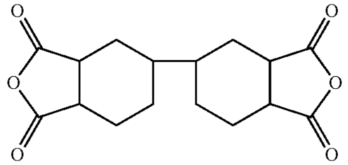

(AN-4-2)

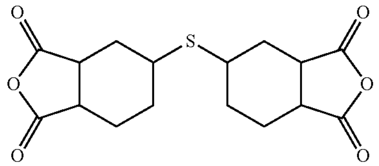

(AN-4-3)

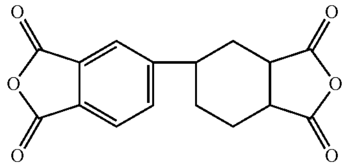

(AN-4-4)

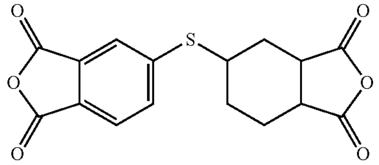

(AN-4-5)

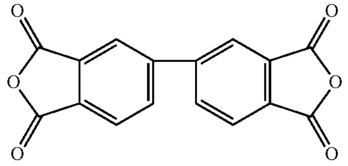

(AN-4-6)

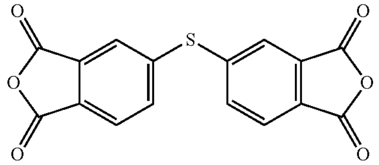

(AN-4-7)

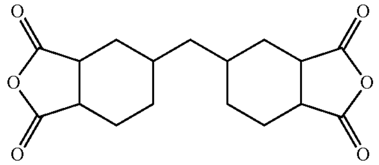

(AN-4-8)

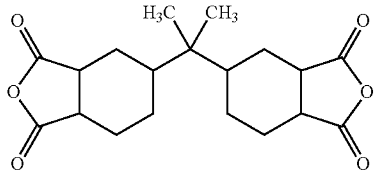

-continued
(AN-4-9)
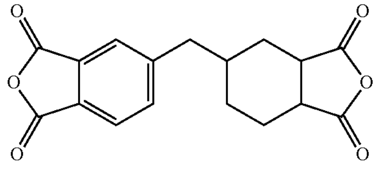
(AN-4-10)
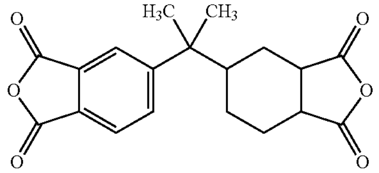
(AN-4-11)
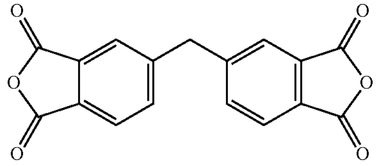
(AN-4-12)
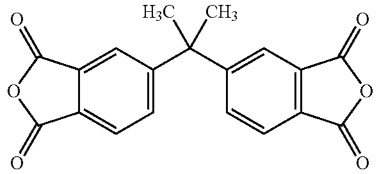
(AN-4-13)
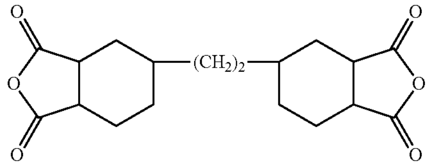
(AN-4-14)
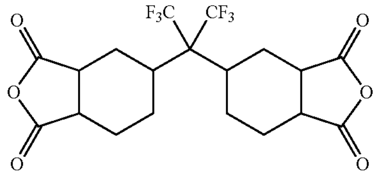
(AN-4-15)
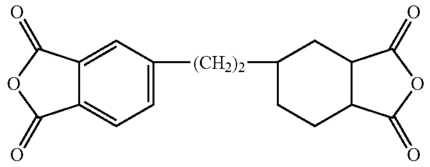
(AN-4-16)
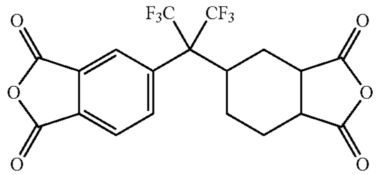
(AN-4-17)
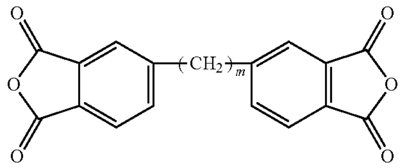
-continued
(AN-4-18)
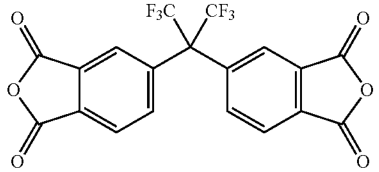
(AN-4-19)
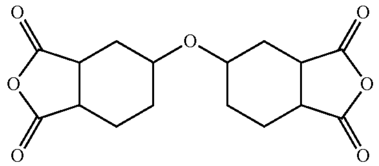
(AN-4-20)
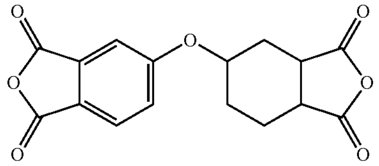
(AN-4-21)
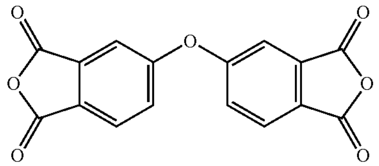
(AN-4-22)
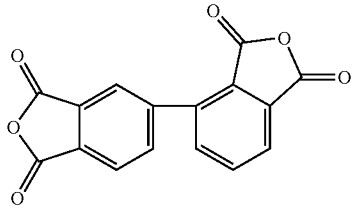
(AN-4-23)
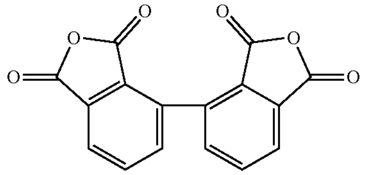
In Formula (AN-4-7), m is an integer of 1 to 12.
(AN-4-24)
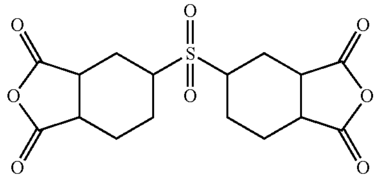
(AN-4-25)
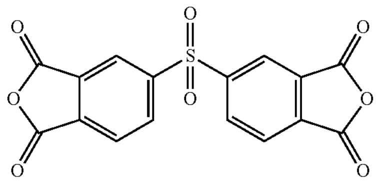

-continued (AN-4-26)

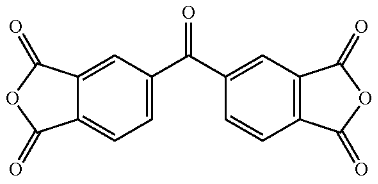

(AN-4-27)

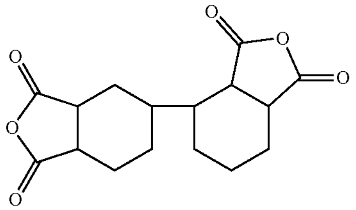

(AN-5)

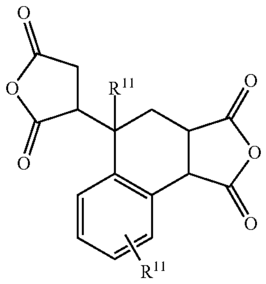

in Formula (AN-5), $R^{11}$ is hydrogen or $-CH_3$; and $R^{11}$ in which a bonding position is not fixed to carbon atoms constituting the benzene ring shows that the bonding position thereof in the benzene ring is optional. Compounds represented by the following formulas can be listed as the examples of the tetracarboxylic acid dianhydride represented by Formula (AN-5):

(AN-5-1)

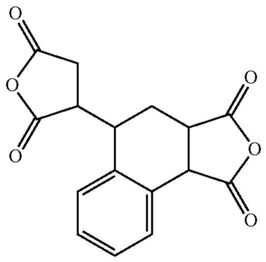

(AN-5-2)

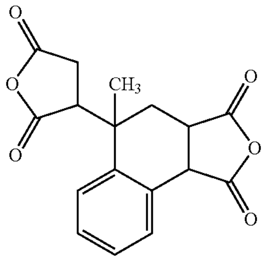

-continued (AN-5-3)

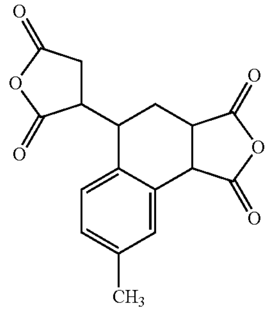

(AN-6)

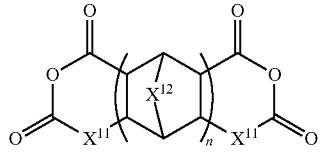

in Formula (AN-6), plural $X^{11}$ each are independently a single bond or $-CH_2-$; plural $X^{12}$ each are independently $-CH_2-$, $-CH_2CH_2-$ or $-CH{=}CH-$; and n is 1 or 2. Compounds represented by the following formulas can be listed as the examples of the tetracarboxylic acid dianhydride represented by Formula (AN-6):

(AN-6-1)

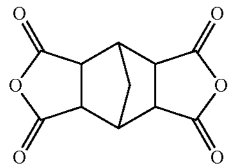

(AN-6-2)

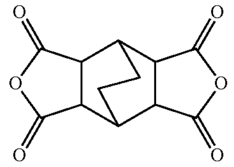

(AN-6-3)

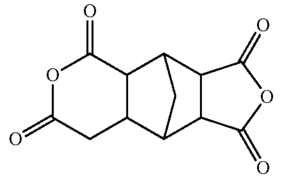

(AN-6-4)

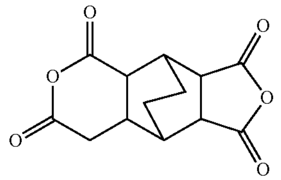

(AN-6-5)

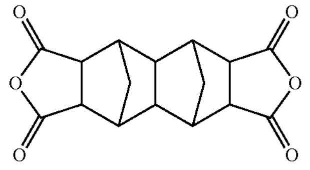

-continued (AN-6-6)

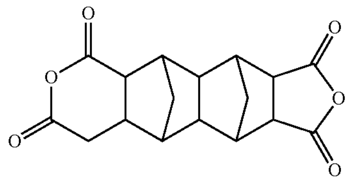

(AN-6-7)

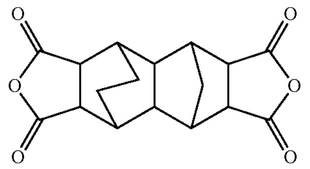

(AN-6-8)

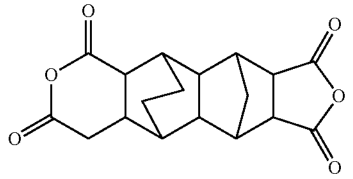

(AN-6-9)

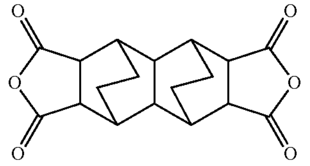

(AN-6-10)

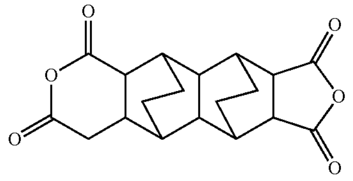

(AN-6-11)

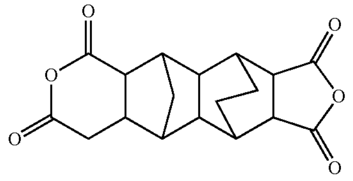

(AN-6-12)

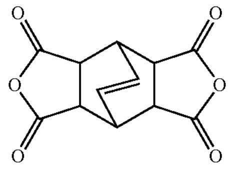

(AN-7)

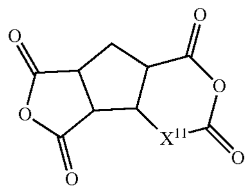

in Formula (AN-7), $X^{11}$ is a single bond or $—CH_2—$. Compounds represented by the following formulas can be listed as the examples of the tetracarboxylic acid dianhydride represented by Formula (AN-7):

(AN-7-1)

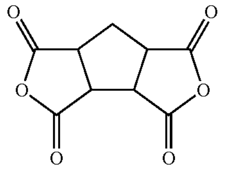

(AN-7-2)

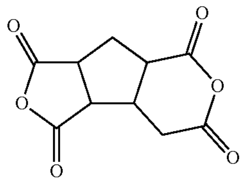

(AN-8)

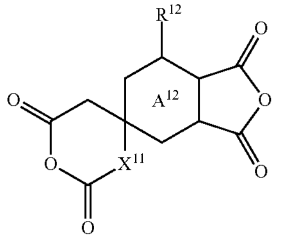

in Formula (AN-8), $X^{11}$ is a single bond or $—CH_2—$; $R^{12}$ is hydrogen, $—CH_3$, $—CH_2CH_3$ or phenyl; and a ring $A^{12}$ is a cyclohexane ring or a cyclohexene ring. Compounds represented by the following formulas can be listed as the examples of the tetracarboxylic acid dianhydride represented by Formula (AN-8):

(AN-8-1)

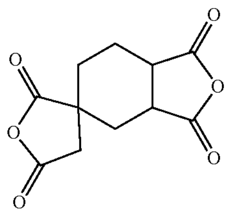

(AN-8-2)

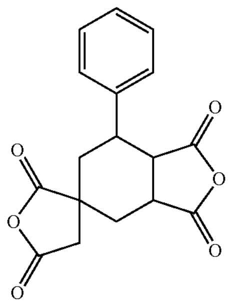

(AN-9)

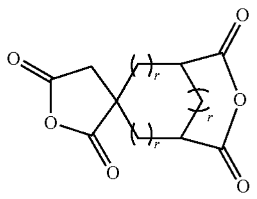

in Formula (AN-9), plural r each are independently 0 or 1. Compounds represented by the following formulas can be listed as the examples of the tetracarboxylic acid dianhydride represented by Formula (AN-9):

(AN-9-1)

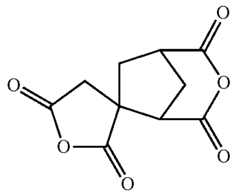

(AN-9-2)

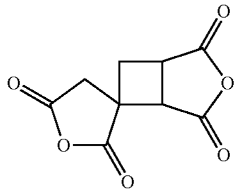

(AN-9-3)

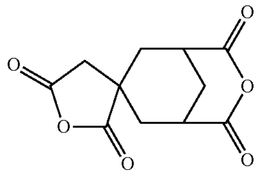

Formula (AN-10) represents the following tetracarboxylic acid dianhydride:

(AN-10)

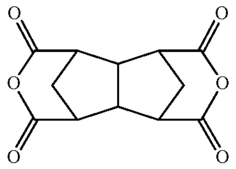

(AN-11)

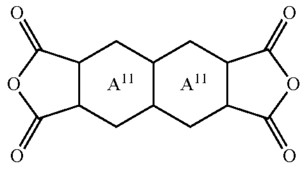

in Formula (AN-11), plural rings $A^{11}$ each are independently a cyclohexane ring or a benzene ring. Compounds represented by the following formulas can be listed as the examples of the tetracarboxylic acid dianhydride represented by Formula (AN-11):

(AN-11-1)

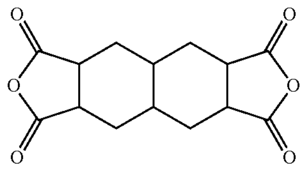

-continued (AN-11-2)

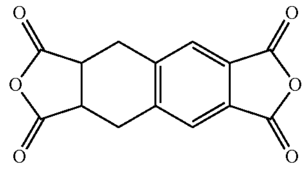

(AN-11-3)

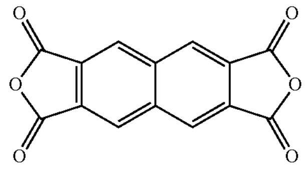

(AN-12)

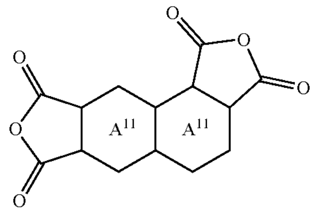

in Formula (AN-12), plural rings $A^{11}$ each are independently a cyclohexane ring or a benzene ring. Compounds represented by the following formulas can be listed as the examples of the tetracarboxylic acid dianhydride represented by Formula (AN-12):

(AN-12-1)

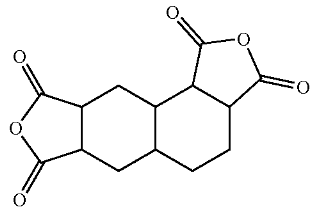

-continued
(AN-12-2)
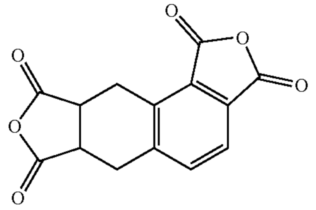
(AN-12-3)
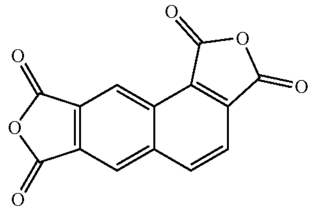
-continued
(AN-13)
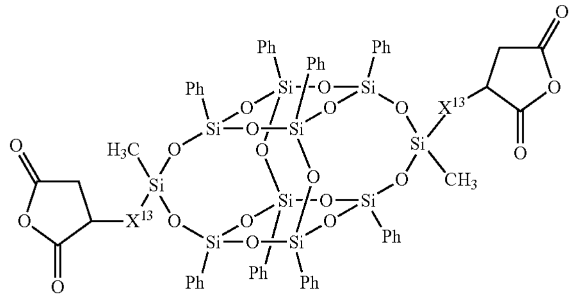
in Formula (AN-13), $X^{13}$ is alkylene having 2 to 6 carbon atoms, and Ph represents phenyl. Compounds represented by the following formulas can be listed as the examples of the tetracarboxylic acid dianhydride represented by Formula (AN-13):
(AN-13-1)
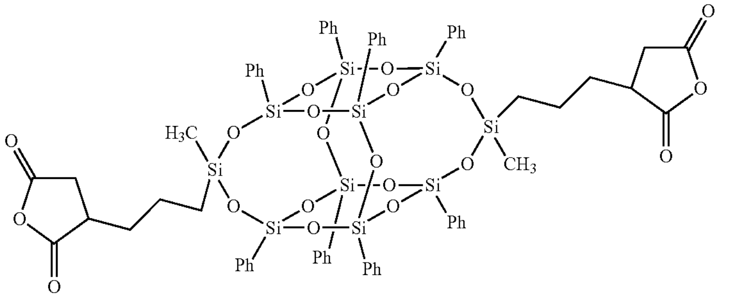
(AN-14)
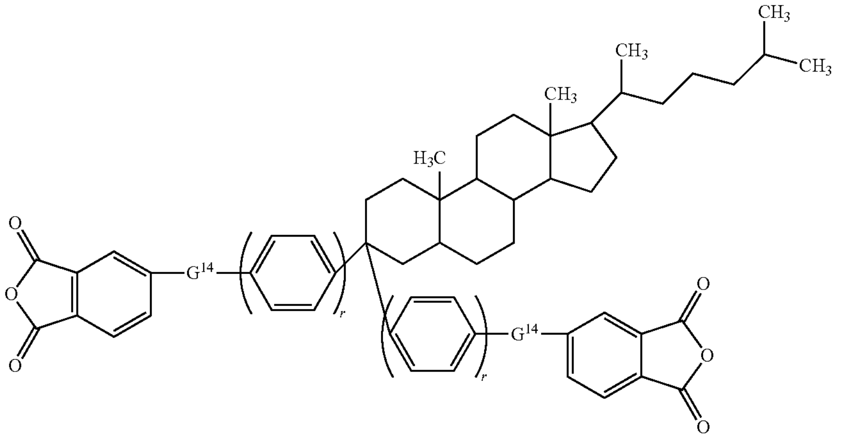

in Formula (AN-14), plural $G^{14}$ each are independently —O—, —COO— or —OCO—, and plural r each are independently 0 or 1. Compounds represented by the following formulas can be listed as the examples of the tetracarboxylic acid dianhydride represented by Formula (AN-14):
(AN-14-1)
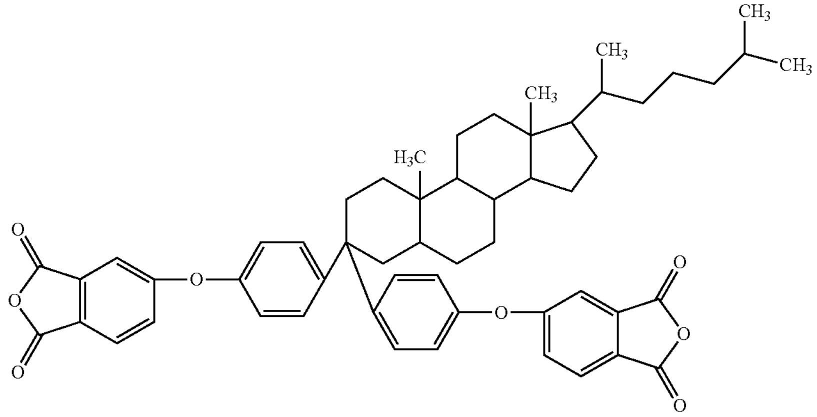
(AN-14-2)
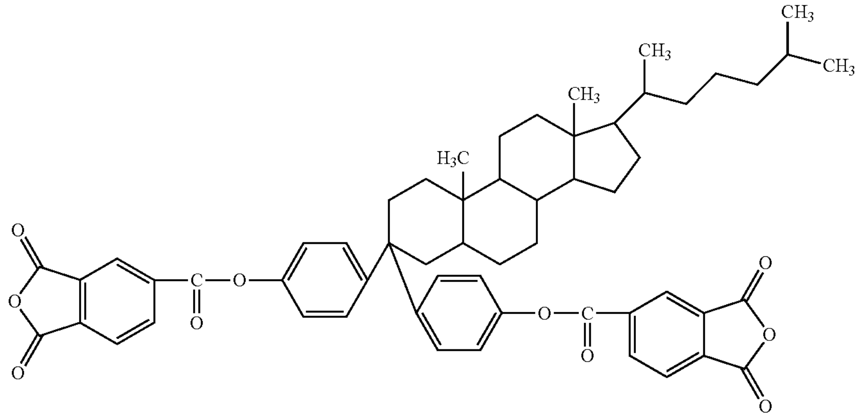
(AN-14-3)
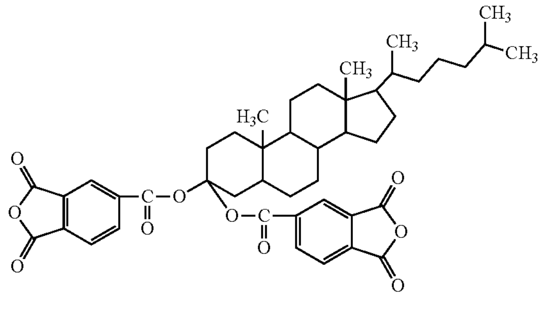
(AN-15)
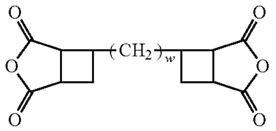

in Formula (AN-15), w is an integer of 1 to 10. Compounds represented by the following formulas can be listed as the examples of the tetracarboxylic acid dianhydride represented by Formula (AN-15):
(AN-15-1)
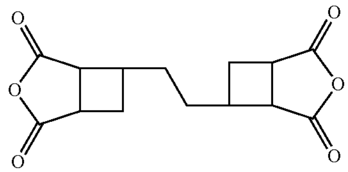
(AN-15-2)
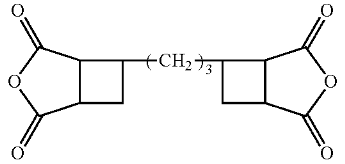
(AN-15-3)
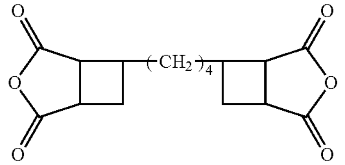
Tetracarboxylic acids dianhydride other than the compounds described above include the following compounds:
(AN-16-1)
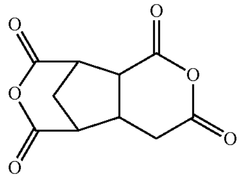
(AN-16-2)
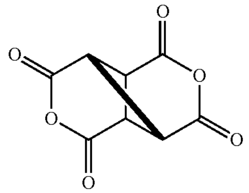
(AN-16-3)
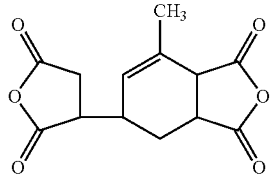
(AN-16-4)
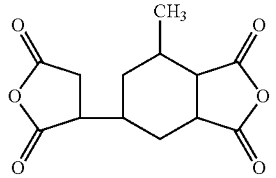
-continued
(AN-16-5)
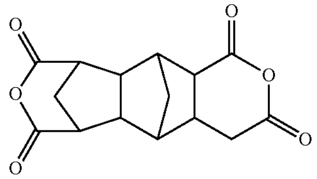
(AN-16-6)
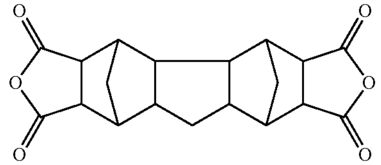
(AN-16-7)
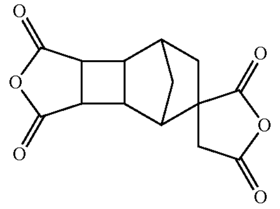
(AN-16-8)
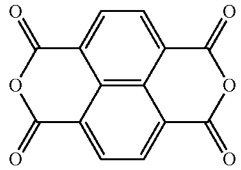
(AN-16-9)
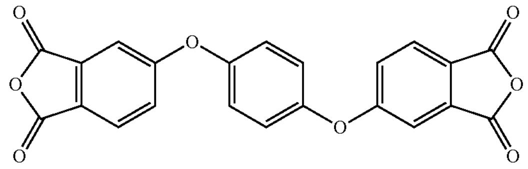
(AN-16-10)
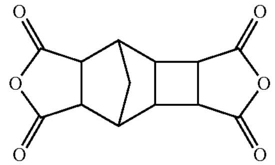
(AN-16-11)
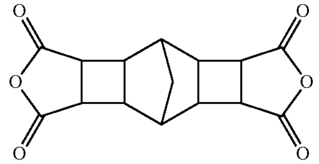
(AN-16-12)
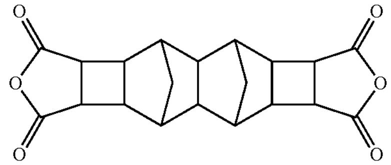

-continued (AN-16-13)

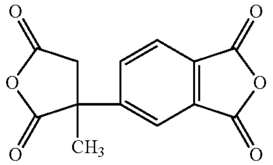

(AN-16-14)

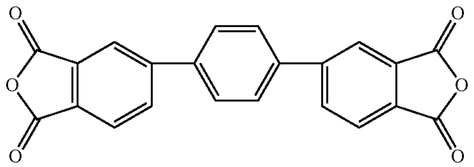

Suitable materials for further enhancing the respective characteristics in [A] shall be described.

When further improvement in an aligning property of the liquid crystal alignment layer is regarded as important, among the acid dianhydrides described above, more preferred are the compounds represented by Formulas (AN-1-1), (AN-1-3), (AN-2-1), (AN-3-2), (AN-4-5), (AN-4-17), (AN-11-3) and (AN-16-14), and the compounds represented by Formulas (AN-2-1), (AN-3-2), (AN-4-5), (AN-4-17), (AN-11-3) and (AN-16-14) are particularly preferred. In (AN-4-17), the compound in which m is 8 is particularly preferred.

When further improvement in a VHR of the liquid crystal display device is regarded as important, among the acid anhydrides described above, more preferred are the alicyclic compounds represented by Formulas (AN-1-1), (AN-1-4), (AN-2-1), (AN-3-1), (AN-5-1), (AN-6-3), (AN-7-1), (AN-7-2), (AN-8-1), (AN-8-2), (AN-9-3), (AN-10), (AN-13-1), (AN-16-1) and (AN-16-4), and the compounds represented by Formulas (AN-1-4), (AN-2-1), (AN-3-1), (AN-7-2), (AN-10), (AN-13-1) and (AN-16-1) are particularly preferred.

When further improvement in the transmittance is regarded as important, among the acid anhydrides described above, more preferred are the compounds represented by Formulas (AN-1-1), (AN-2-1), (AN-3-1), (AN-4-1), (AN-7-1), (AN-7-2), (AN-10), (AN-11-1) and (AN-16-1), and the compounds represented by Formulas (AB-1-1), (AN-2-1), (AN-3-1) and (AN-16-1) are particularly preferred.

When it is regarded as important to inhibit the volume resistivity from being reduced in long term operation, among the acid anhydrides described above, the compounds represented by Formulas (AN-1-13) and (AN-3-2) are particularly preferred.

Suitable materials for further enhancing the respective characteristics in [B] shall be described.

When further improvement in an aligning property of the liquid crystal is regarded as important, among the acid anhydrides described above, more preferred are the compounds represented by Formulas (AN-1-1), (AN-1-3), (AN-2-1), (AN-3-1), (AN-3-2), (AN-4-5), (AN-4-17), (AN-4-21), (AN-5-1), (AN-7-2), (AN-8-1), (AN-11-3), (AN-16-3) and (AN-16-14), and the compounds represented by Formulas (AN-1-1), (AN-3-2), (AN-4-5), (AN-11-3) and (AN-16-14) are particularly preferred. In (AN-4-17), the compound in which m is 8 is particularly preferred.

When further improvement in a VHR of the liquid crystal display device is regarded as important, among the acid anhydrides described above, more preferred are the alicyclic compounds represented by Formulas (AN-1-1), (AN-1-4), (AN-2-1), (AN-3-1), (AN-5-1), (AN-6-3), (AN-7-1), (AN-7-2), (AN-8-1), (AN-8-2), (AN-9-3), (AN-10), (AN-13-1), (AN-16-1) and (AN-16-3), and the compounds represented by Formulas (AN-1-1), (AN-2-1), (AN-3-1), (AN-7-2), (AN-10) and (AN-13-1) are particularly preferred.

When further improvement in the transmittance is regarded as important, among the acid anhydrides described above, more preferred are the compounds represented by Formulas (AN-1-1), (AN-2-1), (AN-3-1), (AN-4-1), (AN-7-1), (AN-7-2), (AN-10), (AN-11-1) and (AN-16-1), and the compounds represented by Formulas (AN-1-1), (AN-2-1), (AN-3-1) and (AN-16-1) are particularly preferred.

When it is regarded as important to inhibit the volume resistivity from being reduced in long term operation, among the acid anhydrides described above, the compounds represented by Formulas (AN-1-13) and (AN-3-2) are particularly preferred.

<Diamine Having No Photoreactive Structure>

In producing polyamic acid or a derivative thereof of [A] and [B] according to the present invention, diamine compounds other than the diamine compounds having a photoreactive structure described above can be further used in [A], and they can be selected from publicly known diamine compounds without limits. Also, the diamine used in [B] can be selected from publicly known diamine compounds without limits.

In this connection, the structure of the diamine compounds having no photoreactive structure shall be explained. The diamine compounds having no photoreactive structure can be divided into two kinds according to the structure thereof. That is, assuming that a skeleton connecting two amino groups is regarded as a principal chain, the diamine compounds are divided into diamines having a group branching from the principal chain, that is, a side chain group and diamines having no side chain group. The above side chain group is a group having an effect of enlarging the pretilt angle. The side chain group having the above effect has to be a group having 3 or more carbon atoms, and alkyl having 3 or more carbon atoms, alkoxy having 3 or more carbon atoms, alkoxyalkyl having 3 or more carbon atoms and a group having a steroid skeleton can be listed as the specific examples thereof. Groups which have one or more rings and in which a ring at an end thereof has any one of alkyl having one or more carbon atoms, alkoxy having one or more carbon atoms and alkoxyalkyl having 2 or more carbon atoms as a substituent has as well an effect of the side chain group. In the following explanations, diamines having the above side chain group shall be referred to as side chain type diamines. Also, diamines having no such side chain group shall be referred to as non-side chain type diamines.

Proper use of the non-side chain type diamines and the side chain type diamines makes it possible to meet the pretilt angles which are required respectively. The side chain type diamines are preferably used in combination as long as the characteristics of the present invention are not damaged. Also, the side chain type diamines and the non-side chain type diamines are preferably selected and used for the purpose of improving the vertical aligning property to liquid crystal, the voltage holding property, the burn-in characteristic and the photoaligning property.

<Non-Side Chain Type Diamine>

Diamines represented by the following Formulas (DI-1) to (DI-12) can be listed as publicly known diamines having no side chains:

(DI-1)

$H_2N-(CH_2)_m-NH_2$ (DI-2)

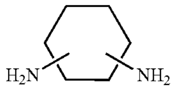

(DI-3)

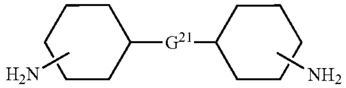

(DI-4)

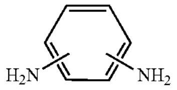

(DI-5)

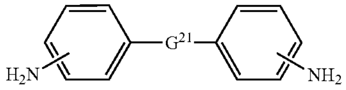

(DI-6)

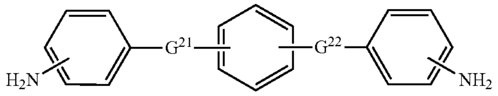

(DI-7)

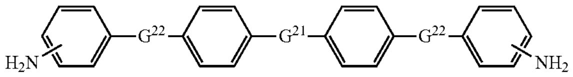

in Formula (DI-1), m is an integer of 1 to 12;

in Formulas (DI-3) and (DI-5) to (DI-7), plural $G^{21}$ each are independently a single bond, —NH—, —O—, —S—, —S—S—, —$SO_2$—, CO—, —CONH—, —NHCO—, —$C(CH_3)_2$—, —$C(CF_3)_2$—, —$C(CH_2)_{m'}$—, —O—$(CH_2)_{m'}$—O—, —$N(CH_3)$—$C(CH_2)_k$—$N(CH_3)$— or —S—$(CH_2)_{m'}$—S—; plural m' each are independently an integer of 1 to 12, and k is an integer of 1 to 5;

in Formulas (DI-6) and (DI-7), plural $G^{22}$ each are independently a single bond, —O—, —S—, CO—, —$C(CH_3)_2$—, —$C(CF_3)_2$— or alkylene having 1 to 10 carbon atoms;

at least one hydrogen of a cyclohexane ring and a benzene ring in Formulas (DI-3) to (DI-7) may be substituted with —F, —$CH_3$, —OH, —$CF_3$, —$CO_2H$—, —$CONH_2$ or benzyl, and in addition thereto, in Formula (DI-4), at least one hydrogen of the benzene ring may be substituted with at least one of groups represented the following Formulas (DI-4-a) to (DI-4-c); groups in which bonding positions are not fixed to carbon atoms constituting the rings show that the bonding positions thereof in the rings are optional; and the bonding position of —$NH_2$ in the cyclohexane ring or the benzene ring is an optional position excluding the bonding position of $G^{21}$ or $G^{22}$;

(DI-4-a)

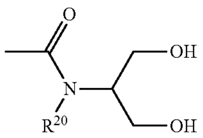

-continued (DI-4-b)

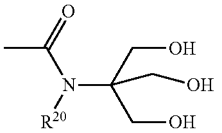

(DI-4-c)

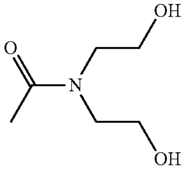

in Formulas (DI-4-a) and (DI-4-b), plural $R^{20}$ each are independently hydrogen or —$CH_3$;

(DI-8)

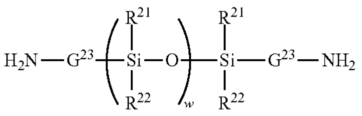

(DI-9)

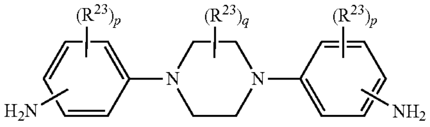

(DI-10)

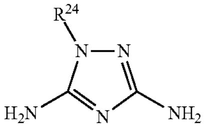

(DI-11)

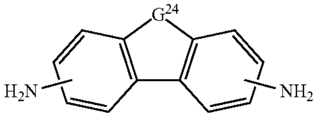

(DI-12)

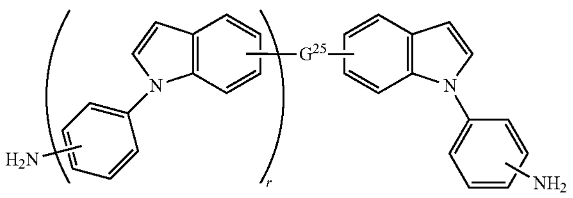

in Formula (DI-8), $R^{21}$ and $R^{22}$ each are independently alkyl having 1 to 3 carbon atoms or phenyl;

plural $G^{23}$ each are independently alkylene having 1 to 6 carbon atoms, phenylene or phenylene substituted with alkyl;

w is an integer of 1 to 10;

in Formula (DI-9), plural $R^{23}$ each are independently alkyl having 1 to 5 carbon atoms, alkoxy having 1 to 5 carbon atoms or Cl; plural p each are independently an integer of 0 to 3, and q is an integer of 0 to 4; 0 in Formula (DI-10), $R^{24}$ is hydrogen, alkyl having 1 to 4 carbon atoms, phenyl or benzyl;

in Formula (DI-11), $G^{24}$ is —$CH_2$— or —NH—;

in Formula (DI-12), $G^{25}$ is a single bond, alkylene having 2 to 6 carbon atoms or 1,4-phenylene; and r is 0 or 1; and groups in which bonding positions are not fixed to any of carbon atoms constituting the rings show that the bonding positions thereof in the rings are optional;

in Formulas (DI-9), (DI-11) and (DI-12), the bonding positions of —$NH_2$ bonded to the benzene rings are optional positions.

Compounds represented by the following Formulas (DI-1-1) to (DI-12-1) can be listed as the specific examples of the diamines having no side chain groups represented by Formulas (DI-1) to (DI-12) described above.

The examples of the diamines represented by Formulas (DI-1) to (DI-3) are shown below:

(DI-1-1)

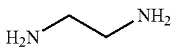

(DI-1-2)

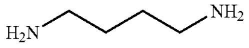

(DI-1-3)

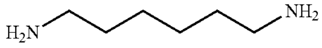

(DI-2-1)

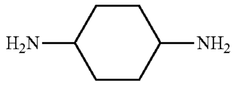

(DI-2-2)

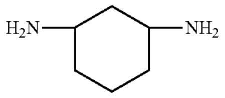

(DI-3-1)

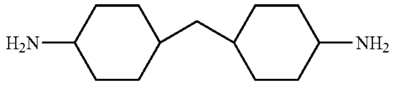

(DI-3-2)

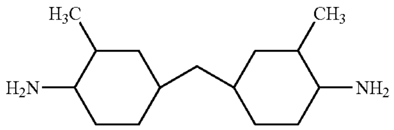

(DI-3-3)

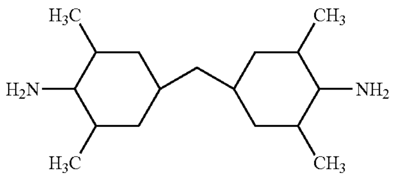

The examples of the diamine represented by Formula (DI-4) are shown below:

(DI-4-1)

(DI-4-2)

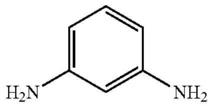

(DI-4-3)

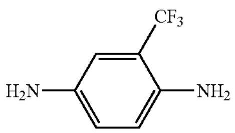

-continued (DI-4-4)

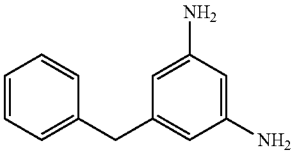

(DI-4-5)

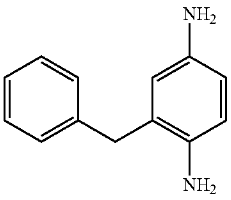

(DI-4-6)

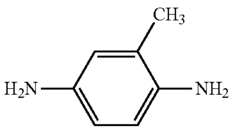

(DI-4-7)

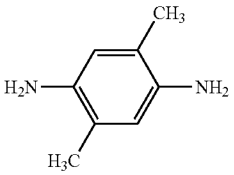

(DI-4-8)

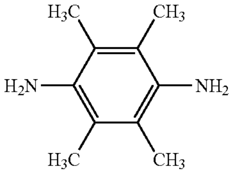

(DI-4-9)

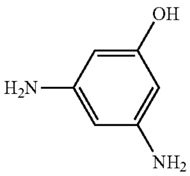

(DI-4-10)

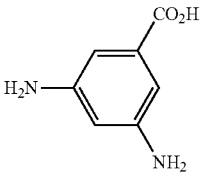

(DI-4-11)

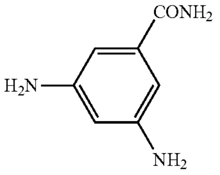

-continued
(DI-4-12)
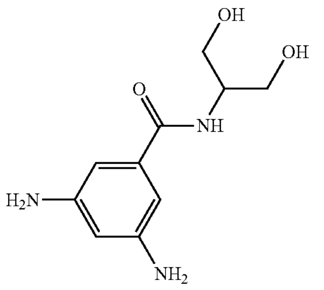
(DI-4-13)
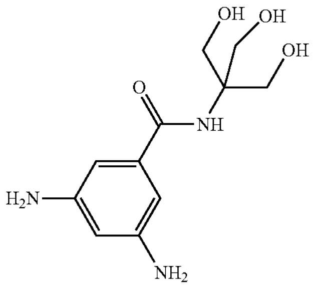
(DI-4-14)
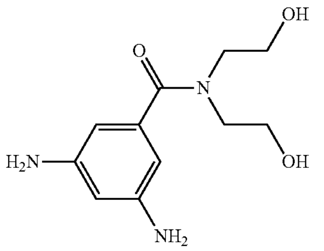
The examples of the diamine represented by Formula (DI-5) are shown below:
(DI-5-1)
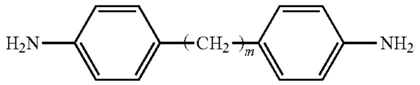
(DI-5-2)
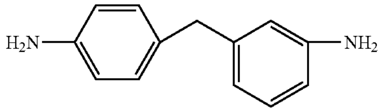
(DI-5-3)
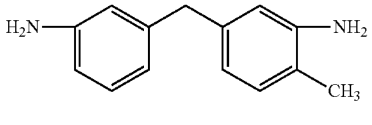
(DI-5-4)
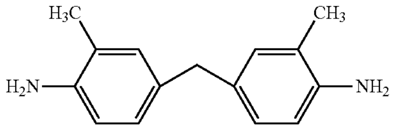
(DI-5-5)
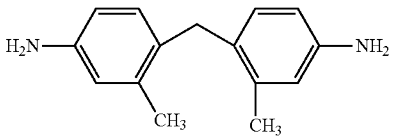
-continued
(DI-5-6)
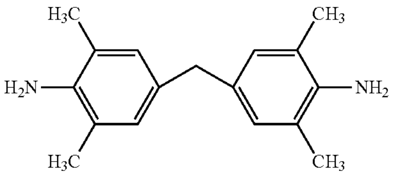
(DI-5-7)
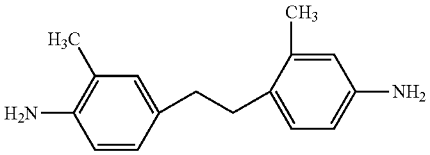
(DI-5-8)
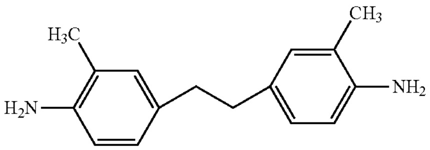
in Formula (DI-5-1), m is an integer of 1 to 12;
(DI-5-9)
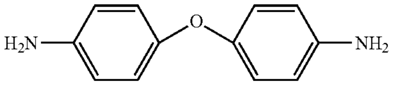
(DI-5-10)
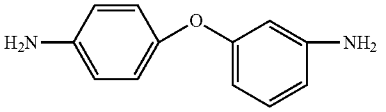
(DI-5-11)
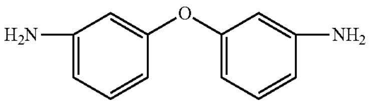
(DI-5-12)
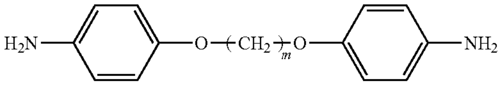
in Formula (DI-5-12), m is an integer of 1 to 12;
(DI-5-13)
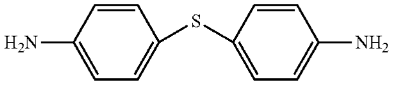
(DI-5-14)
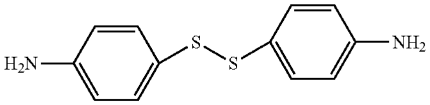
(DI-5-15)
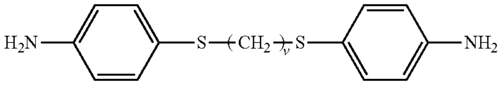

-continued
(DI-5-16)
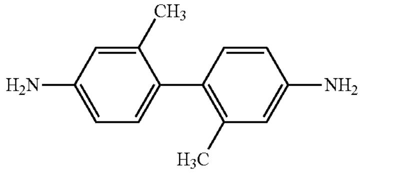
(DI-5-17)
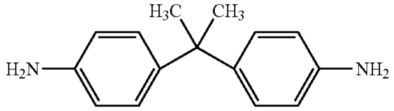
(DI-5-18)
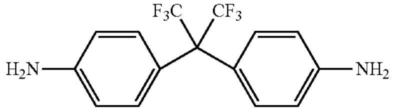
(DI-5-19)
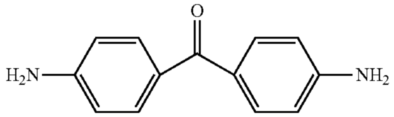
(DI-5-20)
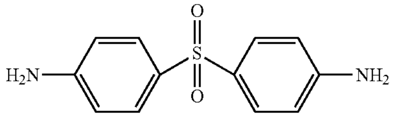
in Formula (DI-5-15), v is an integer of 1 to 6;
(DI-5-21)
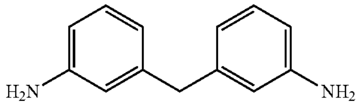
(DI-5-22)
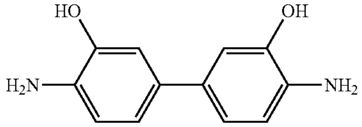
(DI-5-23)
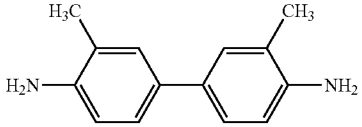
(DI-5-24)
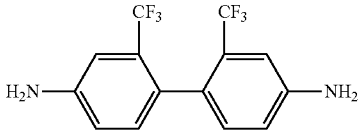
(DI-5-25)
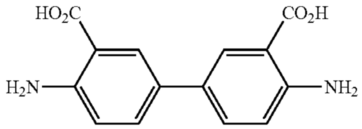
(DI-5-26)
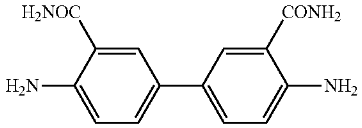
-continued
(DI-5-27)
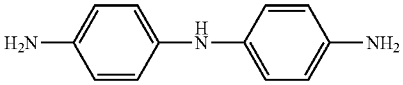
(DI-5-28)
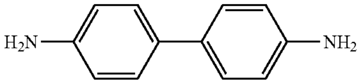
(DI-5-29)
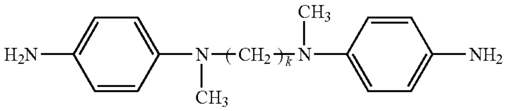
(DI-5-30)
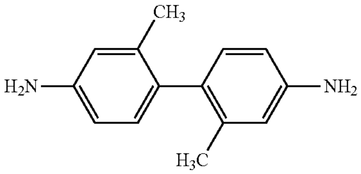
in Formula (DI-5-29), k is an integer of 1 to 5.
The examples of the diamine represented by Formula (DI-6) are shown below:
(DI-6-1)
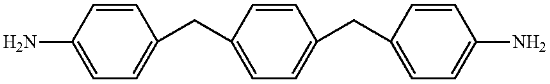
(DI-6-2)
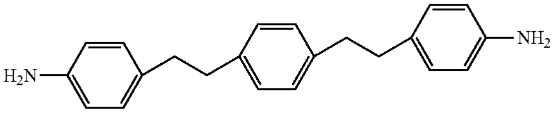
(DI-6-3)
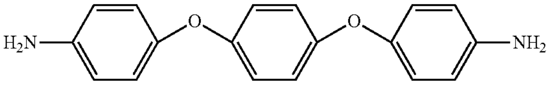
(DI-6-4)
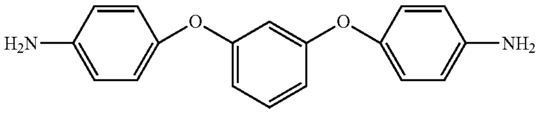
(DI-6-5)
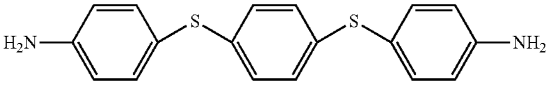
(DI-6-6)
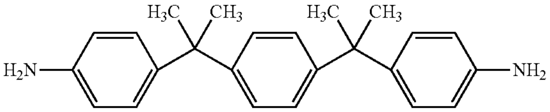
(DI-6-7)

The examples of the diamine represented by Formula (DI-7) are shown below:
(DI-7-1)
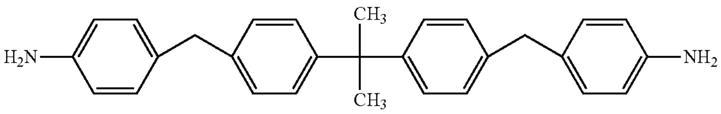
(DI-7-2)
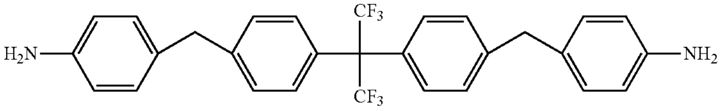
(DI-7-3)
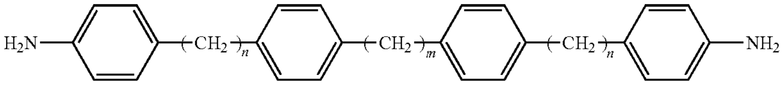
(DI-7-4)
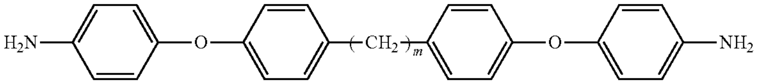
(DI-7-5)
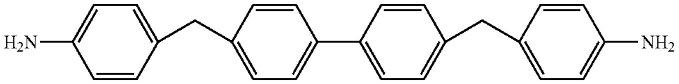
in Formula (DI-7-3) and (DI-7-4), m is an integer of 1 to 12, and plural n each are independently 1 or 2;
(DI-7-6)
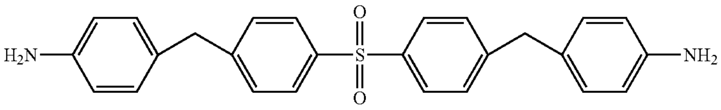
(DI-7-7)
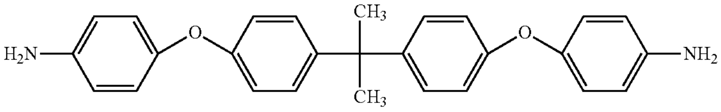
(DI-7-8)
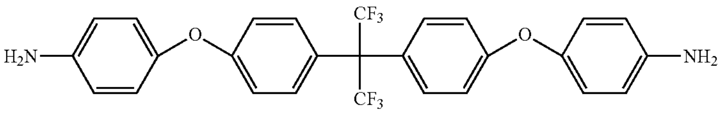
(DI-7-9)
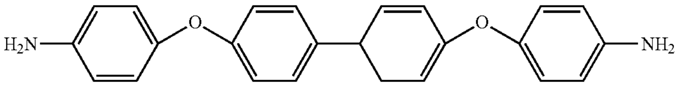
(DI-7-10)
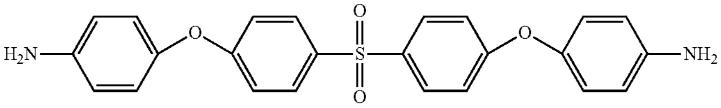

The example of the diamine represented by Formula (DI-8) is shown below:
(DI-8-1)
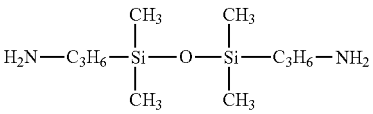
The examples of the diamine represented by Formula (DI-9) are shown below:
(DI-9-1)
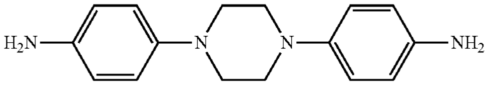
(DI-9-2)
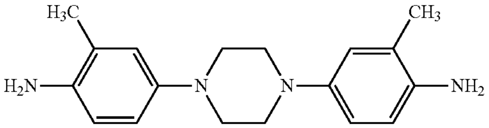
(DI-9-3)
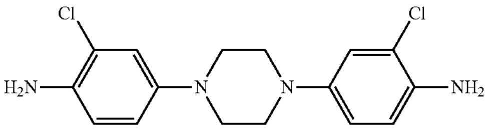
(DI-9-4)
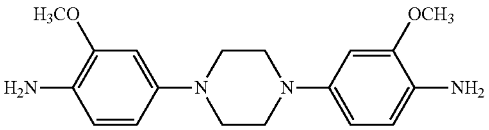
(DI-9-5)
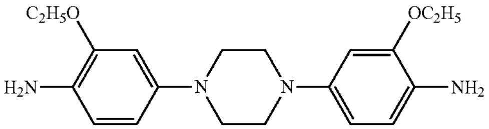
(DI-9-6)
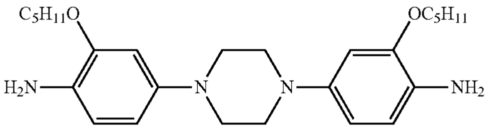
(DI-9-7)
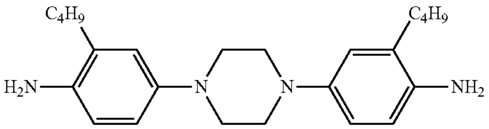
(DI-9-8)
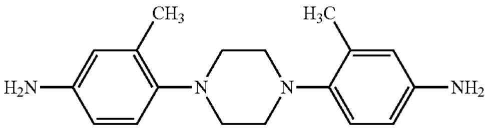
-continued
(DI-9-9)
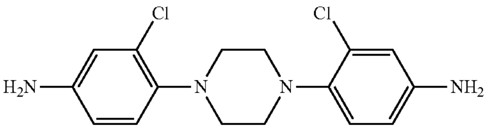
(DI-9-10)
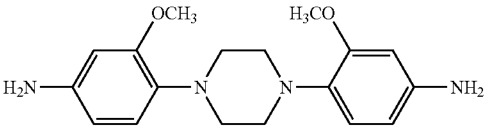
(DI-9-11)
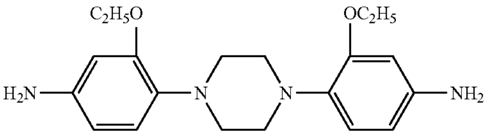
(DI-9-12)
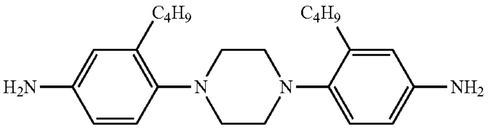
(DI-9-13)
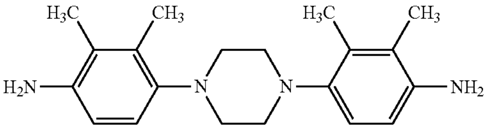
The examples of the diamine represented by Formula (DI-10) are shown below:
(DI-10-1)
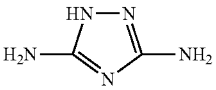
(DI-10-2)
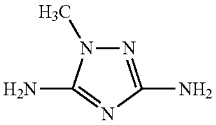
(DI-10-3)
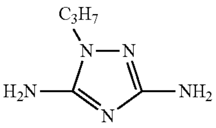
The examples of the diamine represented by Formula (DI-11) are shown below:
(DI-11-1)
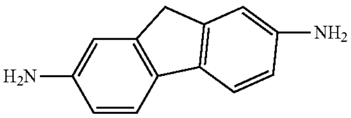

-continued (DI-11-2)

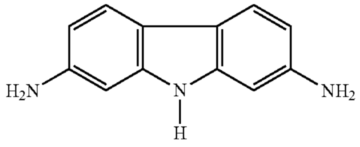

The example of the diamine represented by Formula (DI-12) is shown below:

(DI-12-1)

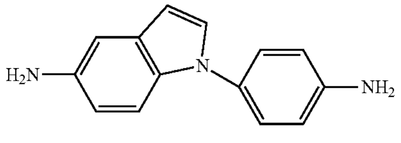

The above non-side chain type diamines have the effect of improving the electric characteristics such as a reduction in an ion density of the liquid crystal display device. When the non-side chain type diamine is used as a raw material for [A] used for the liquid crystal aligning agent of the present invention, a proportion thereof based on a whole amount of the diamines is 0 to 70 mole %, preferably 0 to 50 mole % and more preferably 0 to 30 mole % because of the reasons that priority is put on a photoaligning property of the aligning layer and that priority is put on a content of the diamine having a photoreactive structure. When the non-side chain type diamine is used as a raw material for [B], a proportion thereof is not specifically limited, and therefore it may be 100% by mole.

<Side Chain Type Diamine>

The following groups can be listed as the side chain group of the side chain type diamine.

The side chain group includes alkyl, alkyloxy, alkyloxyalkyl, alkylcarbonyl, alkylcarbonyloxy, alkyloxycarbonyl, alkylaminocarbonyl, alkenyl, alkenyloxy, alkenylcarbonyl, alkenylcarbonyloxy, alkenyloxycarbonyl, alkenylaminocarbonyl, alkynyl, alkynyloxy, alkynylcarbonyl, alkynylcarbonyloxy, alkynyloxycarbonyl, alkynylaminocarbonyl and the like. All of alkyl, alkenyl and alkynyl in the above groups are groups having 3 or more carbon atoms. In a case of the alkyloxyalkyl, the group may have 3 or more carbon atoms in total of the group. The above groups may be either linear or branched.

Next, on the condition that the ring at the end has alkyl having one or more carbon atoms, alkoxy having one or more carbon atoms or alkyloxyalkyl having 2 or more carbon atoms as a substituent, capable of being listed are groups of a ring structure, such as phenyl, phenylalkyl, phenylalkyloxy, phenylcarbonyl, phenylcarbonyloxy, phenyloxycarbonyl, phenylaminocarbonyl, phenylcyclohexyloxy, cycloalkyl having 3 or more carbon atoms, cyclohexylalkyl, cyclohexyloxy, cycloxexyloxycarbonyl, cyclohexylphenyl, cyclohexylphenylalkyl, cyclohexylphenyloxy, bis(cyclohexyl)oxy, bis(cyclohexyl)alkyl, bis(cyclohexyl)phenyl, bis(cyclohexyl)phenylalkyl, bis(cyclohexyl)oxycarbonyl, bis(cyclohexyl)phenyloxycarbonyl, cyclohexylbis(phenyl)oxycarbonyl and the like.

Further, capable of being listed are ring-condensed groups which are a group having 2 or more benzene rings, a group having 2 or more cyclohexane rings or a bicyclic or more group constituted by a benzene ring and a cyclohexane ring, wherein plural bonding groups each are independently a single bond, —O—, —COO—, —OCO—, —CONH— or alkylene having 1 to 3 carbon atoms, and the ring at the end has alkyl having one or more carbon atoms, fluorine-substituted alkyl having one or more carbon atoms, alkoxy having one or more carbon atoms or alkyloxyalkyl having 2 or more carbon atoms as a substituent. Groups having a steroid skeleton are also effective as the side chain group.

Diamines represented by the following Formulas (DI-13) to (DI-17) can be listed as the diamines having side chains:

(DI-13)

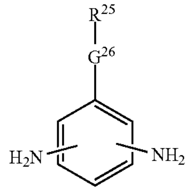

in Formula (DI-13), $G^{26}$ is a single bond, —O—, —COO—, —OCO—, —CO—, —CONH—, —$CH_2O$—, —$OCH_2$—, —$CF_2O$—, —$OCF_2$— or —O—$(CH_2)_{m'}$—, and m' is an integer of 1 to 12; the preferred examples of $G^{26}$ are a single bond, —O—, —COO—, —OCO—, —$CH_2O$— and alkylene having 1 to 3 carbon atoms, and the particularly preferred examples are a single bond, —O—, —COO—, —OCO—, —$CH_2O$—, —$CH_2$— and —$CH_2CH_2$—;

$R^{25}$ is alkyl having 3 to 30 carbon atoms, phenyl, a group having a steroid skeleton or a group represented by the following Formula (DI-13-a); in the above alkyl, at least one hydrogen may be substituted with —F, and at least one —$CH_2$— may be substituted with —O—, —CH═CH— or —C≡CH—; hydrogen of the above phenyl may be substituted with —F, —$CH_3$, —$OCH_3$, —$OCH_2F$, —$OCHF_2$, —$OCF_3$, alkyl having 3 to 30 carbon atoms or alkoxy having 3 to 30 carbon atoms; hydrogen of the above cyclohexyl may be substituted with alkyl having 3 to 30 carbon atoms or alkoxy having 3 to 30 carbon atoms; the bonding position of —$NH_2$ bonded to the benzene ring shows that it is an optional position in the above ring, and the bonding position thereof is preferably meta or para; that is, assuming that the bonding position of a group of "$R^{25}$-$G^{26}$-" is a 1-position, the two bonding positions are preferably a 3-position and a 5-position or a 2-position and a 5-position;

(DI-13-a)

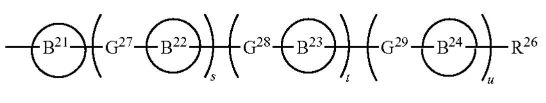

in Formula (DI-13-a), $G^{27}$, $G^{28}$ and $G^{29}$ are a bonding group, and they each are independently a single bond or alkylene having 1 to 12 carbon atoms; at least one —$CH_2$— in the above alkylene may be substituted with —O—, —COO—, —OCO—, —CONH— or —CH═CH—; a ring $B^{21}$, a ring $B^{22}$, a ring $B^{23}$ and a ring $B^{24}$ each are independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,7-diyl or anthracene-9,10-diyl; in the ring $B^{21}$, the ring $B^{22}$, the ring $B^{23}$ and the ring $B^{24}$, at least one hydrogen may be substituted with —F or —$CH_3$;

s, t and u each are independently an integer of o to 2, and a total thereof is 1 to 5;

when s, t or u is 2, two bonding groups in each parenthesis may be the same or different, and two rings may be the same or different;

$R^{26}$ is —F, —OH, alkyl having 1 to 30 carbon atoms, fluorine-substituted alkyl having 1 to 30 carbon atoms, alkoxy having 1 to 30 carbon atoms, —CN, —$OCH_2F$, —$OCHF_2$ or —$OCF_3$, and at least one —$CH_2$— of the above alkyl having 1 to 30 carbon atoms may be substituted with a divalent group represented by the following Formula (DI-13-b):

(DI-13-b)

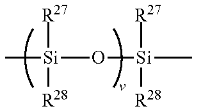

in Formula (DI-13-b), $R^{27}$ and $R^{28}$ each are independently alkyl having 1 to 3 carbon atoms; v is an integer of 1 to 6; and the preferred examples of $R^{26}$ are alkyl having 1 to 30 carbon atoms and alkoxy having 1 to 30 carbon atoms;

(DI-14)

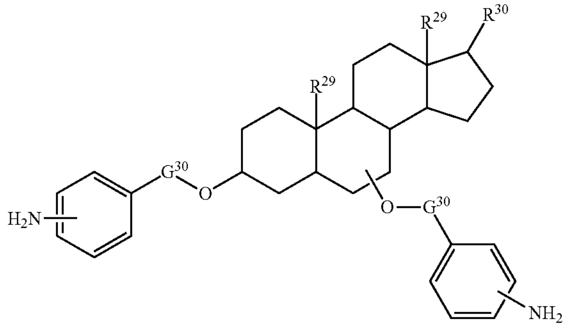

(DI-15)

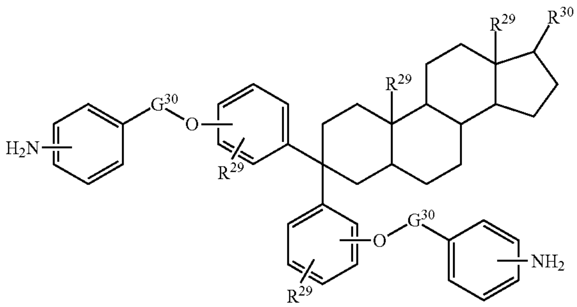

in Formulas (DI-14) and (DI-15), plural $G^{30}$ each are independently a single bond, —CO— or —$CH_2$—;

plural $R^{29}$ each are independently hydrogen or —$CH_3$;

$R^{30}$ is hydrogen, alkyl having 1 to 20 carbon atoms or alkenyl having 2 to 20 carbon atoms;

at least one hydrogen of a benzene ring in Formula (DI-15) may be substituted with alkyl having 1 to 20 carbon atoms or phenyl; groups in which bonding positions are not fixed to any of carbon atoms constituting the rings show that the bonding positions thereof in the rings are optional;

one of two groups "-phenylene-$G^{30}$-O—" in Formula (DI-14) is bonded preferably to a 3-position of a steroid nucleus, and the other is bonded preferably to a 6-position thereof; the bonding position of two groups "-phenylene-$G^{30}$-O—" to the benzene ring in Formula (DI-15) is preferably a meta position or a para position respectively to the bonding position of the steroid nucleus;

in Formula (DI-14) and Formula (DI-15), —$NH_2$ bonded to the benzene ring shows that the bonding position thereof in the ring is optional:

(DI-16)

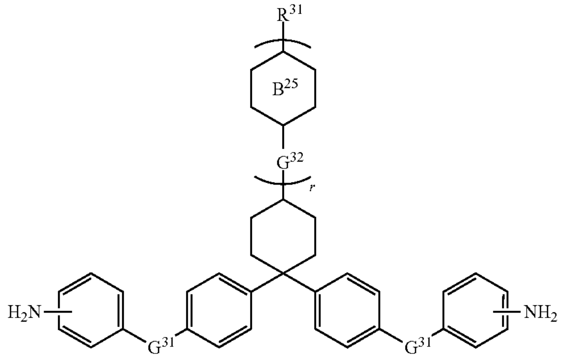

(DI-17)

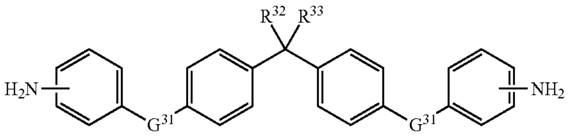

in Formula (DI-16) and Formula (DI-17), plural $G^{31}$ each are independently —O— or alkylene having 1 to 6 carbon atoms;

$G^{32}$ is a single bond or alkylene having 1 to 3 carbon atoms;

$R^{31}$ is hydrogen or alkyl having 1 to 20 carbon atoms, and at least one —$CH_2$— of the above alkyl may be substituted with —O—, —CH=CH— or —C≡CH—; $R^{32}$ is alkyl having 6 to 22 carbon atoms;

$R^{33}$ is hydrogen or alkyl having 1 to 22 carbon atoms;

a ring $B^{25}$ is 1,4-phenylene or 1,4-cyclohexylene; r is 0 or 1;

—$NH_2$ bonded to the benzene ring shows that the bonding position thereof in the ring is optional, and plural bonding positions thereof each are independently preferably a meta position or a para position to the bonding position of $G^{29}$.

The specific examples of the side chain type diamines are shown below.

Diamines represented by the following Formulas (DI-13-1) to (DI-17-3) can be listed as the diamines having side chains represented by Formulas (DI-13) to (DI-17) described above.

The examples of the compound represented by Formula (DI-13) are shown below:

(DI-13-1)

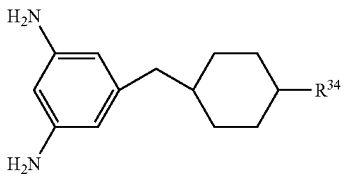

-continued
(DI-13-2)
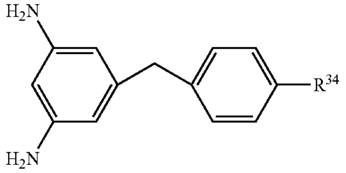
(DI-13-3)
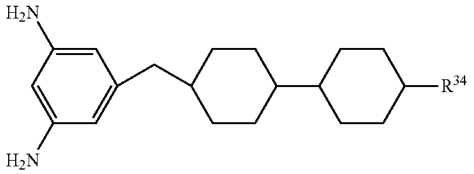
(DI-13-4)
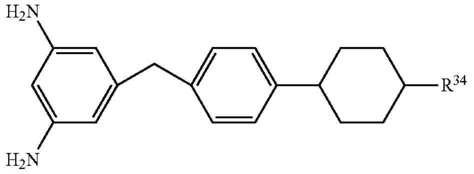
(DI-13-5)
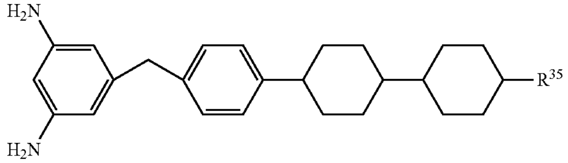
(DI-13-6)
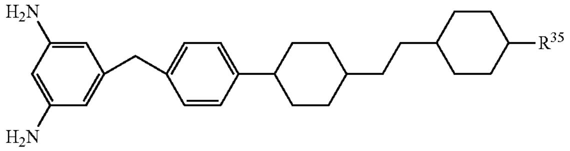
(DI-13-7)
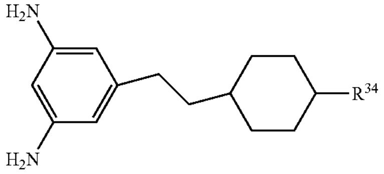
(DI-13-8)
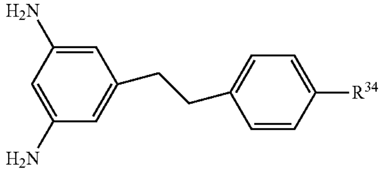
(DI-13-9)
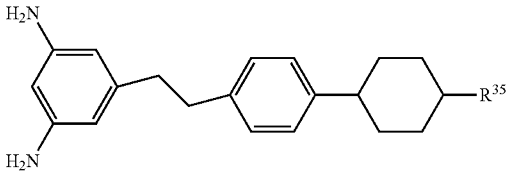
-continued
(DI-13-10)
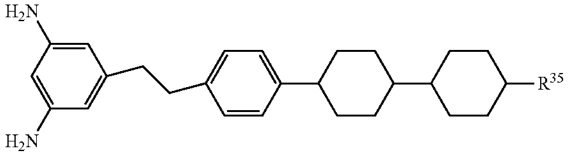
(DI-13-11)
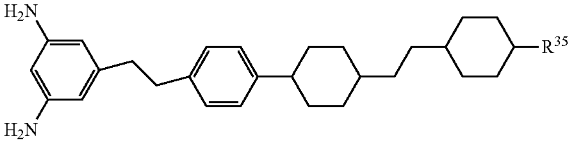
In Formulas (DI-13-1) to (DI-13-11), $R^{34}$ is alkyl having 1 to 30 carbon atoms or alkoxy having 1 to 30 carbon atoms, preferably alkyl having 5 to 25 carbon atoms or alkoxy having 5 to 25 carbon atoms. $R^{35}$ is alkyl having 1 to 30 carbon atoms or alkoxy having 1 to 30 carbon atoms, preferably alkyl having 3 to 25 carbon atoms or alkoxy having 3 to 25 carbon atoms.
(DI-13-12)
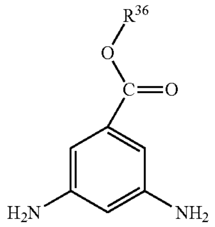
(DI-13-13)
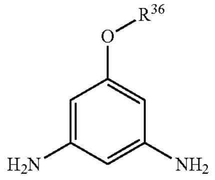
(DI-13-14)
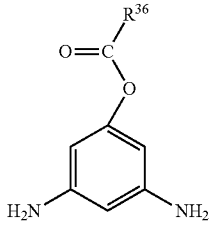
(DI-13-15)
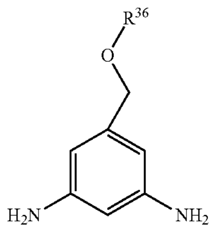

-continued
(DI-13-16)
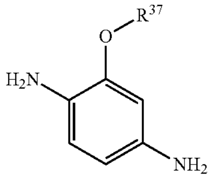
(DI-13-17)
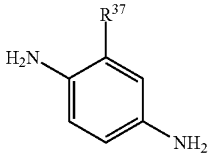
In Formulas (DI-13-12) to (DI-13-17), $R^{36}$ is alkyl having 4 to 30 carbon atoms, preferably alkyl having 6 to 25 carbon atoms. $R^{37}$ is alkyl having 6 to 30 carbon atoms, preferably alkyl having 8 to 25 carbon atoms.
(DI-13-18)
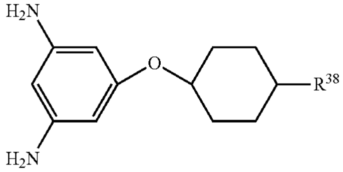
(DI-13-19)
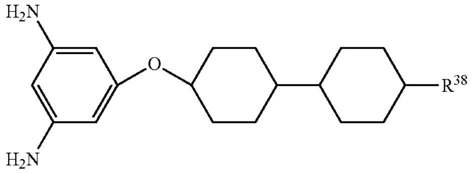
(DI-13-20)
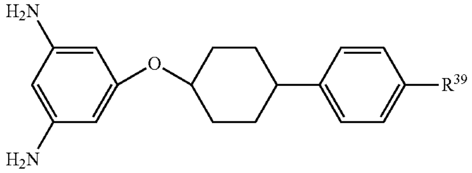
(DI-13-21)
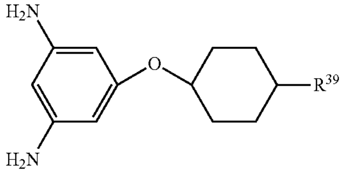
(DI-13-22)
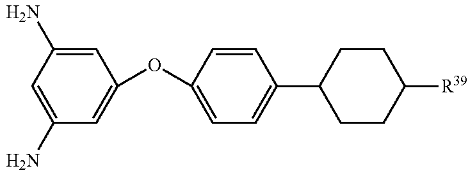
-continued
(DI-13-23)
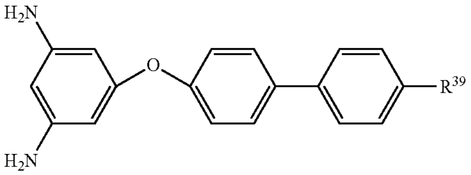
(DI-13-24)
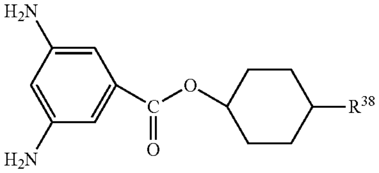
(DI-13-25)
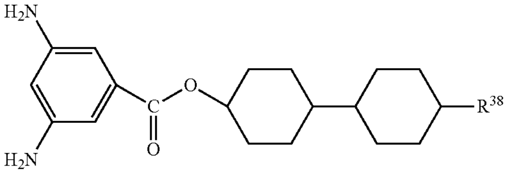
(DI-13-26)
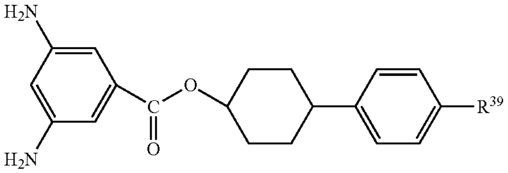
(DI-13-27)
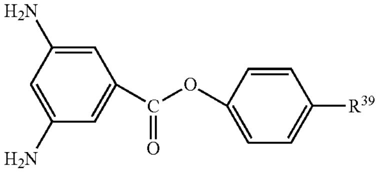
(DI-13-28)
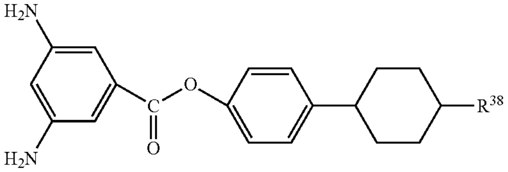
(DI-13-29)
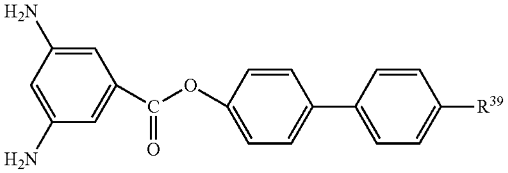
(DI-13-30)
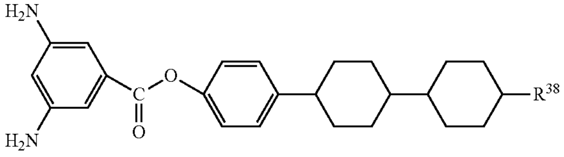

-continued (DI-13-31)

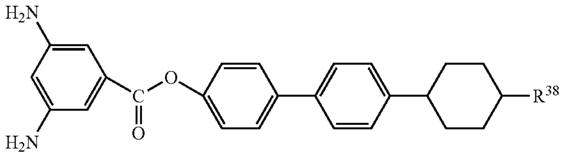

(DI-13-32)

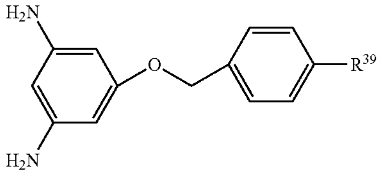

(DI-13-33)

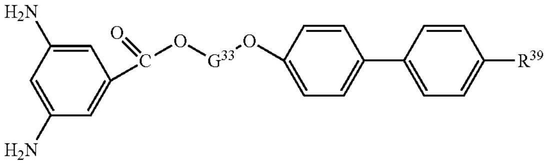

(DI-13-34)

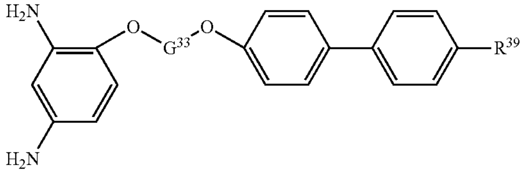

(DI-13-35)

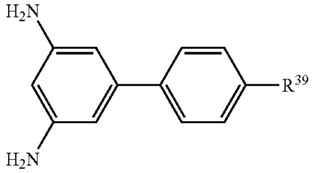

(DI-13-36)

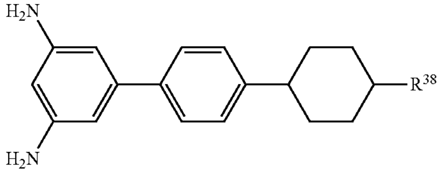

(DI-13-37)

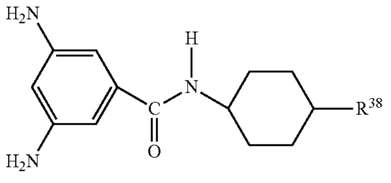

(DI-13-38)

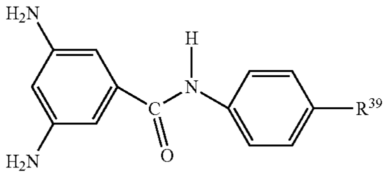

-continued (DI-13-39)

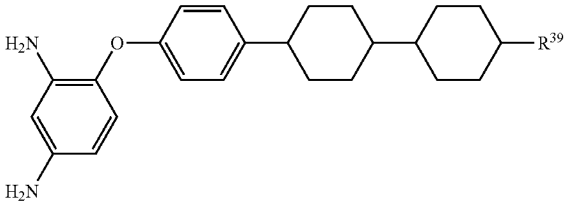

(DI-13-40)

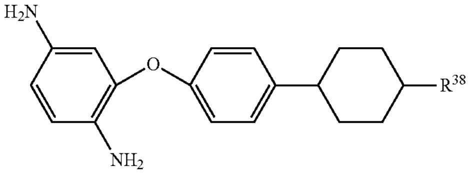

(DI-13-41)

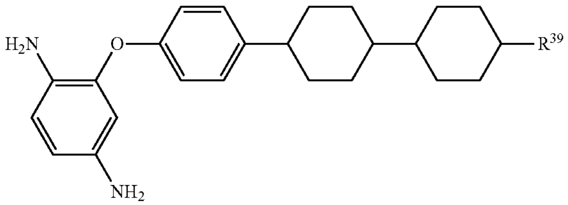

(DI-13-42)

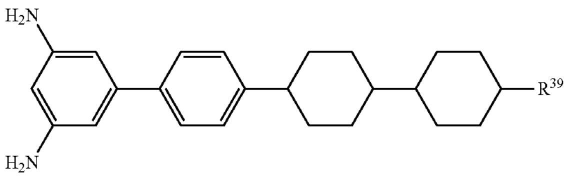

(DI-13-43)

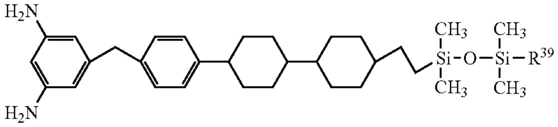

In Formulas (DI-13-18) to (DI-13-43), $R^{38}$ is alkyl having 1 to 20 carbon atoms or alkoxy having 1 to 20 carbon atoms, preferably alkyl having 3 to 20 carbon atoms or alkoxy having 3 to 20 carbon atoms. $R^{39}$ is hydrogen, —F, alkyl having 1 to 30 carbon atoms, alkoxy having 1 to 30 carbon atoms, —CN, $—OCH_2F$, $—OCHF_2$ or $—OCF_3$, preferably alkyl having 3 to 25 carbon atoms or alkoxy having 3 to 25 carbon atoms. $G^{33}$ is alkylene having 1 to 20 carbon atoms.

(DI-13-44)
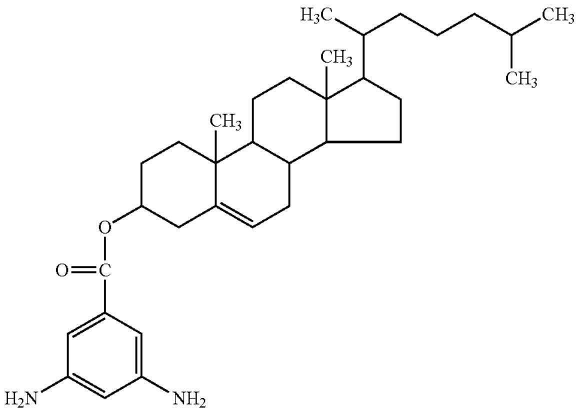
(DI-13-45)
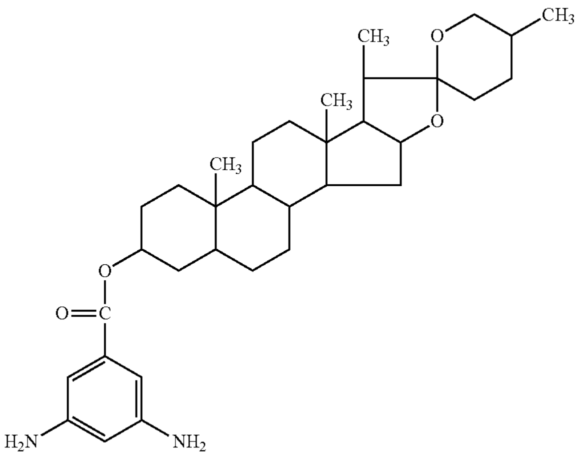
(DI-13-46)
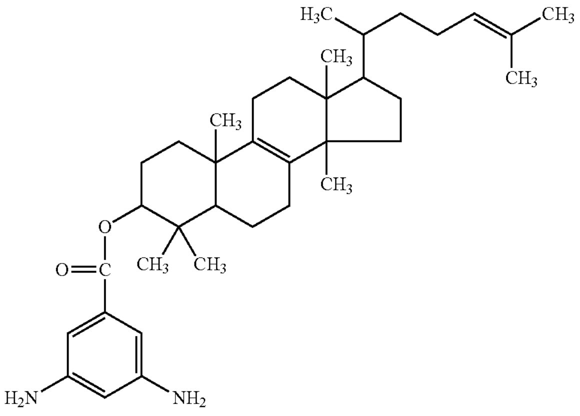
-continued
(DI-13-47)
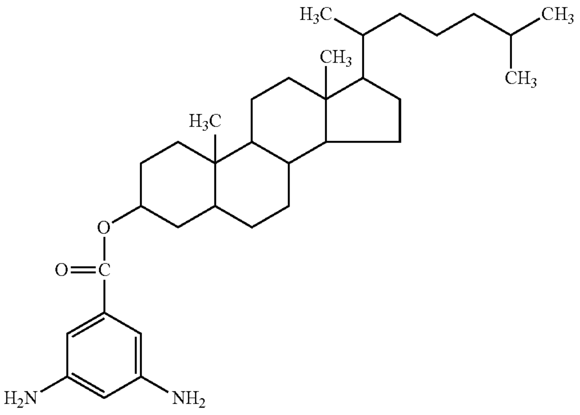
(DI-13-48)
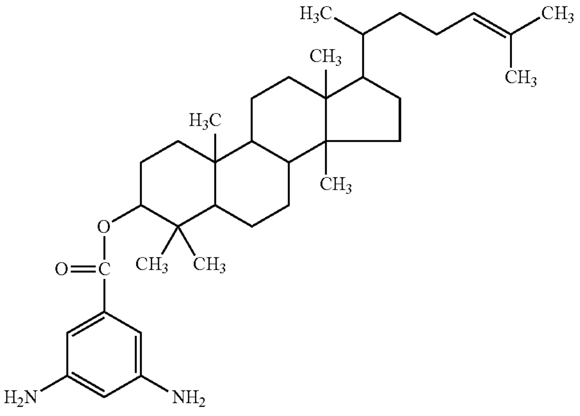
(DI-13-49)
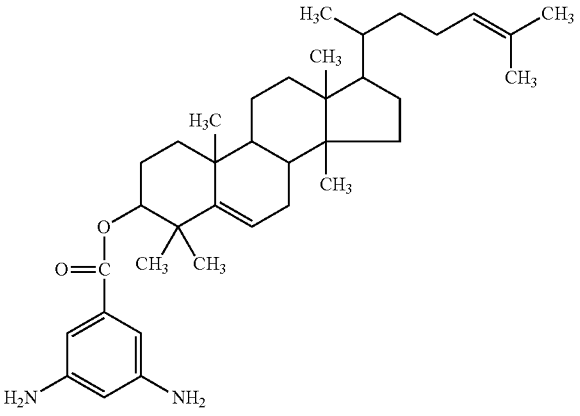

-continued
(DI-13-50)
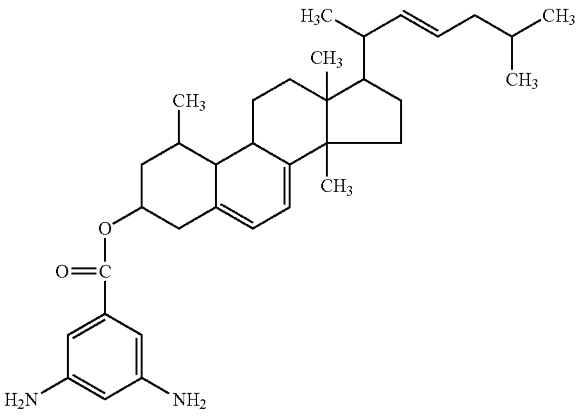
(DI-13-51)
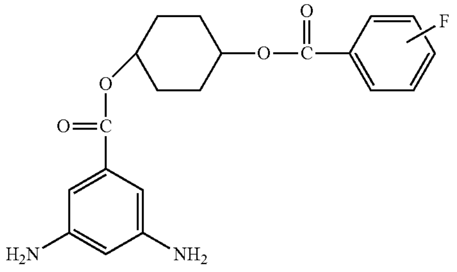
(DI-13-52)
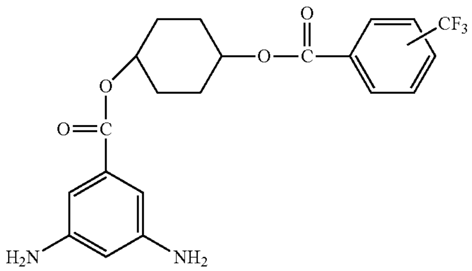
-continued
(DI-13-53)
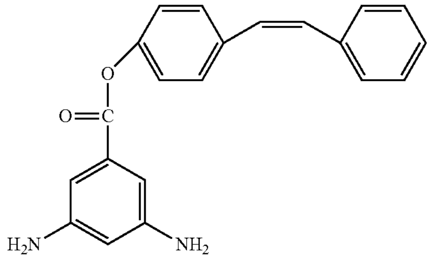
(DI-13-54)
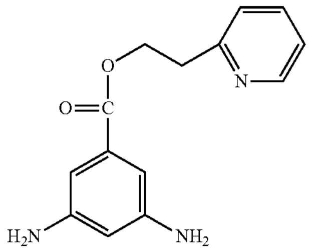
(DI-13-55)
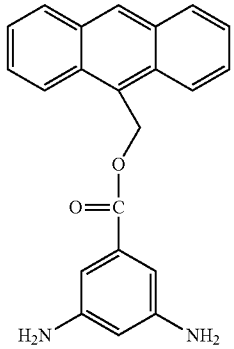
The examples of the compound represented by Formula (DI-14) are shown below:

-continued
(DI-14-1)
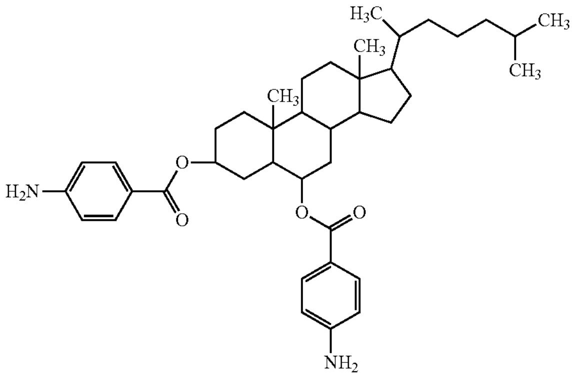
(DI-14-2)
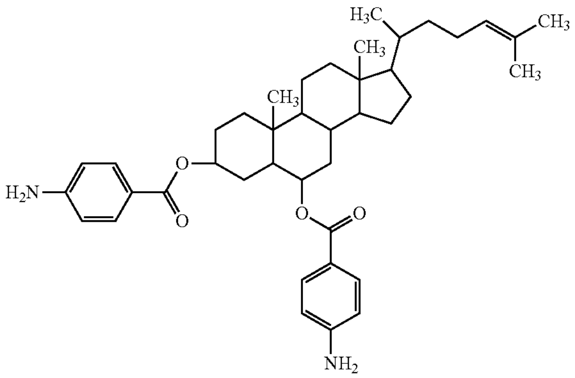
(DI-14-3)
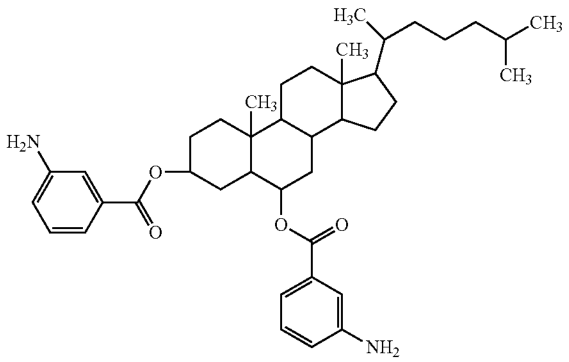
(DI-14-4)
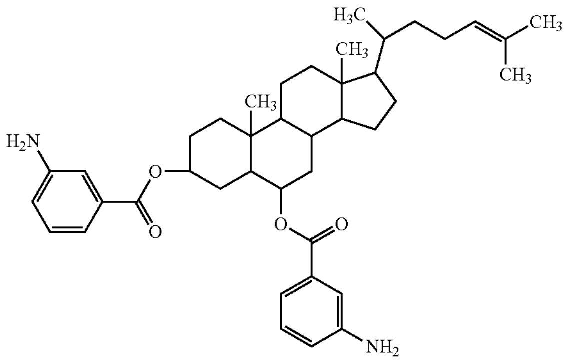
The examples of the compound represented by Formula (DI-15) are shown below:
(DI-15-1)
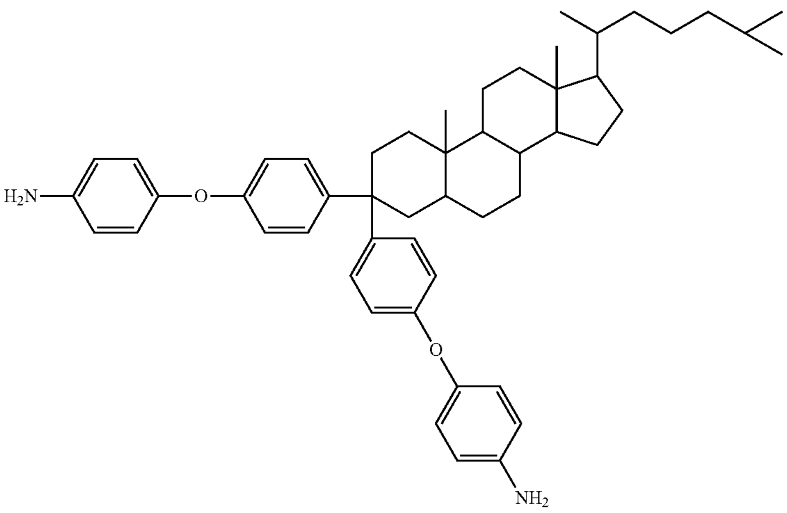

-continued
(DI-15-2)
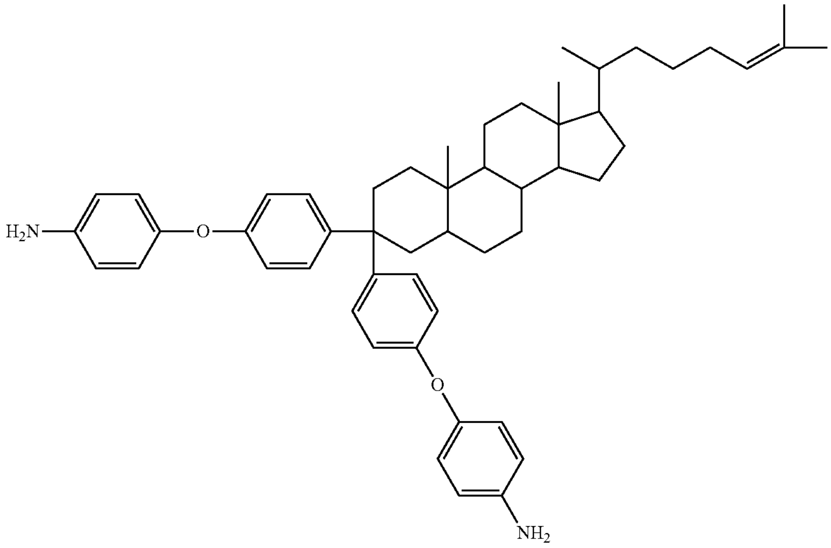
(DI-15-3)
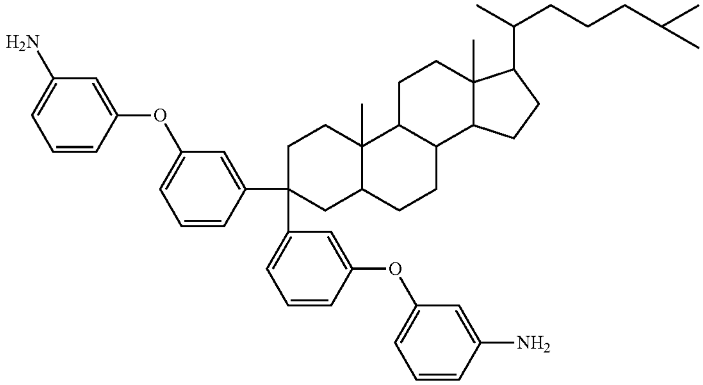
(DI-15-4)
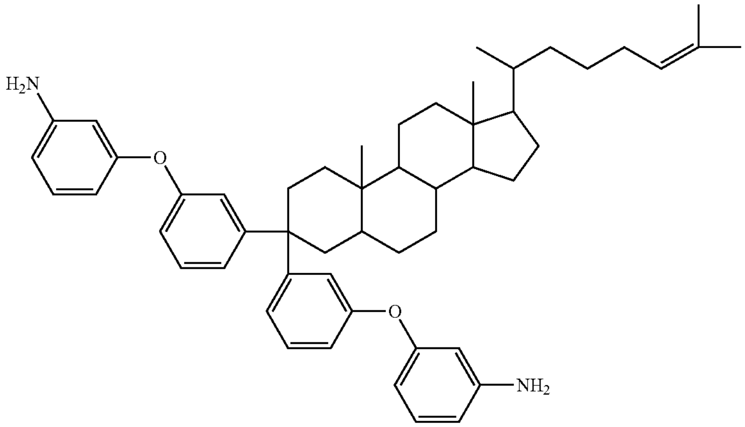

-continued
(DI-15-5)
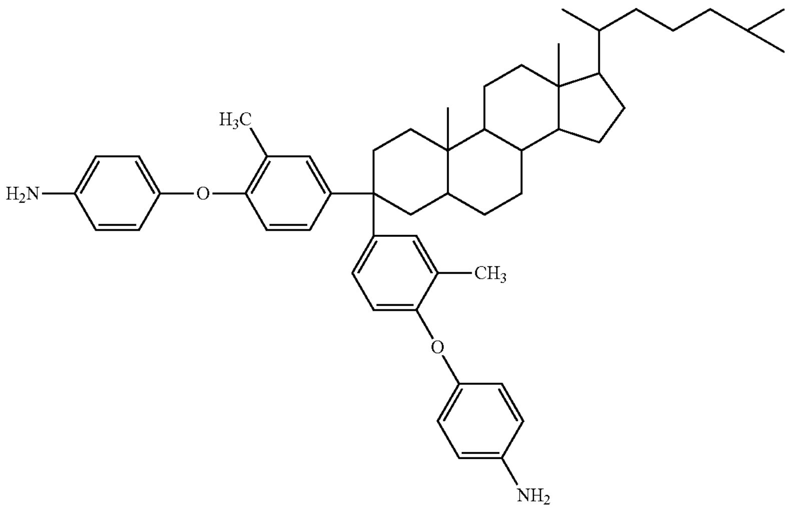
(DI-15-6)
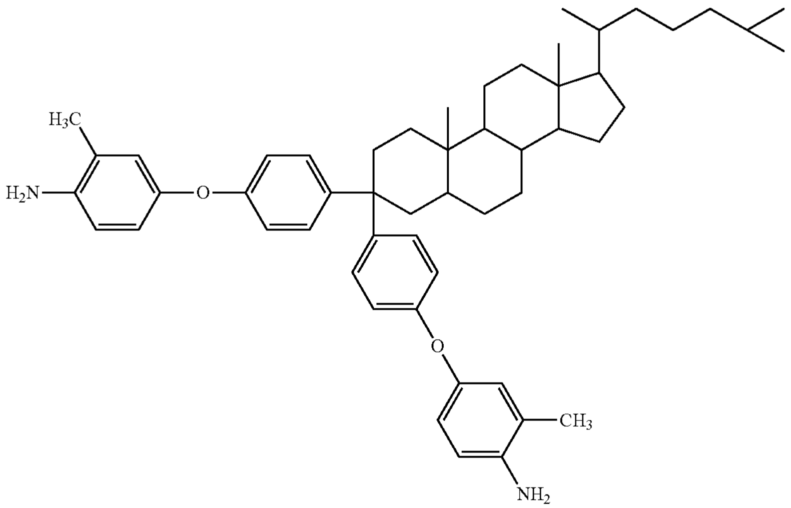
(DI-15-7)
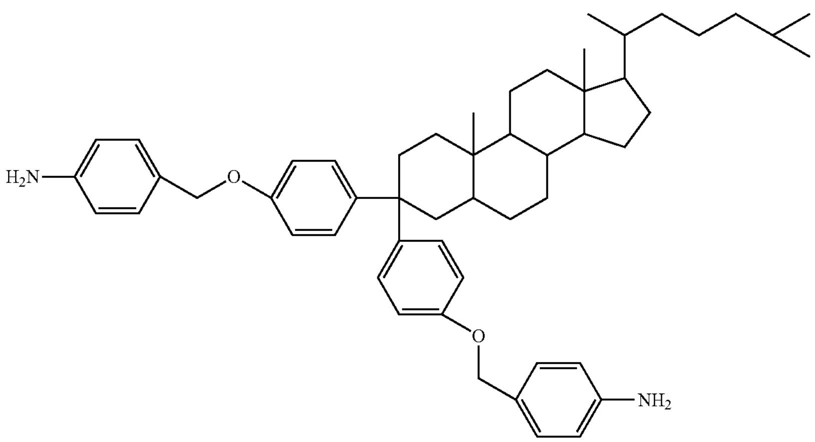

-continued
(DI-15-8)
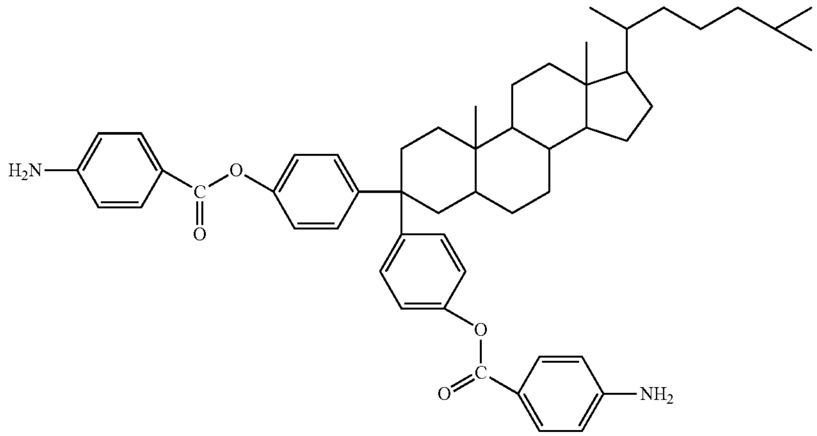
The examples of the compound represented by Formula (DI-16) are shown below:
(DI-16-1)
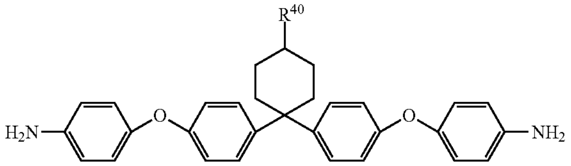
(DI-16-2)
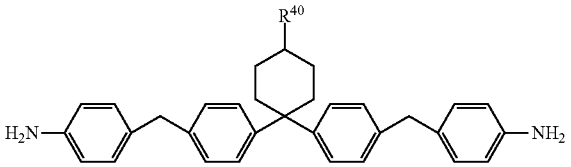
(DI-16-3)
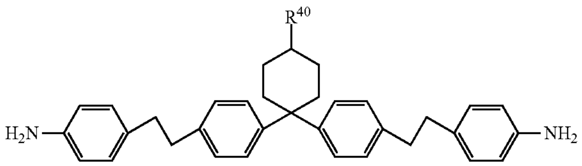
(DI-16-4)
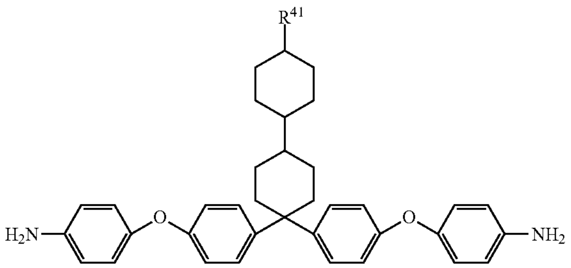
-continued
(DI-16-5)
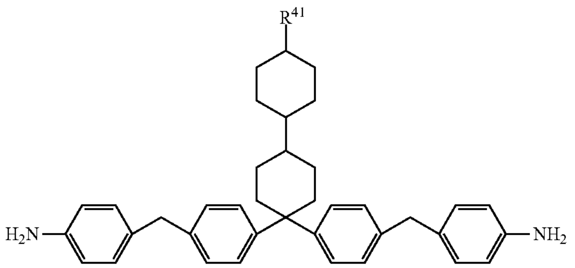
(DI-16-6)
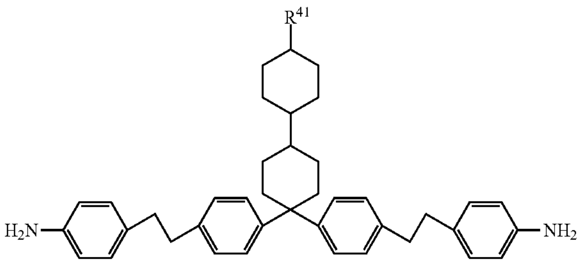
(DI-16-7)
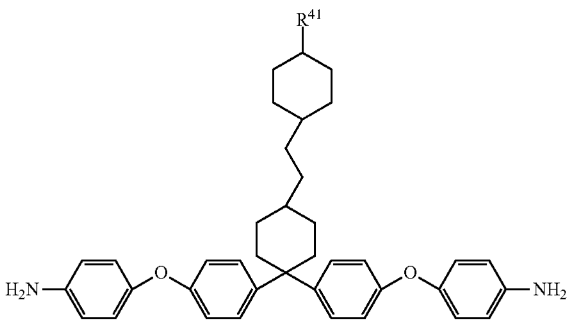

-continued
(DI-16-8)
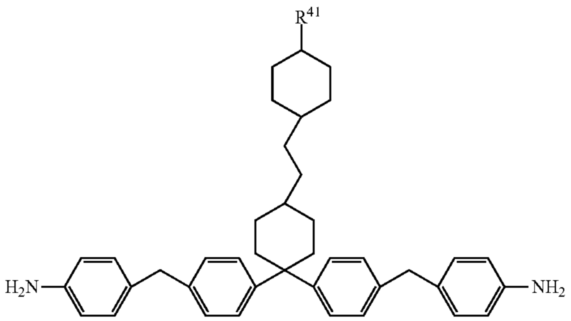
(DI-16-9)
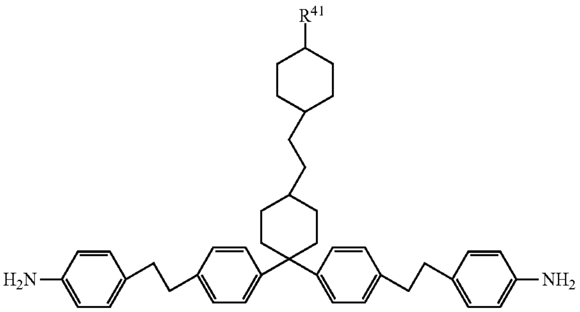
(DI-16-10)
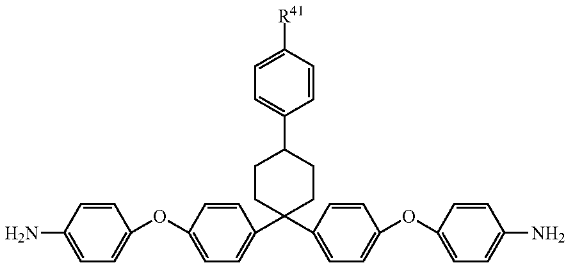
-continued
(DI-16-11)
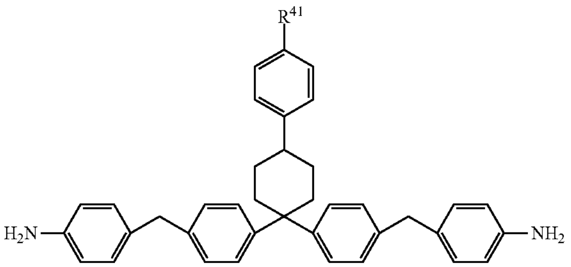
(DI-16-12)
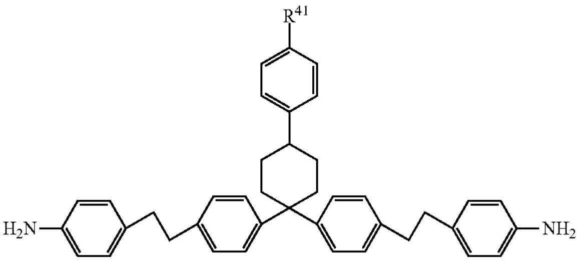
In Formulas (DI-16-1) to (DI-16-12), $R^{40}$ is hydrogen or alkyl having 1 to 20 carbon atoms, preferably hydrogen or alkyl having 1 to 10 carbon atoms, and $R^{41}$ is hydrogen or alkyl having 1 to 12 carbon atoms.
The examples of the compound represented by Formula (DI-17) are shown below:
(DI-17-1)
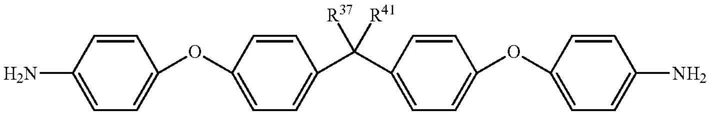
(DI-17-2)
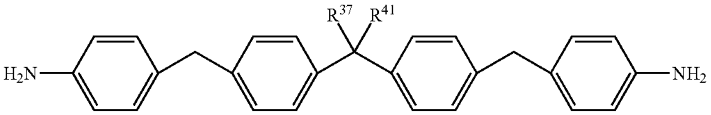
(DI-17-3)
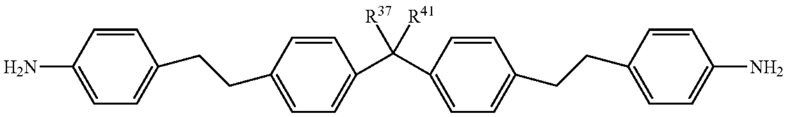

In Formulas (DI-17-1) to (DI-17-3), $R^{37}$ is alkyl having 6 to 30 carbon atoms, and $R^{41}$ is hydrogen or alkyl having 1 to 12 carbon atoms.

Diamines other than the diamines represented by Formulas (DI-1-1) to (DI-17-3) described above can also be used as the diamines in the present invention. The above diamines include, for example, diamines having side chain structures other than the diamines represented by Formulas (DI-13-1) to (DI-17-3) and photosensitive diamines.

The above diamines include, for example, compounds represented by the following Formulas (DI-18-1) to (DI-18-8):

(DI-18-1)

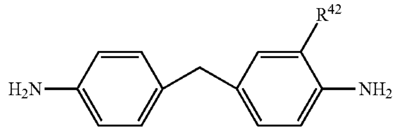

(DI-18-2)

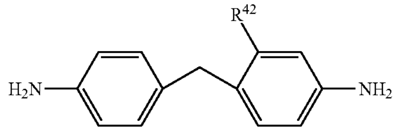

(DI-18-3)

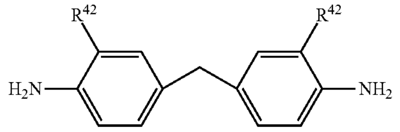

(DI-18-4)

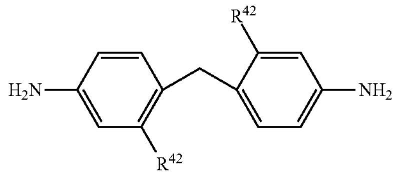

(DI-18-5)

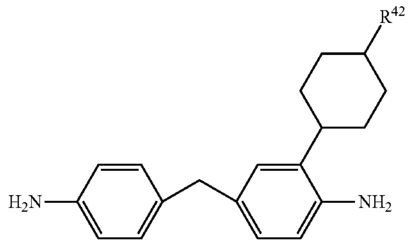

(DI-18-6)

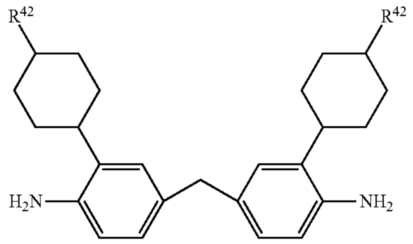

-continued (DI-18-7)

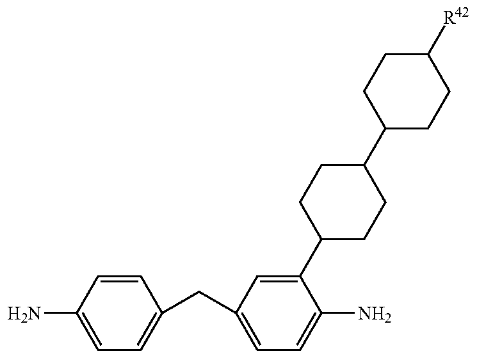

(DI-18-8)

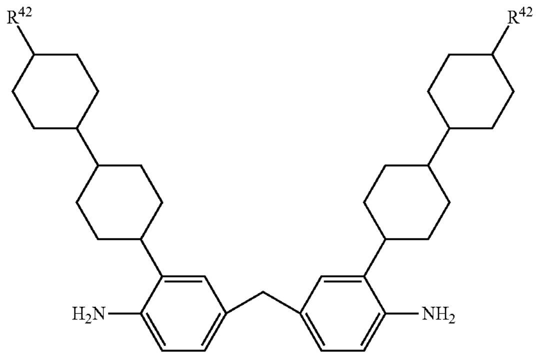

In Formulas (DI-18-1) to (DI-18-8), plural $R^{42}$ each represent independently alkyl having 3 to 22 carbon atoms.

Also, diamines represented by Formulas (DI-18-9) to (DI-18-13) can be listed as well:

(DI-18-9)

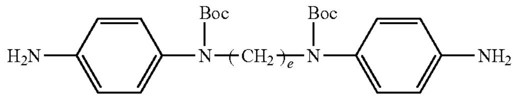

(DI-18-10)

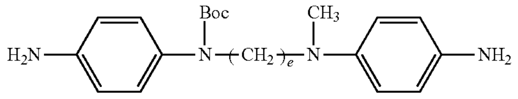

(DI-18-11)

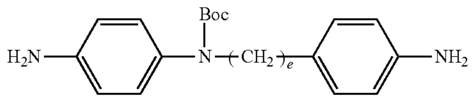

(DI-18-12)

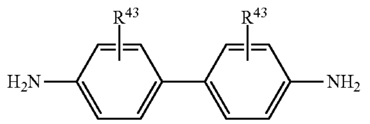

-continued (DI-18-13)

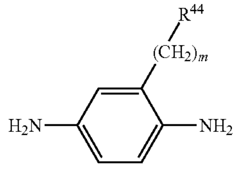

In Formulas (DI-18-9) to (DI-18-11), e is an integer of 2 to 10; in Formula (DI-18-12), plural $R^{43}$ each are independently hydrogen, —NHBoc or —$N(Boc)_2$; at least one of $R^{43}$ is —NHBoc or —$N(Boc)_2$; in Formula (DI-18-13), $R^{44}$ is —NHBoc or —$N(Boc)_2$; and m is an integer of 1 to 12. In the above formulas, Boc is t-butoxycarbonyl.

When a large pre-tilt angle is required for the liquid crystal display device produced by using the liquid crystal aligning agent of the present invention, particularly when a pre-tilt angle of 2 degrees or more is caused to be exerted, the side chain type diamine described above is used in a proportion of preferably 5 to 70% by mole, more preferably to 10 to 50% by mole based on a whole amount of the diamines in producing the polyamic acid and derivative thereof of [A] which are used for the liquid crystal aligning agent of the present invention.

In the respective diamines, a part of the diamines may be substituted with monoamines in a range in which a proportion of the monoamines based on the diamines is 40% by mole or less. Such substitution makes it possible to bring about termination of the polymerization reaction in preparing polyamic acid to inhibit the polymerization reaction from proceeding further more. Accordingly, the above substitution makes it possible to readily control a molecular weight of the resulting polymer (the polyamic acid and the derivative thereof) and makes it possible to improve a coating characteristic of the liquid crystal aligning agent without damaging, for example, the effects of the present invention. One or more diamines may be substituted with the monoamines as long as the effects of the present invention are not damaged. The monoamines include, for example, aniline, 4-hydroxyaniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine and n-eicocylamine. In particular, aniline can suitably be used.

In [A], suitable materials for improving the respective characteristics shall be described.

When it is regarded as important to further improve an aligning property of the liquid crystal, among the specific examples of the diamines described above, preferably used are the diamines represented by Formulas (DI-1-3), (DI-2-1), (DI-4-1), (DI-5-1), (DI-5-12), (DI-5-14), (DI-5-27) to (DI-5-30), (DI-6-1) to (DI-6-5), (DI-6-7), (DI-7-1), (DI-7-3), (DI-7-5), (DI-7-9), (DI-11-1), (DI-12-1), (DI-13-1) to (DI-13-11), (DI-16-1), (DI-16-2), (DI-16-4), (DI-16-5), (DI-16-7), (DI-16-8), (DI-16-10) and (DI-16-11). The diamines represented by Formulas (DI-1-3), (DI-2-1), (DI-4-1), (DI-5-1), (DI-7-3) and (DI-13-1) to (DI-13-11) are more preferably used. Also, in Formula (DI-5-1), the compounds in which m is 2, 3, 4, 6 or 8 are particularly preferred. In Formula (DI-5-29), the compound in which k is 2 is particularly preferred. In Formula (DI-7-3), the compounds in which m is 3 or 6 and in which n is 1 are particularly preferred.

When it is regarded as important to provide the liquid crystal alignment layer with a high VHR, among the specific examples of the diamines described above, preferably used are the diamines represented by Formulas (DI-1-3), (DI-2-1), (DI-4-1), (DI-5-1), (DI-5-2), (DI-5-21), (DI-5-27) to (DI-5-30), (DI-6-1), (DI-7-1), (DI-7-3), (DI-7-5), (DI-9-1), (DI-11-1), (DI-12-1), (DI-13-1) to (DI-13-12), (DI-16-1), (DI-16-2), (DI-16-4), (DI-16-5), (DI-16-7) and (DI-16-11). The diamines represented by Formulas (DI-1-3), (DI-2-1), (DI-4-1), (DI-5-1), (DI-5-2), (DI-5-21), (DI-5-27) to (DI-5-30), (DI-7-3), (DI-9-1), (DI-13-4), (DI-13-5), (DI-13-12), (DI-16-1), (DI-16-2) and (DI-16-4) are more preferably used. In Formula (DI-5-1), the compound in which m is 1 is particularly preferred. In Formula (DI-5-29), the compound in which k is 2 is particularly preferred. In Formula (DI-7-3), the compound in which m is 3 and in which n is 1 is particularly preferred. In Formulas (DI-13-4) and (DI-13-5), the compounds in which $R^{35}$ is alkyl having 3 to 25 carbon atoms are particularly preferred. In Formulas (DI-13-12), the compounds in which $R^{36}$ is alkyl having 6 to 25 carbon atoms are particularly preferred. In Formulas (DI-16-1) and (DI-16-2), the compounds in which $R^{40}$ has 1 to 10 carbon atoms are particularly preferred. In Formula (DI-16-4), the compounds in which $R^{41}$ has 1 to 10 carbon atoms are particularly preferred.

When it is regarded as important to further improve the transmittance, among the specific examples of the diamines described above, the diamines represented by Formulas (DI-2-1), (DI-3-1) and (DI-5-1) are preferably used, and the diamines represented by Formulas (DI-2-1) and (DI-3-1) are more preferably used.

When it is regarded as important to inhibit the volume resistivity from being reduced in a long term operation, among the specific examples of the diamines described above, the diamines represented by Formulas (DI-1-3), (DI-2-1) and (DI-4-12) to (DI-4-14) are particularly preferred.

In [B], suitable materials for improving the respective characteristics shall be described.

When it is regarded as important to further improve an aligning property of the liquid crystal, among the specific examples of the diamines described above, preferably used are the diamines represented by Formulas (DI-1-3), (DI-2-1), (DI-4-1), (DI-5-1), (DI-5-12), (DI-5-27) to (DI-5-30), (DI-6-7), (DI-7-1), (DI-7-3), (DI-7-5), (DI-7-9), (DI-11-1) and (DI-12-1). The diamines represented by Formulas (DI-1-3), (DI-2-1), (DI-4-1), (DI-5-1) and (DI-7-3) are more preferably used. Also, in Formula (DI-5-1), the compounds in which m is 2, 3, 4, 6 or 8 are particularly preferred. In Formula (DI-5-29), the compound in which k is 2 is particularly preferred. In Formula (DI-7-3), the compounds in which m is 3 or 6 and in which n is 1 are particularly preferred.

When it is regarded as important to provide the liquid crystal alignment layer with a high VHR, among the specific examples of the diamines described above, preferably used are the diamines represented by Formulas (DI-1-3), (DI-2-1), (DI-4-1), (DI-5-1), (DI-5-2), (DI-5-21), (DI-5-27) to (DI-5-30), (DI-6-1), (DI-7-1), (DI-7-3), (DI-7-5), (DI-9-1), (DI-11-1) and (DI-12-1). The diamines represented by Formulas (DI-1-3), (DI-2-1), (DI-4-1), (DI-5-1), (DI-5-2), (DI-5-21), (DI-5-27) to (DI-5-30), (DI-7-3) and (DI-9-1) are more preferably used. In Formula (DI-5-1), the compound in which m is 1 is particularly preferred. In Formula (DI-5-29), the compound in which k is 2 is particularly preferred. In Formula (DI-7-3), the compound in which m is 3 and in which n is 1 is particularly preferred.

When it is regarded as important to further improve the transmittance, among the specific examples of the diamines described above, the diamines represented by Formulas (DI-2-1), (DI-3-1) and (DI-8-1) are preferably used, and the diamines represented by Formulas (DI-2-1) and (DI-3-1) are more preferably used.

When it is regarded as important to inhibit the volume resistivity from being reduced due to a long term operation, among the specific examples of the diamines described above, the diamines represented by Formulas (DI-1-3) and (DI-2-1) are particularly preferred.

<Polyamic Acid or Derivative Thereof>

Polyamic acid used for the liquid crystal aligning agent of the present invention is obtained by reacting the acid anhydride and the diamine each described above in a solvent. In the above synthetic reaction, specific conditions other than selection of the raw materials are not required, and conditions used in conventional synthesis of polyamic acid can be applied as they are. The solvent used shall be described later.

<Other Components>

The liquid crystal aligning agent of the present invention may further contain other components in addition to the polyamic acid or the derivative thereof. The other components may be one compound or two or more compounds.

<Alkenyl-Substituted Nadimide Compound>

The liquid crystal aligning agent of the present invention may further contain, for example, an alkenyl-substituted nadimide compound for the purpose of stabilizing the electric characteristics of the liquid crystal display device over a long period of time. The alkenyl-substituted nadimide compound may be used alone or in combination of two or more kinds thereof. From the viewpoint of the purpose described above, a content of the alkenyl-substituted nadimide compound is preferably 1 to 100 parts by weight, more preferably 1 to 70 parts by weight and further preferably 1 to 50 parts by weight based on 100 parts by weight of the polyamic acid or derivative thereof.

The alkenyl-substituted nadimide compound shall specifically be explained below.

The alkenyl-substituted nadimide compound is preferably a compound which can be dissolved in a solvent dissolving the polyamic acid or derivative thereof used in the present invention. The examples of the above alkenyl-substituted nadimide compound include compounds represented by the following Formula (NA):

(NA)

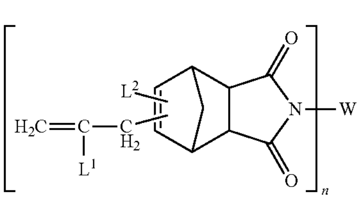

in Formula (NA), $L_1$ and $L_2$ each are independently hydrogen, alkyl having 1 to 12 carbon atoms, alkenyl having 3 to 6 carbon atoms, cycloalkyl having 5 to 8 carbon atoms, aryl having 6 to 12 carbon atoms or benzyl, and n is 1 or 2.

When n is 1 in Formula (NA), W is alkyl having 1 to 12 carbon atoms, alkenyl having 2 to 6 carbon atoms, cycloalkyl having 5 to 8 carbon atoms, aryl having 6 to 12 carbon atoms, benzyl, a group represented by $—Z^1—(O)_r—(Z^2O)_k—Z^3—H$ (wherein $Z^1$, $Z^2$ and $Z^3$ each are independently alkylene having 2 to 6 carbon atoms; r is 0 or 1; and k is an integer of 1 to 30), a group represented by $—(Z^4)—B—Z^5—H$ (wherein $Z^4$ and $Z^5$ each are independently alkylene having 1 to 4 carbon atoms or cycloalkylene having 5 to 8 carbon atoms; B is phenylene; and r is 0 or 1), a group represented by —B-T—B—H (wherein B is phenylene; and T is $—CH_2$, $—C(CH_3)_2—$, —O—, —CO—, —S— or $—SO_2—$) or groups obtained by substituting 1 to 3 hydrogens of the above groups with —OH.

In the above case, preferred W is alkyl having 1 to 8 carbon atoms, alkenyl having 3 to 4 carbon atoms, cyclohexyl, phenyl, benzyl, poly(ethyleneoxy)ethyl having 4 to 10 carbon atoms, phenyloxyphenyl, phenylmethylphenyl, phenylisopropylidenephenyl and groups obtained by substituting 1 or 2 hydrogens of the above groups with —OH.

When n is 2 in Formula (NA), W is alkylene having 2 to 20 carbon atoms, cycloalkylene having 5 to 8 carbon atoms, arylene having 6 to 12 carbon atoms, a group represented by $—Z^1—O—(Z^2O)_k—Z^3—$ (wherein $Z^1$ to $Z^3$ and k mean the same as described above), a group represented by $—Z^4—B—Z^5—$ (wherein $Z^4$, $Z^5$ and B mean the same as described above), a group represented by $—B—(O—B)_r$-T—B—$(B—O)_r$—B— (wherein B is phenylene; T is alkylene having 1 to 3 carbon atoms, —O— or $—SO_2—$; and r means the same as described above) or groups obtained by substituting 1 to 3 hydrogens of the above groups with —OH.

In the above case, preferred W is alkylene having 2 to 12 carbon atoms, cyclohexylene, phenylene, tolylene, xylylene, a group represented by $—C_3H_6—O—(Z^2—O)_n—O—C_3H_6—$ (wherein $Z^2$ is alkylene having 2 to 6 carbon atoms, and n is 1 or 2), a group represented by —B-T—B— (wherein B is phenylene; and T is $—CH_2$, —O— or $—SO_2—$), a group represented by $—B—O—B—C_3H_6—B—O—B—$ (wherein B is phenylene) and groups obtained by substituting 1 or 2 hydrogens of the above groups with —OH.

Compounds obtained by holding, as described in Japanese Patent No. 2729565, an alkenyl-substituted nadic anhydride derivative and diamine at a temperature of 80 to 220° C. for 0.5 to 20 hours and commercially available compounds can be used as the above alkenyl-substituted nadimide compound. The specific examples of the alkenyl-substituted nadimide compound include the following compounds.

N-methyl-allylbicyclo[2.2.1]hept-5-ene-2,3-dicarboxylmide, N-methyl-allylmethylbicyclo[2.2.1]hept-5-ene-2,3-dicarboxylmide, N-methyl-methallylbicyclo[2.2.1]hept-5-ene-2,3-dicarboxylmide, N-methyl-methallylmethylbicyclo[2.2.1]hept-5-ene-2,3-dicarboxylmide, N-(2-ethylhexyl)-allylbicyclo[2.2.1]hept-5-ene-2,3-dicarboxylmide, N-(2-ethylhexyl)-allyl(methyl)bicyclo[2.2.1]hept-5-ene-2,3-dicarboxylmide, N-allyl-allylbicyclo[2.2.1]hept-5-ene-2,3-dicarboxylmide, N-allyl-allylmethylbicyclo[2.2.1]hept-5-ene-2,3-dicarboxylmide, N-allyl-methallylbicyclo[2.2.1]hept-5-ene-2,3-dicarboxylmide, N-isopropenyl-allylbicyclo[2.2.1]hept-5-ene-2,3-dicarboxylmide, N-isopropenyl-allyl(methyl)bicyclo[2.2.1]hept-5-ene-2,3-dicarboxylmide, N-isopropenyl-methallylbicyclo[2.2.1]hept-5-ene-2,3-dicarboxylmide, N-cyclohexyl-allylbicyclo[2.2.1]hept-5-ene-2,3-dicarboxylmide, N-cyclohexyl-allyl(methyl)bicyclo[2.2.1]hept-5-ene-2,3-dicarboxylmide, N-cyclohexyl-methallylbicyclo[2.2.1]hept-5-ene-2,3-dicarboxylmide, N-phenyl-allylbicyclo[2.2.1]hept-5-ene-2,3-dicarboxylmide, N-phenyl-allyl(methyl)bicyclo[2.2.1]hept-5-ene-2,3-dicarboxylmide, N-benzyl-allylbicyclo[2.2.1]hept-5-ene-2,3-dicarboxylmide, N-benzyl-allylmethylbicyclo[2.2.1]hept-5-ene-2,3-dicarboxylmide, N-benzyl-methallylbicyclo[2.2.1]hept-5-ene-2,3-dicarboxylmide, N-(2-hydroxyethyl)- allylbicyclo[2.2.1]hept-5-ene-2,3-dicarboxylmide, N-(2-hydroxyethyl)-allyl(methyl)bicyclo[2.2.1]hept-5-ene-2,3-dicarboxylmide, N-(2-hydroxyethyl)-methallylbicyclo[2.2.1]hept-5-ene-2,3-dicarboxylmide, N-(2,2-dimethyl-3-hydroxypropyl)-allylbicyclo[2.2.1]hept-5-ene-2,3-dicarboxylmide, N-(2,2-dimethyl-3-hydroxypropyl)-allyl(methyl)bicyclo[2.2.1]hept-5-ene-2,3-dicarboxylmide, N-(2,3-dihydroxypropyl)-allylbicyclo[2.2.1]hept-5-ene-2,3-dicarboxylmide, N-(2,3-dihydroxypropyl)-allyl(methyl)bicyclo[2.2.1]hept-5-ene-2,3-dicarboxylmide, N-(3-hydroxy-1-propenyl)-allylbicyclo[2.2.1]hept-5-ene-2,3-dicarboxylmide, N-(4-hydroxycyclohexyl)-allyl(methyl)bicyclo[2.2.1]hept-5-ene-2,3-dicarboxylmide, N-(4-hydroxyphenyl)-allylbicyclo[2.2.1]hept-5-ene-2,3-dicarboxylmide, N-(4-hydroxyphenyl)-allyl(methyl)bicyclo[2.2.1]hept-5-ene-2,3-dicarboxylmide, N-(4-hydroxyphenyl)-methallylbicyclo[2.2.1]hept-5-ene-2,3-dicarboxylmide, N-(4-hydroxyphenyl)-methallylmethylbicyclo[2.2.1]hept-5-ene-2,3-dicarboxylmide, N-(3-hydroxyphenyl)-allylbicyclo[2.2.1]hept-5-ene-2,3-dicarboxylmide, N-(3-hydroxyphenyl)-allyl(methyl)bicyclo[2.2.1]hept-5-ene-2,3-dicarboxylmide, N-(p-hydroxybenzyl)-allylbicyclo[2.2.1]hept-5-ene-2,3-dicarboxylmide, N-{2-(2-hydroxyethoxy)ethyl}-allylbicyclo[2.2.1]hept-5-ene-2,3-dicarboxylmide, N-{2-(2-hydroxyethoxy)ethyl}-allyl(methyl)bicyclo[2.2.1]hept-5-ene-2,3-dicarboxylmide, N-{2-(2-hydroxyethoxy)ethyl}-methallylbicyclo[2.2.1]hept-5-ene-2,3-dicarboxylmide, N-{2-(2-hydroxyethoxy)ethyl}-methallylmethylbicyclo[2.2.1]hept-5-ene-2,3-dicarboxylmide, N-[2-{2-(2-hydroxyethoxy)ethoxy}ethyl]-allylbicyclo[2.2.1]hept-5-ene-2,3-dicarboxylmide, N-[2-{2-(2-hydroxyethoxy)ethoxy}ethyl]-allyl(methyl)bicyclo[2.2.1]hept-5-ene-2,3-dicarboxylmide, N-[2-{2-(2-hydroxyethoxy)ethoxy}ethyl]-methallylbicyclo[2.2.1]hept-5-ene-2,3-dicarboxylmide, N-{4-(4-hydroxyphenylisopropylidene)phenyl}-allylbicyclo[2.2.1]hept-5-ene-2,3-dicarboxylmide, N-{4-(4-hydroxyphenylisopropylidene)phenyl}-allyl(methyl)bicyclo[2.2.1]hept-5-ene-2,3-dicarboxylmide, N-{4-(4-hydroxyphenylisopropylidene)phenyl}-methallylbicyclo[2.2.1]hept-5-ene-2,3-dicarboxylmide, and oligomer thereof, N,N'-ethylene-bis(allylbicyclo[2.2.1]hept-5-ene-2,3-dicarboxylmide), N,N'-ethylene-bis(allylmethylbicyclo[2.2.1]hept-5-ene-2,3-dicarboxylmide), N,N'-ethylene-bis(methallylbicyclo[2.2.1]hept-5-ene-2,3-dicarboxylmide), N,N'-trimethylene-bis(allylbicyclo[2.2.1]hept-5-ene-2,3-dicarboxylmide), N,N'-hexamethylene-bis(allylbicyclo[2.2.1]hept-5-ene-2,3-dicarboxylmide), N,N'-hexamethylene-bis(allylmethylbicyclo[2.2.1]hept-5-ene-2,3-dicarboxylmide), N,N'-dodecamethylene-bis(allylbicyclo[2.2.1]hept-5-ene-2,3-dicarboxylmide), N,N'-dodecamethylene-bis(allylmethylbicyclo[2.2.1]hept-5-ene-2,3-dicarboxylmide), N,N'-cyclohexylene-bis(allylbicyclo[2.2.1]hept-5-ene-2,3-dicarboxylmide), N,N'-cyclohexylene-bis(allylmethylbicyclo[2.2.1]hept-5-ene-2,3-dicarboxylmide), 1,2-bis{3'-(allylbicyclo[2.2.1]hept-5-ene-2,3-dicarboxylmide)propoxy}ethane, 1,2-bis{3'-(allylmethylbicyclo[2.2.1]hept-5-ene-2,3-dicarboxylmide)propoxy}ethane, 1,2-bis{3'-(methallylbicyclo[2.2.1]hept-5-ene-2,3-dicarboxylmide)propoxy}ethane, bis[2'-{3'-(allylbicyclo[2.2.1]hept-5-ene-2,3-dicarboxylmide)propoxy}ethyl]ether, bis[2'-{3'-(allylmethylbicyclo[2.2.1]hept-5-ene-2,3-dicarboxylmide)propoxy}ethyl]ether, 1,4-bis{3'-(allylbicyclo[2.2.1]hept-5-ene-2,3-dicarboxylmide)propoxy}butane, 1,4-bis{3'-(allylmethylbicyclo[2.2.1]hept-5-ene-2,3-dicarboxylmide)propoxy}butane, N,N'-p-phenylene-bis(allylbicyclo[2.2.1]hept-5-ene-2,3-diccarboxylmide), N,N'-p-phenylene-bis(allylmethylbicyclo[2.2.1]hept-5-ene-2,3-dicarboxylmide), N,N'-m-phenylene-bis(allylbicyclo[2.2.1]hept-5-ene-2,3-dicarboxylmide), N,N'-m-phenylene-bis(allylmethylbicyclo[2.2.1]hept-5-ene-2,3-dicarboxylmide), N,N'-{(1-methyl)-2,4-phenylene}-bis(allylbicyclo[2.2.1]hept-5-ene-2,3-dicarboxylmide), N,N'-p-xylylene-bis(allylbicyclo[2.2.1]hept-5-ene-2,3-dicarboxylmide), N,N'-p-xylylene-bis(allylmethylbicyclo[2.2.1]hept-5-ene-2,3-dicarboxylmide), N,N'-m-xylylene-bis(allylbicyclo[2.2.1]hept-5-ene-2,3-dicarboxylmide), N,N'-m-xylylene-bis(allylmethylbicyclo[2.2.1]hept-5-ene-2,3-dicarboxylmide), 2,2-bis[4-{4-(allylbicyclo[2.2.1]hept-5-ene-2,3-dicarboxylmide)phenoxy}phenyl]propane, 2,2-bis[4-{4-(allylmethylbicyclo[2.2.1]hept-5-ene-2,3-dicarboxylmide)phenoxy}phenyl]propane, 2,2-bis[4-{4-(methallylbicyclo[2.2.1]hept-5-ene-2,3-dicarboxylmide)phenoxy}phenyl]propane, bis{4-(allylbicyclo[2.2.1]hept-5-ene-2,3-dicarboxylmide)phenyl}methane, bis{4-(allylmethylbicyclo[2.2.1]hept-5-ene-2,3-dicarboxylmide)phenyl}methane, bis{4-(methallylbicyclo[2.2.1]hept-5-ene-2,3-dicarboxylmide)phenyl}methane, bis{4-(methallylmethylbicyclo[2.2.1]hept-5-ene-2,3-dicarboxylmide)phenyl}methane, bis{4-(allylbicyclo[2.2.1]hept-5-ene-2,3-dicarboxylmide)phenyl}ether, bis{4-(allylmethylbicyclo[2.2.1]hept-5-ene-2,3-dicarboxylmide)phenyl}ether, bis{4-(methallylbicyclo[2.2.1]hept-5-ene-2,3-dicarboxylmide)phenyl}ether, bis{4-(allylbicyclo[2.2.1]hept-5-ene-2,3-dicarboxylmide)phenyl}sulfone, bis{4-(allylmethylbicyclo[2.2.1]hept-5-ene-2,3-dicarboxylmide)phenyl}sulfone, bis{4-(methallylbicyclo[2.2.1]hept-5-ene-2,3-dicarboxylmide)phenyl}sulfone, 1,6-bis(allylbicyclo[2.2.1]hept-5-ene-2,3-dicarboxylmide)-3-hydroxy-hexane, 1,12-bis(methallylbicyclo[2.2.1]hept-5-ene-2,3-dicarboxylmide)-3,6-dihydroxy-dodecane, 1,3-bis(allylbicyclo[2.2.1]hept-5-ene-2,3-dicarboxylmide)-5-hydroxy-cyclohexane, 1,5-bis{3'-(allylbicyclo[2.2.1]hept-5-ene-2,3-dicarboxylmide)propoxy}-3-hydroxy-pentane, 1,4-bis(allylbicyclo[2.2.1]hept-5-ene-2,3-dicarboxylmide)-2-hydroxy-benzene, 1,4-bis(allylmethylbicyclo[2.2.1]hept-5-ene-2,3-dicarboxylmide)-2,5-dihydroxy-benzene, N,N'-p-(2-hydroxy)xylylene-bis(allylbicyclo[2.2.1]hept-5-ene-2,3-dicarboxylmide), N,N'-p-(2-hydroxy)xylylene-bis(allylmethylcyclo[2.2.1]hept-5-ene-2,3-dicarboxylmide), N,N'-m-(2-hydroxy)xylylene-bis(allylbicyclo[2.2.1]hept-5-ene-2,3-dicarboxylmide), N,N'-m-(2-hydroxy)xylylene-bis(methallylbicyclo[2.2.1]hept-5-ene-2,3-dicarboxylmide), N,N'-p-(2,3-hydroxy)xylylene-bis(allylbicyclo[2.2.1]hept-5-ene-2,3-dicarboxylmide), 2,2-bis[4-{4-(allylbicyclo[2.2.1]hept-5-ene-2,3-dicarboxylmide)-2-hydroxy-phenoxy}phenyl]propane, bis{4-(allylmethylbicyclo[2.2.1]hept-5-ene-2,3-dicarboxylmide)-2-hydroxy-phenyl}methane, bis{3-(allylbicyclo[2.2.1]hept-5-ene-2,3-dicarboxylmide)-4-hydroxy-phenyl}ether, bis{3-(methallylbicyclo[2.2.1]hept-5-ene-2,3-dicarboxylmide)-5-hydroxy-phenyl}sulfone, 1,1,1-tri{4-(allylmethylbicyclo[2.2.1]hept-5-ene-2,3-dicarboxylmide)}phenoxymethylpropane, N,N',N''-tri(ethylenemethallylbicyclo[2.2.1]hept-5-ene-2,3-dicarboxylmide) isocyanate, oligomer thereof and the like.

Further, the alkenyl-substituted nadimide compound used in the present invention may be compounds represented the following formulas containing an asymmetric alkylene•phenylene group:

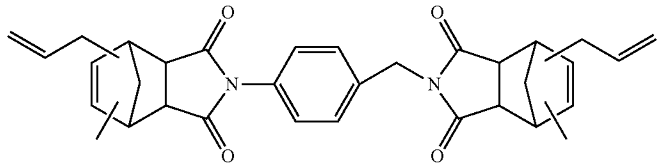

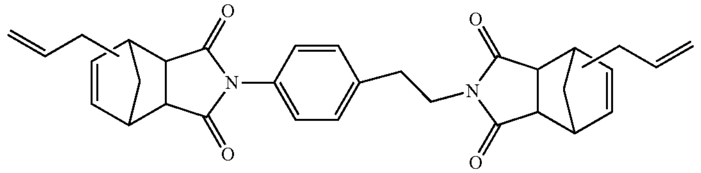

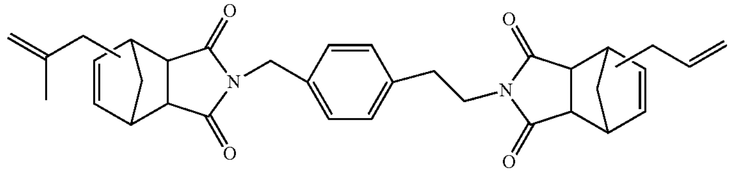

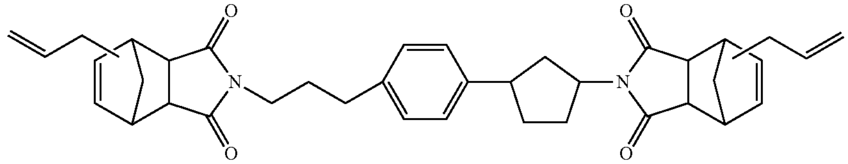

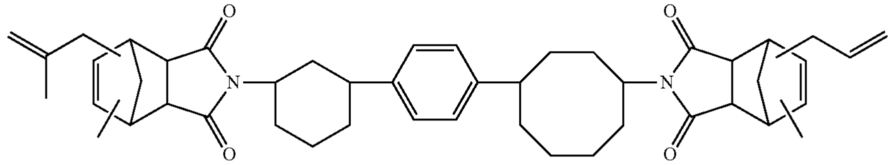

Among the alkenyl-substituted nadimide compounds, the preferred compounds are shown below:

N,N'-ethylene-bis(allylbicyclo[2.2.1]hept-5-ene-2,3-dicarboxylmide), N,N'-ethylene-bis(allylmethylbicyclo[2.2.1]hept-5-ene-2,3-dicarboxylmide), N,N'-ethylene-bis(methallylbicyclo[2.2.1]hept-5-ene-2,3-dicarboxylmide), N,N'-trimethylene-bis(allylbicyclo[2.2.1]hept-5-ene-2,3-dicarboxylmide), N,N'-hexamethylene-bis(allylbicyclo[2.2.1]hept-5-ene-2,3-dicarboxylmide), N,N'-hexamethylene-bis(allylmethylbicyclo[2.2.1]hept-5-ene-2,3-dicarboxylmide), N,N'-dodecamethylene-bis(allylbicyclo[2.2.1]hept-5-ene-2,3-dicarboxylmide), N,N'-dodecamethylene-bis(allylmethylbicyclo[2.2.1]hept-5-ene-2,3-dicarboxylmide), N,N'-cyclohexylene-bis(allylbicyclo[2.2.1]hept-5-ene-2,3-dicarboxylmide), N,N'-cyclohexylene-bis(allylmethylbicyclo[2.2.1]hept-5-ene-2,3-dicarboxylmide), N,N'-p-phenylene-bis(allylbicyclo[2.2.1]hept-5-ene-2,3-dicarboxylmide), N,N'-p-phenylene-bis(allylmethylbicyclo[2.2.1]hept-5-ene-2,3-dicarboxylmide), N,N'-m-phenylene-bis(allylbicyclo[2.2.1]hept-5-ene-2,3-dicarboxylmide), N,N'-m-phenylene-bis(allylmethylbicyclo[2.2.1]hept-5-ene-2,3-dicarboxylmide), N,N'-{(1-methyl)-2,4-phenylene}-bis(allylbicyclo[2.2.1]hept-5-ene-2,3-dicarboxylmide), N,N'-p-xylylene-bis(allylbicyclo[2.2.1]hept-5-ene-2,3-dicarboxylmide), N,N'-p-xylylene-bis(allylmethylbicyclo[2.2.1]hept-5-ene-2,3-dicarboxylmide), N,N'-m-xylylene-bis(allylbicyclo[2.2.1]hept-5-ene-2,3-dicarboxylmide), N,N'-m-xylylene-bis(allylmethylbicyclo[2.2.1]hept-5-ene-2,3-dicarboxylmide), 2,2-bis[4-{4-allylbicyclo[2.2.1]hept-5-ene-2,3-dicarboxylmide)phenoxy}phenyl]propane, 2,2-bis[4-{4-allylmethylbicyclo[2.2.1]hept-5-ene-2,3-dicarboxylmide)phenoxy}phenyl]propane, 2,2-bis[4-{4-methallylbicyclo[2.2.1]hept-5-ene-2,3-dicarboxylmide)phenoxy}phenyl]propane, bis{4-(allylbicyclo[2.2.1]hept-5-ene-2,3-dicarboxylmide)phenyl}methane, bis{4-(allylmethylbicyclo[2.2.1]hept-5-ene-2,3-dicarboxylmide)phenyl}methane, bis{4-(methallylbicyclo[2.2.1]hept-5-ene-2,3-dicarboxylmide)phenyl}methane, bis{4-(methallylmethylbicyclo[2.2.1]hept-5-ene-2,3-dicarboxylmide)phenyl}methane, bis{4-(allylbicyclo[2.2.1]hept-5-ene-2,3-dicarboxylmide)phenyl}ether, bis{4-(allylmethylbicyclo[2.2.1]hept-5-ene-2,3-dicarboxylmide)phenyl}ether, bis{4-(methallybicyclo[2.2.1]hept-5-ene-2,3-dicarboxylmide)phenyl}ether, bis{4-(allylbicyclo[2.2.1]hept-5-ene-2,3-dicarboxylmide)phenyl}sulfone, bis{4-(allylmethylbicyclo[2.2.1]hept-5-ene-2,3-dicarboxylmide)phenyl}sulfone, bis{4-(methallylbicyclo[2.2.1]hept-5-ene-2,3-dicarboxylmide)phenyl}sulfone, The further preferred alkenyl-substituted nadimide compounds are shown below:

N,N'-ethylene-bis(allylbicyclo[2.2.1]hept-5-ene-2,3-dicarboxylmide), N,N'-ethylene-bis(allylmethylbicyclo[2.2.1]hept-5-ene-2,3-dicarboxylmide), N,N'-ethylene-bis(methallylbicyclo[2.2.1]hept-5-ene-2,3-dicarboxylmide), N,N'-trimethylene-bis(allylbicyclo[2.2.1]hept-5-ene-2,3-dicarboxylmide), N,N'-hexamethylene-bis(allylbicyclo[2.2.1]hept-5-ene-2,3-dicarboxylmide), N,N'-hexamethylene-bis(allylmethylbicyclo[2.2.1]hept-5-ene-2,3-dicarboxylmide), N,N'-dodecamethylene-bis(allylbicyclo[2.2.1]hept-5-ene-2,3-dicarboxylmide), N,N'-dodecamethylene-bis(allylmethylbicyclo[2.2.1]hept-5-ene-2,3-dicarboxylmide), N,N'-cyclohexylene-bis(allylbicyclo

[2.2.1]hept-5-ene-2,3-dicarboxylmide), N,N'-cyclohexylene-bis(allylmethylbicyclo[2.2.1]hept-5-ene-2,3-dicarboxylmide), N,N'-p-phenylene-bis(allylbicyclo[2.2.1]hept-5-ene-2,3-dicarboxylmide), N,N'-p-phenylene-bis(allylmethylbicyclo [2.2.1]hept-5-ene-2,3-dicarboxylmide), N,N'-m-phenylene-bis(allylbicyclo[2.2.1]hept-5-ene-2,3-dicarboxylmide), N,N'-m-phenylene-bis(allylmethylbicyclo[2.2.1]hept-5-ene-2,3-dicarboxylmide), N,N'-{(1-methyl)-2,4-phenylene}-bis(allylbicyclo[2.2.1]hept-5-ene-2,3-dicarboxylmide), N,N'-p-xylylene-bis(allylbicyclo[2.2.1]hept-5-ene-2,3-dicarboxylmide), N,N'-p-xylylene-bis (allylmethylbicyclo[2.2.1]hept-5-ene-2,3-dicarboxylmide), N,N'-m-xylylene-bis(allylbicyclo[2.2.1]hept-5-ene-2,3-dicarboxylmide), N,N'-m-xylylene-bis(allylmethylbicyclo [2.2.1]hept-5-ene-2,3-dicarboxylmide), 2,2-bis[4-{4-allylbicyclo[2.2.1]hept-5-ene-2,3-dicarboxylmide)phenoxy}phenyl]propane, 2,2-bis[4-{4-allylmethyl-lbicyclo[2.2.1]hept-5-ene-2,3-dicarboxylmide) phenoxy}phenyl]propane, 2,2-bis[4-{4-methallylbicyclo [2.2.1]hept-5-ene-2,3-dicarboxylmide)phenoxy}phenyl] propane, bis{4-(allylbicyclo[2.2.1]hept-5-ene-2,3-dicarboxylmide)phenyl}methane, bis{4-(allylmethylbicyclo [2.2.1]hept-5-ene-2,3-dicarboxylmide)phenyl}methane, bis{4-(methallylbicyclo[2.2.1]hept-5-ene-2,3-dicarboxylmide)phenyl}methane and bis{4-(methallylmethylbicyclo [2.2.1]hept-5-ene-2,3-dicarboxylmide)phenyl}methane.

The particularly preferred alkenyl-substituted nadimide compounds include bis{4-(allylbicyclo[2.2.1]hept-5-ene-2, 3-dicarboxylmide)phenyl}methane represented by the following Formula (NA-1), N,N'-m-xylylene-bis(allylbicyclo [2.2.1]hept-5-ene-2,3-dicarboxylmide) represented by Formula (NA-2) and N,N'-hexamethylene-bis(allylbicyclo [2.2.1]hept-5-ene-2,3-dicarboxylmide) represented by Formula (NA-3).

compound having a radically polymerizable unsaturated double bond may comprise a single kind of a compound or two or more kinds of compounds. The alkenyl-substituted nadimide compound is not included in the compound having a radically polymerizable unsaturated double bond. From the viewpoint of the purpose described above, a content of the compound having a radically polymerizable unsaturated double bond is preferably 1 to 100 parts by weight, more preferably 1 to 70 parts by weight and further preferably 1 to 50 parts by weight based on 100 parts by weight of the polyamic acid or derivative thereof.

A proportion of the compound having a radically polymerizable unsaturated double bond to the alkenyl-substituted nadimide compound is preferably 0.1 to 10, more preferably 0.5 to 5 in terms of a weight ratio of the compound having a radically polymerizable unsaturated double bond/the alkenyl-substituted nadimide compound in order to reduce an ion density of the liquid crystal display device, inhibit the ion density from increasing with the passage of time and inhibit the afterimages from being generated.

The compound having a radically polymerizable unsaturated double bond shall specifically be explained below. The compound having a radically polymerizable unsaturated double bond includes (meth)acrylic acid derivatives such as (meth)acrylic esters, (meth)acrylic acid amides and the like, and bismaleimide. The compound having a radically polymerizable unsaturated double bond is more preferably (meth) acrylic acid derivatives having two or more radically polymerizable unsaturated double bonds.

The specific examples of the (meth)acrylic esters include, for example, cyclohexyl (meth)acrylate, 2-methylcyclohexyl (meth)acrylate, dicyclopentanyl (meth)acrylate, dicyclopentanyloxyethyl (meth)acrylate, isobornyl (meth)acrylate, phenyl (meth)acrylate, benzyl (meth)acrylate, 2-hydroxyethyl (meth)acrylate, and 2-hydroxypropyl (meth) acrylate.

(NA-1)

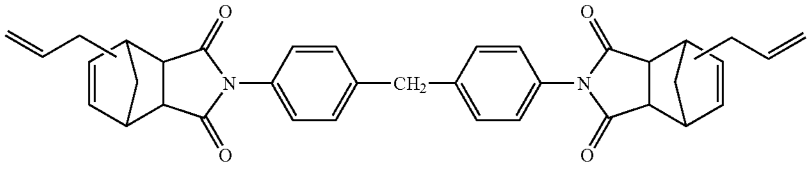

(NA-2)

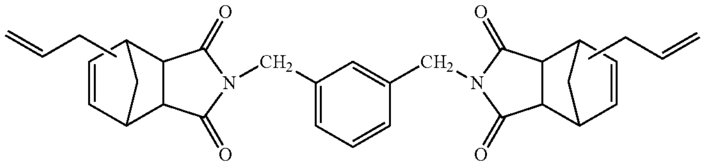

(NA-3)

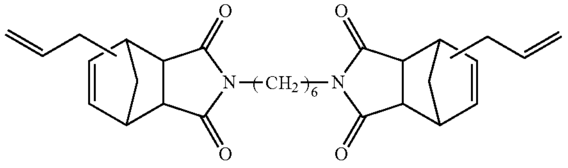

<Compound Having a Radically Polymerizable Unsaturated Double Bond>

The liquid crystal aligning agent of the present invention may further contain, for example, a compound having a radically polymerizable unsaturated double bond for the purpose of stabilizing the electric characteristics of the liquid crystal display device over a long period of time. The The specific examples of difunctional (meth)acrylic esters include, for example, ethylenebisacrylate, Aronix M-210, Aronix M-240 and Aronix M-6200 which are products of Toagosei Co., Ltd., KAYARAD HDDA, KAYARAD HX-220, KAYARAD R-604, and KAYARAD R-684 which are products of Nippon Kayaku Co., Ltd., V260, V312 and V335HP which are products of Osaka Organic Industry Ltd.

and Light Acrylate BA-4EA, Light Acrylate BP-4PA, and Light Acrylate BP-2PA which are products of Kyoeisha Chemical Co., Ltd.

The specific examples of trifunctional or more (meth) acrylic esters include, for example, 4,4'-methylenebis(N,N-dihydroxyethyleneacrylateaniline), Aronix M-400, Aronix M-405, Aronix M-450, Aronix M-7100, Aronix M-8030, and Aronix M-8060 which are products of Toagosei Co., Ltd., KAYARAD TMPTA, KAYARAD DPCA-20, KAYARAD DPCA-30, KAYARAD DPCA-60, and KAYARAD DPCA-120 which are products of Nippon Kayaku Co., Ltd., and VGPT which is a product of Osaka Organic Industry Ltd.

The specific examples of the (meth)acrylic acid amide derivatives include, for example, N-isopropylacrylamide, N-isopropylmethacrylamide, N-n-propylacrylamide, N-n-propylmethacrylamide, N-cyclopropylacrylamide, N-cyclopropylmethacrylamide, N-ethoxyethylacrylamide, N-ethoxyethylmethacrylamide, N-tetrahydrofurfurylacrylamide, N-tetrahydrofurfurylmethacrylamide, N-ethylacrylamide, N-ethyl-N-methylacrylamide, N,N-diethylacrylamide, N-methyl-N-n-propylacrylamide, N-methyl-N-isopropylacrylamide, N-acryloylpiperidine, N-acryloylpyrrolidine, N,N'-methylenebisacrylamide, N,N'-ethylenbisacrylamide, N,N'-dihydroxyethylenebisacrylamide, N-(4-hydroxyphenyl)methacrylamide, N-phenylmethacrylamide, N-butylmethacrylamide, N-(iso-butoxymethyl) methacrylamide, N-[2-(N,N-dimethylamino)ethyl] methacrylamide, N,N-dimethylmethacrylamide, N-[3-(dimethylamino)propyl]methacrylamide, N-(methoxymethyl)methacrylamide, N-(hydroxymethyl)-2-methacrylamide, N-benzyl-2-methacrylamide, and N,N'-methylenebismethacrylamide.

Among the (meth)acrylic acid derivatives described above, N,N'-methylenebisacryamide, N,N'-dihydroxyethylene-bisacryamide, ethylenebisacrylate, and 4,4'-methylenebis(N,N-dihydroxyethyleneacrylateaniline) are particularly preferred.

The bismaleimide includes, for example, BMI-70 and BMI-80 manufactured by KI Chemical Industry Co., Ltd., and BMI-1000, BMI-3000, BMI-4000, BMI-5000, and BMI-7000 manufactured by Daiwakasei Industry Co., Ltd.

<Oxazine Compound>

The liquid crystal aligning agent of the present invention may further contain, for example, an oxazine compound for the purpose of stabilizing the electric characteristics of the liquid crystal display device over a long period of time. The oxazine compound may comprise a single kind of a compound or two or more kinds of compounds. From the viewpoint of the purpose described above, a content of the oxazine compound is preferably 0.1 to 50 parts by weight, more preferably 1 to 40 parts by weight and further preferably 1 to 20 parts by weight based on 100 parts by weight of the polyamic acid or derivative thereof.

The oxazine compound shall specifically be explained below.

The oxazine compound is soluble in a solvent dissolving the polyamic acid or derivative thereof, and in addition thereto, the oxazine compounds having a ring-opening polymerizability are preferred.

The number of an oxazine structure in the oxazine compound shall not specifically be restricted.

Various structures of the oxazine compound are known. In the present invention, the structure of the oxazine compound shall not specifically be restricted, and the oxazine structure in the oxazine compound includes the structures of oxazines having an aromatic group including a condensed polycyclic aromatic group such as benzoxazine, naphthoxazine and the like.

The oxazine compound includes, for example, compounds represented by the following Formulas (OX-1) to (OX-6). In the following formulas, bondings shown toward the center of the rings show that they are bonded to any carbons which constitute the rings and to which substituents can be bonded:

(OX-1)

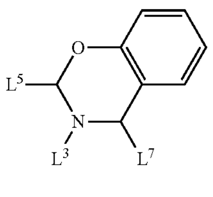

(OX-2)

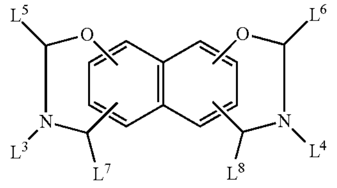

(OX-3)

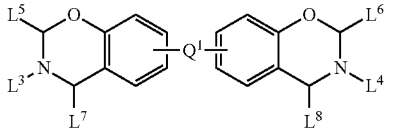

(OX-4)

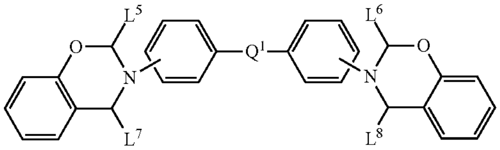

(OX-5)

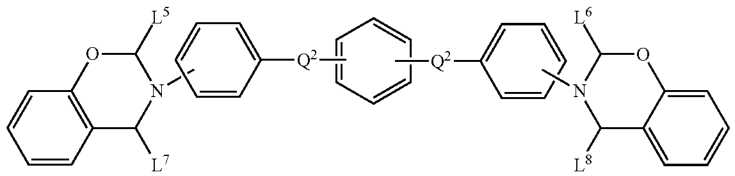

-continued (OX-6)

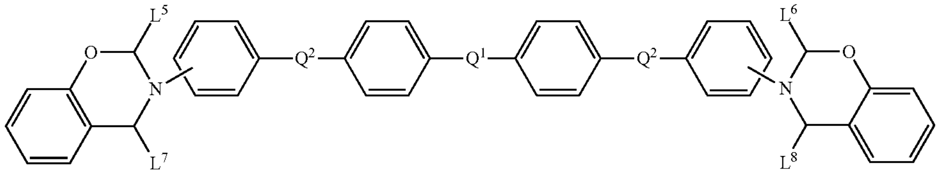

in Formulas (OX-1) to (OX-3), $L^3$ and $L^4$ are an organic group having 1 to 30 carbon atoms; in (OX-1) to (OX-6), $L^5$ to $L^8$ are hydrogen or a hydrocarbon group having 1 to 6 carbon atoms; in Formulas (OX-3), (OX-4) and (OX-6), $Q^1$ is a single bond, —O—, —S—, —S—S—, —$SO_2$—, —CO—, —CONH—, —NHCO—, —$C(CH_3)_2$—, —$C(CF_3)_2$—, —$C(CH_2)_v$—, —O—$(CH_2)$—O— or —S—$(CH_2)_v$—S—, wherein v is an integer of 1 to 6; in Formulas (OX-5) and (OX-6), plural $Q^2$ each are independently a single bond, —O—, —S—, —CO—, —$C(CH_3)_2$—, —$C(CF_3)_2$— or alkylene having 1 to 3 carbon atoms; and hydrogens bonded to a benzene ring and a naphthalene ring in $Q^2$ each may be substituted independently with —F, —$CH_3$, —OH, —COOH, —$SO_3H$ and —$PO_3H_2$.

Oligomers and polymers each having an oxazine structure in side chains and oligomers and polymers each having an oxazine structure in principal chains are included in the oxazine compounds.

The oxazine compound represented by Formula (OX-1) includes, for example, the following oxazine compounds:

(OX-1-1)

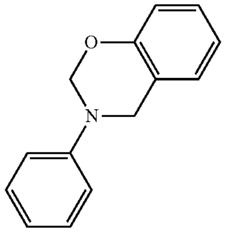

(OX-1-2)

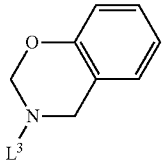

In Formula (OX-1-2), $L^3$ is preferably alkyl having 1 to 30 carbon atoms, more preferably alkyl having 1 to 20 carbon atoms.

The oxazine compound represented by Formula (OX-2) includes, for example, the following oxazine compounds:

(OX-2-1)

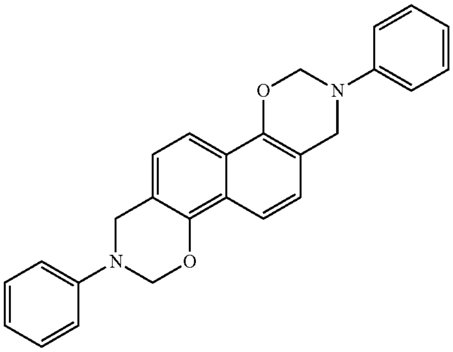

(OX-2-2)

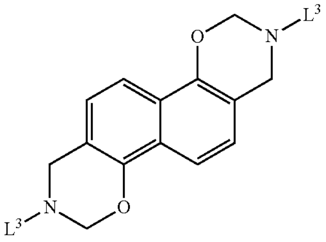

(OX-2-3)

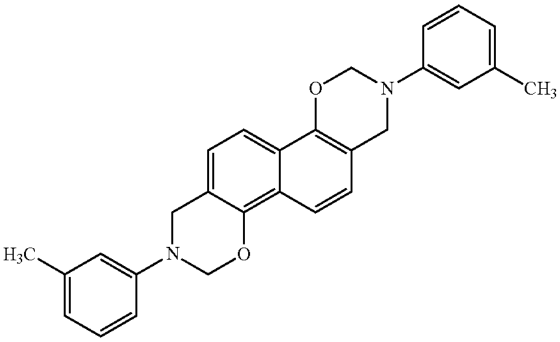

(OX-2-4)

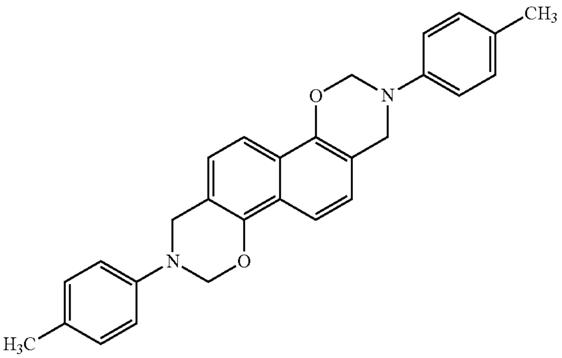

-continued (OX-2-5)

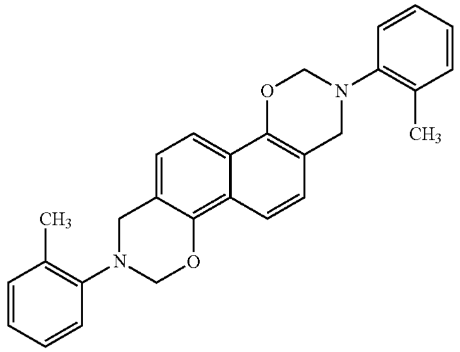

(OX-2-6)

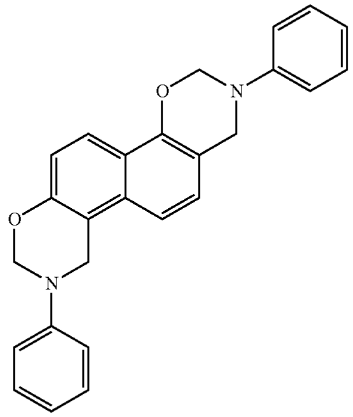

(OX-2-7)

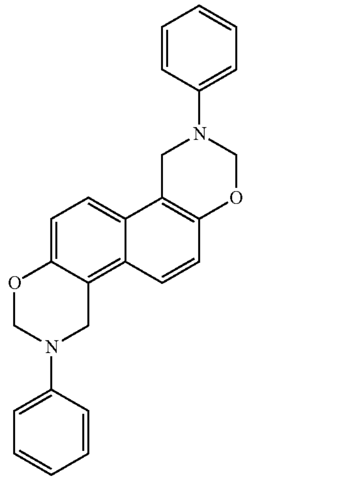

(OX-2-8)

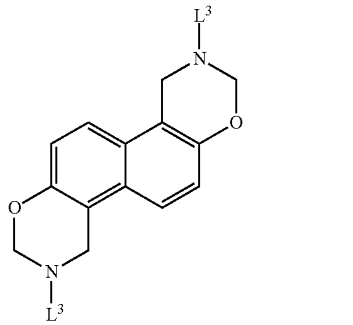

-continued (OX-2-9)

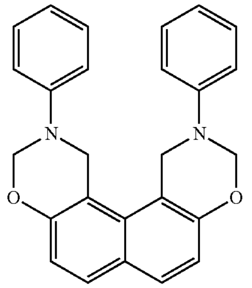

(OX-2-10)

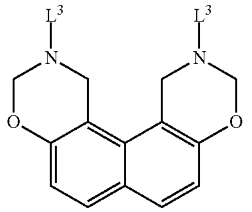

In the formulas, $L^3$ is preferably alkyl having 1 to 30 carbon atoms, more preferably alkyl having 1 to 20 carbon atoms.

The oxazine compound represented by Formula (OX-3) includes, for example, an oxazine compound represented by the following Formula (OX-3-1):

(OX-3-1)

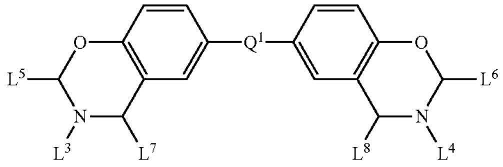

in Formula (OX-3-1), $L^3$ and $L^4$ are an organic group having 1 to 30 carbon atoms; $L^5$ to $L^8$ are hydrogen or a hydrocarbon group having 1 to 6 carbon atoms; and $Q^1$ is a single bond, $—CH_2—$, $—C(CH_3)_2—$, $—CO—$, $—O—$, $—SO_2—$, $—C(CH_3)_2—$ or $—C(CF_3)_2—$. The oxazine compound represented by Formula (OX-3-1) includes, for example, the following oxazine compounds:

(OX-3-1)

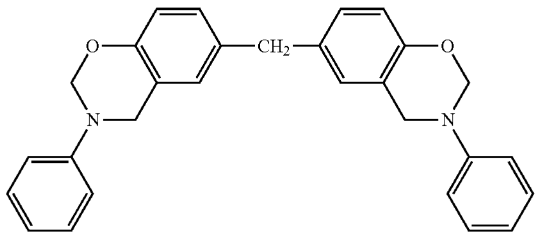

(OX-3-2)

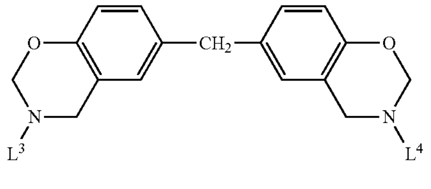

-continued
(OX-3-3)
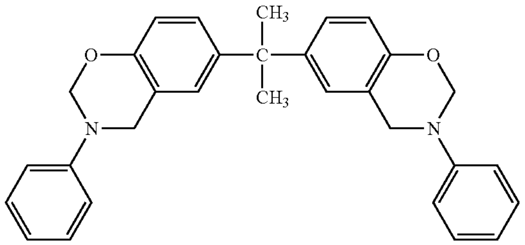
(OX-3-4)
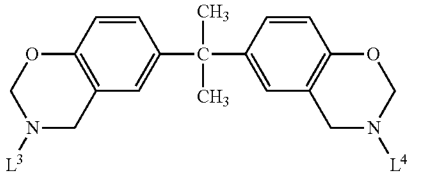
(OX-3-5)
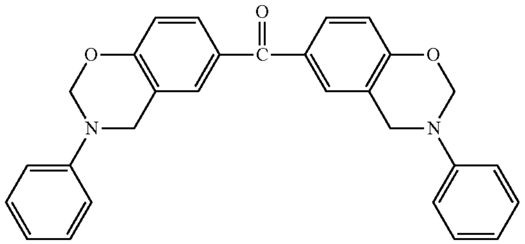
(OX-3-6)
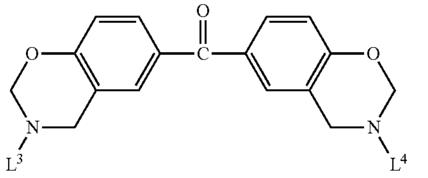
(OX-3-7)
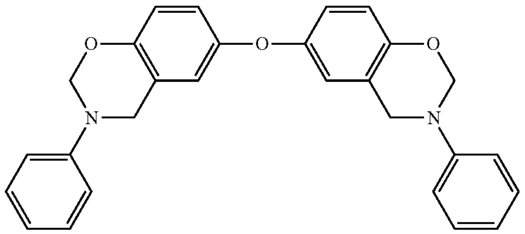
(OX-3-8)
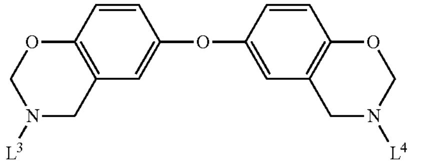
-continued
(OX-3-9)
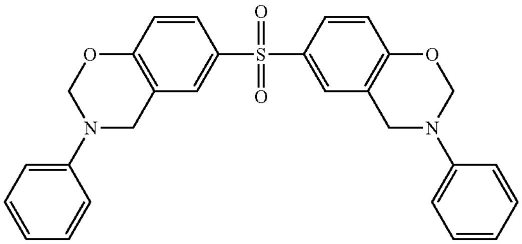
(OX-3-10)
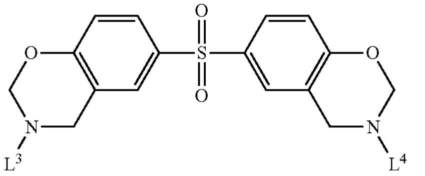
(OX-3-11)
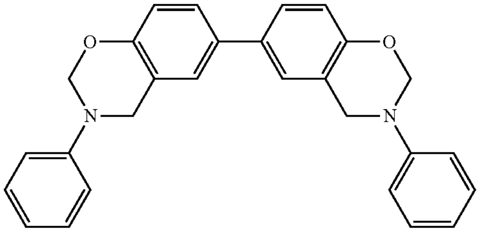
(OX-3-12)
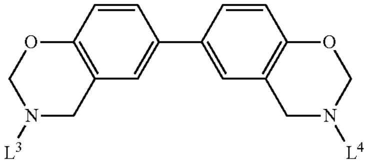
(OX-3-13)
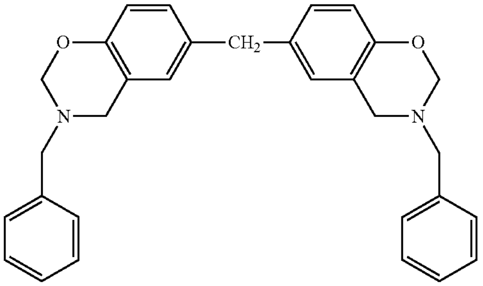
(OX-3-14)
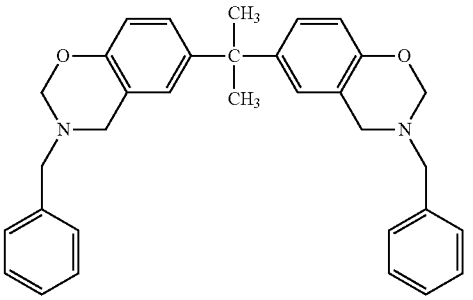

-continued (OX-3-15)

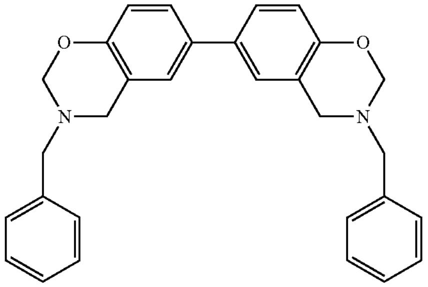

In the formulas, $L^3$ and $L^4$ are preferably alkyl having 1 to 30 carbon atoms, more preferably alkyl having 1 to 20 carbon atoms.

The oxazine compound represented by Formula (OX-4) includes, for example, the following oxazine compounds:

(OX-4-1)

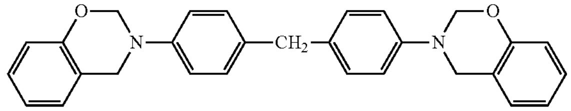

(OX-4-2)

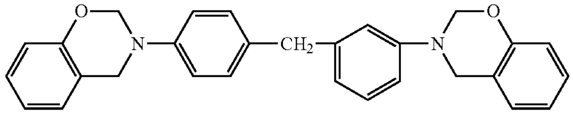

(OX-4-3)

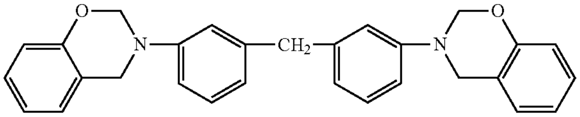

(OX-4-4)

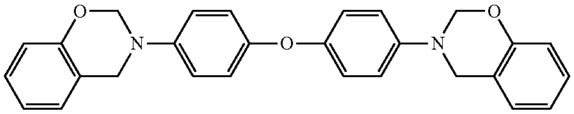

(OX-4-5)

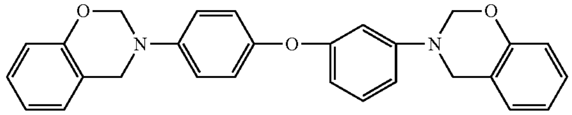

(OX-4-6)

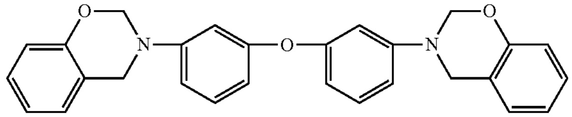

(OX-4-7)

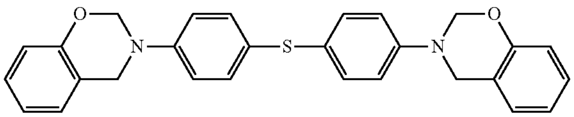

-continued (OX-4-8)

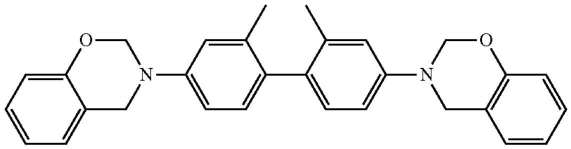

(OX-4-9)

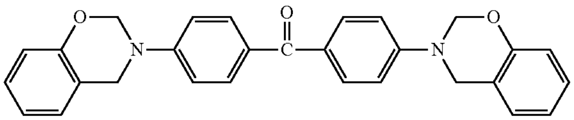

(OX-4-10)

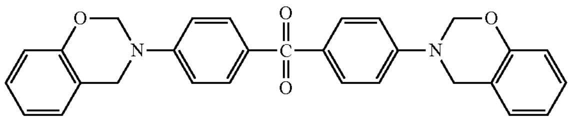

(OX-4-11)

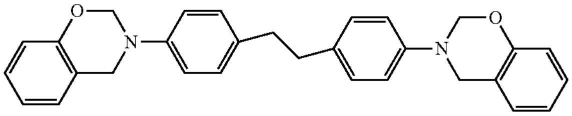

(OX-4-12)

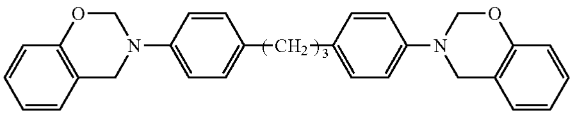

(OX-4-13)

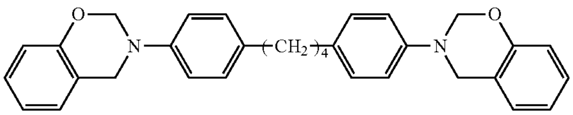

The oxazine compound represented by Formula (OX-5) includes, for example, the following oxazine compounds:

(OX-5-1)
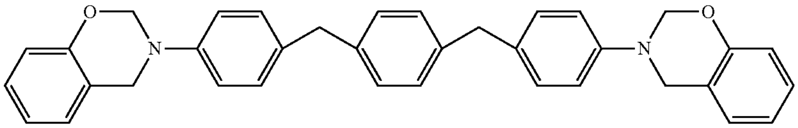
(OX-5-2)
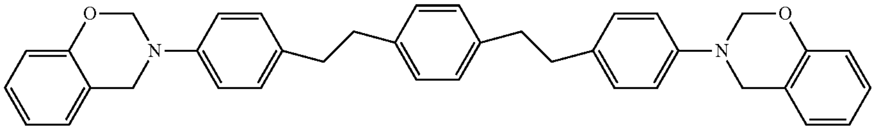
(OX-5-3)
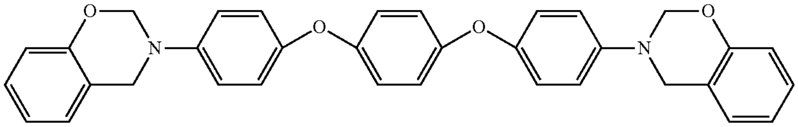
(OX-5-4)
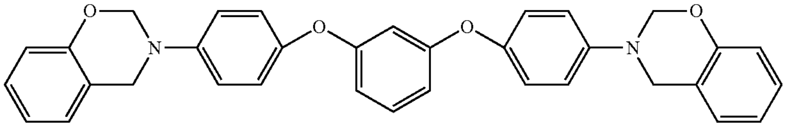
(OX-5-5)
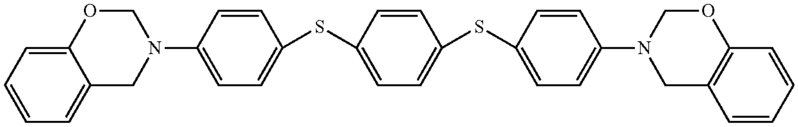
The oxazine compound represented by Formula (OX-6) includes, for example, the following oxazine compounds:
(OX-6-1)
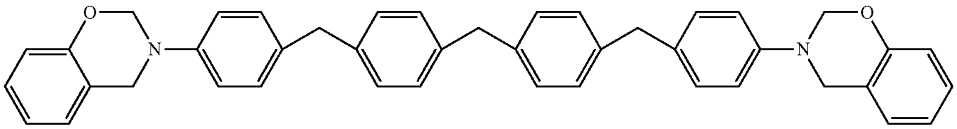
(OX-6-2)
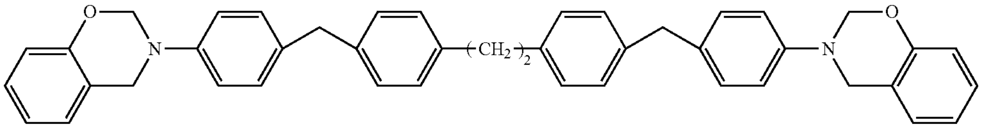
(OX-6-3)
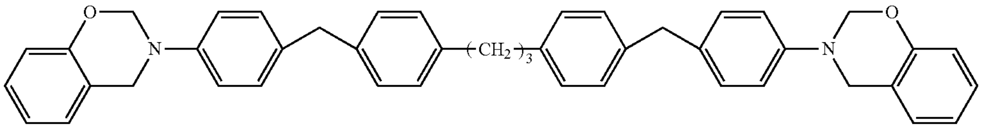
(OX-6-4)
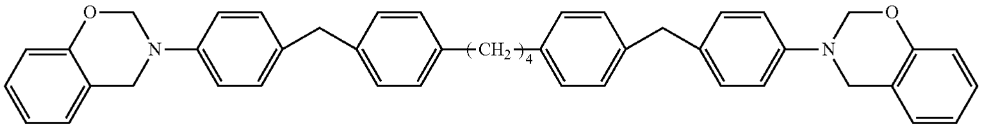
(OX-6-5)
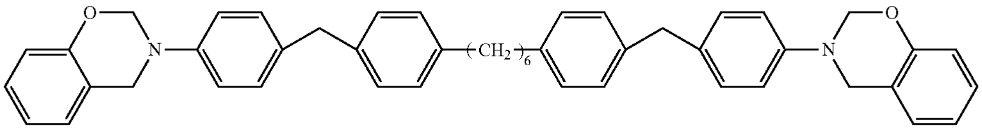

-continued
(OX-6-6)
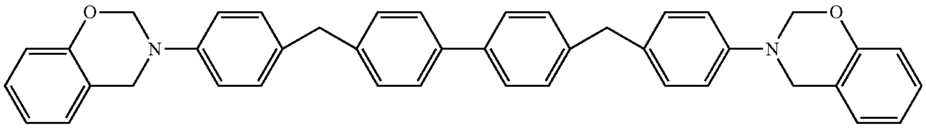
(OX-6-7)
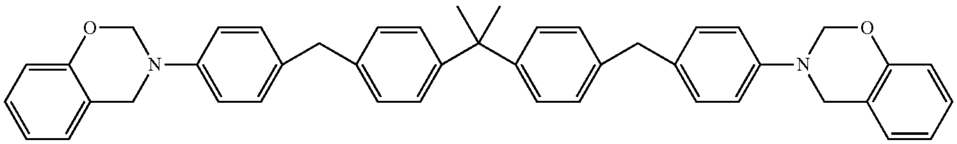
(OX-6-8)
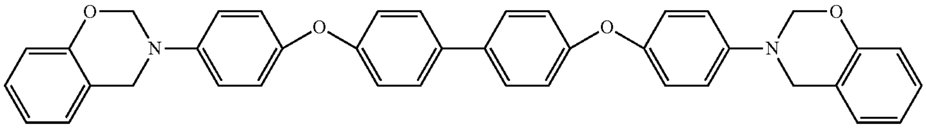
(OX-6-5)
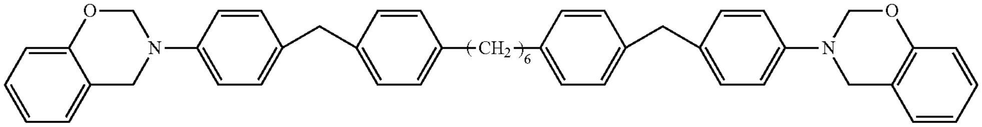
(OX-6-6)
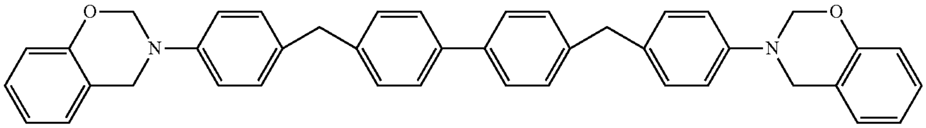
(OX-6-7)
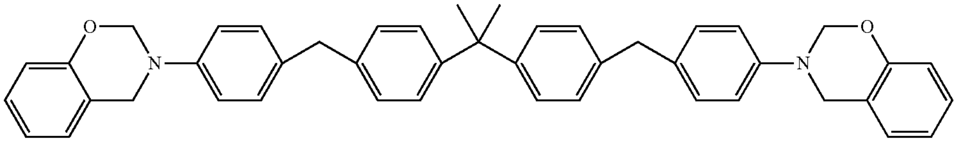
(OX-6-8)
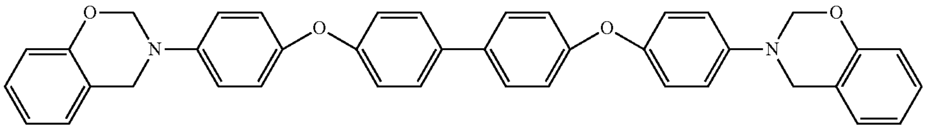
(OX-6-9)
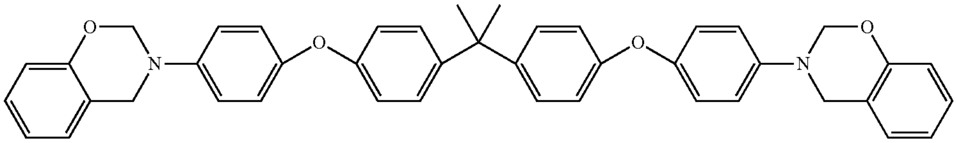
(OX-6-10)
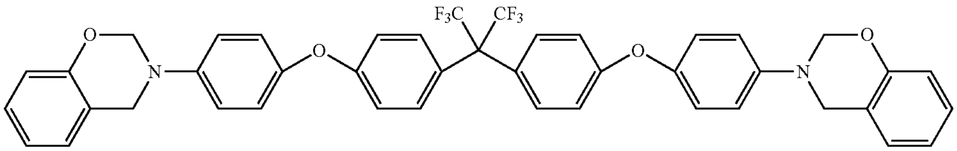
(OX-6-11)
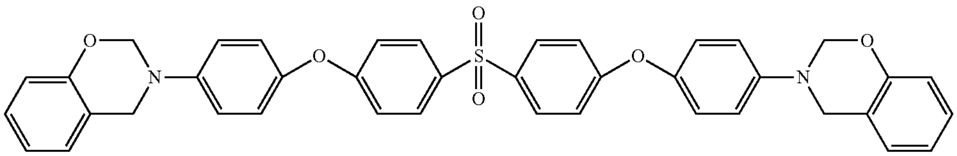
Among them, more preferably listed are the oxazine compounds represented by Formulas (OX-2-1), (OX-3-1), (OX-3-3), (OX-3-5), (OX-3-7), (OX-3-9), (OX-4-1) to (OX-4-6), (OX-5-3), (OX-5-4) and (OX-6-2) to (OX-6-4).
The oxazine compound can be produced by the same methods as those described in International Publication 2004/009708, JP-A 1999-12258 and JP-A 2004-352670.

The oxazine compound represented by Formula (OX-6) is obtained by reacting a phenol compound and primary amine with aldehyde (refer to International Publication 2004/009708).

The oxazine compound represented by Formula (OX-2) is obtained by gradually adding primary amine to formaldehyde to react them and then adding a naphthol base compound having a hydroxyl group to react them (refer to International Publication 2004/009708).

The oxazine compound represented by Formula (OX-3) is obtained by reacting 1 mole of a phenol compound, at least 2 mole or more of aldehyde based on one phenolic hydroxyl group of the phenol compound and 1 mole of primary amine in an organic solvent under the presence of secondary aliphatic amine, tertiary aliphatic amine or a basic nitrogen-containing heterocyclic compound (refer to International Publication 2004/009708 and JP-A 1999-12258).

The oxazine compounds represented by Formula (OX-4) to (OX-6) are obtained by subjecting to dehydration condensation reaction, diamine having plural benzene rings and organic groups combining them, such as 4,4'-diaminodiphenylmethane and the like, aldehyde such as formalin and the like, and phenol at a temperature of 90° C. or higher in n-butanol (refer to JP-A 2004-352670).

<Oxazoline Compound>

The liquid crystal aligning agent of the present invention may further contain, for example, an oxazoline compound for the purpose of stabilizing the electric characteristics of the liquid crystal display device over a long period of time. The oxazoline compound is a compound having an oxazoline structure. The oxazoline compound may comprise a single kind of a compound or two or more kinds of compounds. From the viewpoint of the purpose described above, a content of the oxazoline compound is preferably 0.1 to 50 parts by weight, more preferably 1 to 40 parts by weight and further preferably 1 to 20 parts by weight based on 100 parts by weight of the polyamic acid or derivative thereof. Or, when the oxazoline structure in the oxazoline compound is converted into oxazoline, a content of the oxazoline compound is preferably 0.1 to 40% by weight based on the polyamic acid or derivative thereof from the viewpoint of the purpose described above.

The oxazoline compound shall specifically be explained below.

The oxazoline compound may have either one kind of an oxazoline structure or two or more kinds of oxazoline structures in one compound. The oxazoline compound may have only one oxazoline structure in one compound, but it has preferably two or more structures. Also, the oxazoline compound may be either a polymer or a copolymer having an oxazoline ring structure on a side chain. The polymer having an oxazoline structure on a side chain may be a homopolymer of a monomer having an oxazoline structure on a side chain or a copolymer of a monomer having an oxazoline structure on a side chain with a monomer having no oxazoline structure. The copolymer having an oxazoline structure on a side chain may be a copolymer of two or more kinds of monomers having an oxazoline structure on a side chain or a copolymer of one or more kinds of monomers having an oxazoline structure on a side chain with monomers having no oxazoline structure.

The oxazoline structure is preferably a structure which is present in the oxazoline compound so that one or both of oxygen and nitrogen in the oxazoline structure can be reacted with a carbonyl group of the polyamic acid.

The oxazoline compound includes, for example, 2,2'-bis(2-oxazoline), 1,2,4-tris(2-oxazolynyl-2)-benzene, 4-furan-2-ylmethylene-2-phenyl-4H-oxazole-5-one, 1,4-bis(4,5-dihydro-2-oxazolyl)benzene, 1,3-bis(4,5-dihydro-2-oxazolyl)benzene, 2,3-bis(4-isopropenyl-2-oxazoline-2-yl)butane, 2,2'-bis-4-benzyl-2-oxazoline, 2,6-bis(isopropyl-2-oxazoline-2-yl)pyridine, 2,2'-isopropylidenebis(4-tert-butyl-2-oxazoline), 2,2'-isopropylidenebis(4-phenyl-2-oxazoline), 2,2'-methylenebis(4-tert-butyl-2-oxazoline) and 2,2'-methylenebis(4-phenyl-2-oxazoline). In addition to them, it includes polymers and oligomers having oxazoly, such as EPOCROS (trade name, manufactured by Nippon Shokubai Co., Ltd.). Among them, 1,3-bis(4,5-dihydro-2-oxazolyl)benzene is more preferred.

<Epoxy Compound>

The liquid crystal aligning agent of the present invention may further contain, for example, an epoxy compound for the purpose of stabilizing the electric characteristics of the liquid crystal display device over a long period of time. The epoxy compound may comprise a single kind of a compound or two or more kinds of compounds. From the viewpoint of the purpose described above, a content of the epoxy compound is preferably 0.1 to 50 parts by weight, more preferably 1 to 40% parts weight and further preferably 1 to 20 parts by weight based on 100 parts by weight of the polyamic acid or derivative thereof.

The epoxy compound shall specifically be explained below.

The epoxy compound includes various compounds having at least one epoxy ring in a molecule. Compounds having one epoxy ring in a molecule include, for example, phenyl glycidyl ether, butyl glycidyl ether, 3,3,3-trifluoromethylpropylene oxide, styrene oxide, hexafluoropropylene oxide, cyclohexene oxide, 3-glycidoxypropyltrimethoxysilane, 2-(3,4-epoxycyclohexyl)ethyltrimethoxysilane, N-glycidylphthalimide, (nonafluoro-N-butyl) epoxide, perfluoroethyl glycidyl ether, epichlorohydrin, epibromohydrin, N,N-diglycidylaniline and 3-[2-(perfluorohexyl)ethoxy]-1,2-epoxypropane.

Compounds having two epoxy rings in a molecule include, for example, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 3,4-epoxycyclohexenylmethyl-3',4'-epoxycyclohexenecarboxylate and 3-(N,N-diglycidyl)aminopropyltrimethoxysilane.

Compounds having three epoxy rings in a molecule include, for example, 2-[4-(2,3-epoxypropoxy)phenyl]-2-[4-[1,1-bis[4-([2,3-epoxypropoxy]phenyl)]ethyl]phenyl]propane (trade name: "TECHMORE VG3101L", manufactured by Mitsui Chemicals, Inc.).

Compounds having 4 epoxy rings in a molecule include, for example, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane and 3-(N-allyl-N-glycidyl)aminopropyltrimethoxysilane.

In addition to the compounds described above, the examples of compounds having epoxy rings in a molecule include as well oligomers and polymers having epoxy rings. Monomers having epoxy rings include, for example, glycidyl (meth)acrylate, 3,4-epoxycyclohexyl (meth)acrylate and methylglycidyl (meth)acrylate.

Other monomers copolymerized with the monomers having epoxy rings include, for example, (meth)acrylic acid, methyl (meth)acrylate, ethyl (meth)acrylate, isopropyl (meth)acrylate, butyl (meth)acrylate, iso-butyl (meth)acrylate, t-butyl (meth)acrylate, cyclohexyl (meth)acrylate, benzyl (meth)acrylate, 2-hydroxyethyl (meth)acrylate, 2-hydroxypropyl (meth)acrylate, styrene, methylstyrene, chloromethylstyrene, (3-ethyl-3-oxetanyl)methyl (meth) acrylate, N-cyclohexylmaleimide and N-phenylmaleimide.

The preferred specific examples of the polymers of the monomers having epoxy rings include polyglycidyl methacrylate and the like. Also, the preferred specific examples of the copolymers of the monomers having epoxy rings with other monomers include N-phenylmaleimide-glycidyl methacrylate copolymers, N-cyclohexylmaleimide-glycidyl methacrylate copolymers, benzyl methacrylate-glycidyl methacrylate copolymers, butyl methacrylate-glycidyl methacrylate copolymers, 2-hydroxyethyl methacrylate-glycidyl methacrylate copolymers, (3-ethyl-3-oxetanyl)methyl methacrylate-glycidyl methacrylate copolymers, and styrene-glycidyl methacrylate copolymers.

Among the above examples, particularly preferred are N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, trade name: 「TECHMORE VG3101L」, 3,4-epoxycyclohexenylmethyl-3',4'-epoxycyclohexenecarboxylate, N-phenylmaleimide-glycidyl methacrylate copolymers, and 2-(3,4-epoxycyclohexyl)ethyltrimethoxysilane.

To be systematic, the epoxy compound includes, for example, glycidyl ethers, glycidyl esters, glycidylamines, epoxy group-containing acryl base resins, glycidylamides, glycidyl isocyanurates, linear aliphatic epoxy compounds, and cyclic aliphatic epoxy compounds. The epoxy compounds mean compounds having an epoxy group, and the epoxy resins mean resins having an epoxy group.

The glycidyl ethers include, for example, bisphenol A type epoxy compounds, bisphenol F type epoxy compounds, bisphenol S type epoxy compounds, bisphenol type epoxy compounds, hydrogenated bisphenol A type epoxy compounds, hydrogenated bisphenol F type epoxy compounds, hydrogenated bisphenol S type epoxy compounds, hydrogenated bisphenol type epoxy compounds, brominated bisphenol A type epoxy compounds, brominated bisphenol F type epoxy compounds, phenol novolac type epoxy compounds, cresol novolac type epoxy compounds, brominated phenol novolac type epoxy compounds, brominated cresol novolac type epoxy compounds, bisphenol A novolac type epoxy compounds, naphthalene skeleton-containing epoxy compounds, aromatic polyglycidyl ether compounds, dicyclopentadiene phenol type epoxy compounds, alicyclic diglycidyl ether compounds, aliphatic polyglycidyl ether compounds, polysulfide type diglycidyl ether compounds, and biphenol type epoxy compounds.

The glycidyl esters include, for example, diglycidyl ester compounds and glycidyl ester epoxy compounds.

The glycidylamines include, for example, polyglycidylamine compounds and glycidylamine type epoxy resins.

The epoxy group-containing acryl base resins include, for example, homopolymer and copolymers of acryl monomers having oxyranyl.

The glycidylamides include, for example, glycidylamide type epoxy compounds.

The linear aliphatic epoxy compounds include, for example, compounds containing an epoxy group which are obtained by oxidizing a carbon-carbon double bond of alkene compounds.

The cyclic aliphatic epoxy compounds include, for example, compounds containing an epoxy group which are obtained by oxidizing a carbon-carbon double bond of cycloalkene compounds.

The bisphenol A type epoxy compounds include, for example, jER828, jER1001, jER1002, jER1003, jER1004, jER1007 and jER1010 (all manufactured by Mitsubishi Chemical Corporation), Epotohto YD-128 (manufactured by Tohto Kasei Co., Ltd.), DER-331, DER-332 and DER-334 (all manufactured by The Dow Chemical Company), EPICLON 840, EPICLON 850 and EPICLON 1050 (all manufactured by DIC Corporation), and EPMIC R-140, EPMIC R-301, and EPMIC R-304 (all manufactured by Mitsui Chemicals, Inc.).

The bisphenol F type epoxy compounds include, for example, jER806, jER807 and jER4004P (all manufactured by Mitsubishi Chemical Corporation), Epotohto YDF-170, Epotohto YDF-175S and Epotohto YDF-2001 (all manufactured by Tohto Kasei Co., Ltd.), DER-354 (manufactured by The Dow Chemical Company), and EPICLON 830 and EPICLON 835 (all manufactured by DIC Corporation).

The bisphenol type epoxy compounds include, for example, epoxy compounds of 2,2-bis(4-hydroxyphenyl)-1,1,1,3,3,3-hexafluoropropane.

The hydrogenated bisphenol A type epoxy compounds include, for example, Santohto ST-3000 (manufactured by Tohto Kasei Co., Ltd.), RIKARESIN HBE-100 (manufactured by New Japan Chemical Co., Ltd.), and Denacol EX-252 (manufactured by Nagase ChemteX Corporation).

The hydrogenate bisphenol type epoxy compounds include, for example, epoxy compounds of hydrogenate 2,2-bis(4-hydroxyphenyl)-1,1,1,3,3,3-hexafluoropropane.

The brominated bisphenol A type epoxy compounds include, for example, jER5050 and jER5051 (all manufactured by Mitsubishi Chemical Corporation), Epotohto YDB-360 and Epotohto YDB-400 (all manufactured by Tohto Kasei Co., Ltd.), DER-530 and DER-538 (all manufactured by The Dow Chemical Company), and EPICLON 152 and EPICLON 153 (all manufactured by DIC Corporation).

The phenol novolac type epoxy compounds include, for example, jER152 and jER154 (all manufactured by Mitsubishi Chemical Corporation), YDPN-638 (manufactured by Tohto Kasei Co., Ltd.), DEN-431 and DEN-438 (all manufactured by The Dow Chemical Company), EPICLON N-770 (manufactured by DIC Corporation), and EPPN-201 and EPPN-202 (all manufactured by Nippon Kayaku Co., Ltd.).

The cresol novolac type epoxy compounds include, for example, jER180S75 (manufactured by Mitsubishi Chemical Corporation), YDCN-701 and YDCN-702 (all manufactured by Tohto Kasei Co., Ltd.), EPICLON N-665 and EPICLON N-695 (all manufactured by DIC Corporation), and EOCN-102S, EOCN-103S, EOCN-104S, EOCN-1020, EOCN-1025, and EOCN-1027 (all manufactured by Nippon Kayaku Co., Ltd.).

The bisphenol A novolac type epoxy compounds include, for example, jER157S70 (manufactured by Mitsubishi Chemical Corporation) and EPICLON N-880 (manufactured by DIC Corporation).

The naphthalene skeleton-containing epoxy compounds include, for example, EPICLON HP-4032, EPICLON HP-4700 and EPICLON HP-4770 (manufactured by DIC Corporation), and NC-7000 (manufactured by Nippon Kayaku Co., Ltd.).

The aromatic polyglycidyl ether compounds include, for example, hydroquinone diglycidyl ether (following Formula EP-1), catechol diglycidyl ether (following Formula EP-2), resorcinol diglycidyl ether (following Formula EP-3), 2-[4-(2,3-epoxypropoxy)phenyl]-2-[4-[1,1-bis[4-([2,3-epoxypropoxy]phenyl)]ethyl]phenyl]propane (following Formula EP-4), tris(4-glycidyloxyphenyl)methane (following Formula EP-5), jER1031S and jER1032H60 (all manufactured by Mitsubishi Chemical Corporation), TACTIX-742 (manufactured by The Dow Chemical Company), Denacol EX-201 (manufactured by Nagase ChemteX Corporation), DPPN-503, DPPN-502H, DPPN-501H, and NC6000 (all manufactured by Nippon Kayaku Co., Ltd.), TECHMORE VG3101L (manufactured by Mitsui Chemicals, Inc.), a compound represented by the following Formula EP-6, and a compound represented by the following Formula EP-7:

(EP-1)

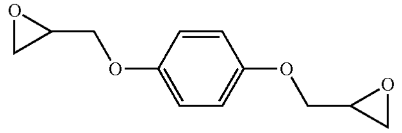

(EP-2)

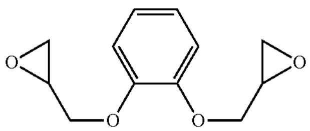

(EP-3)

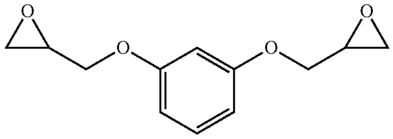

(EP-4)

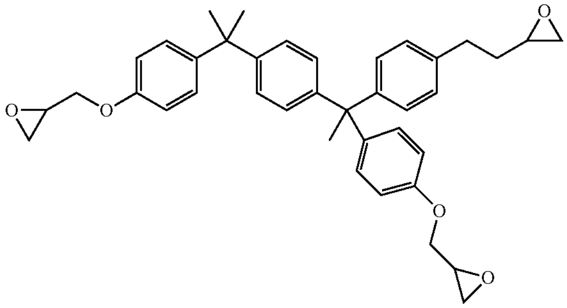

(EP-5)

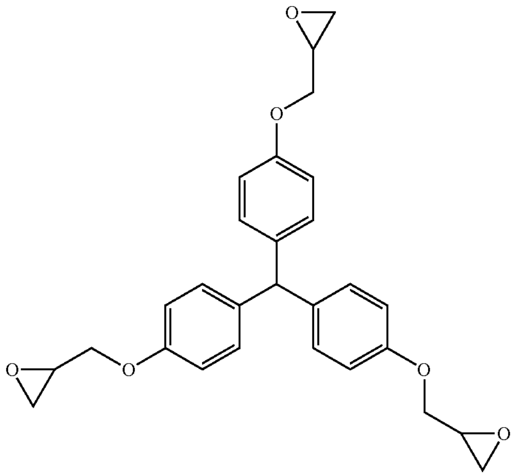

(EP-6)

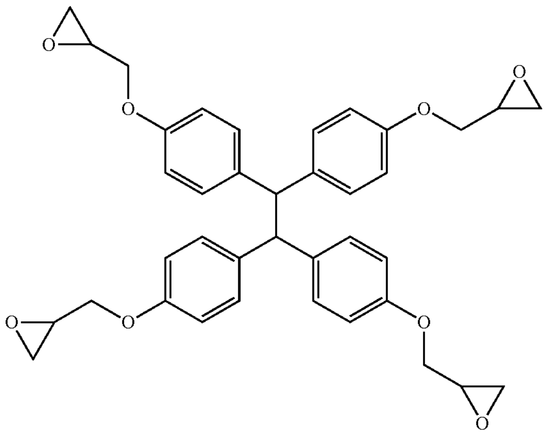

-continued (EP-7)

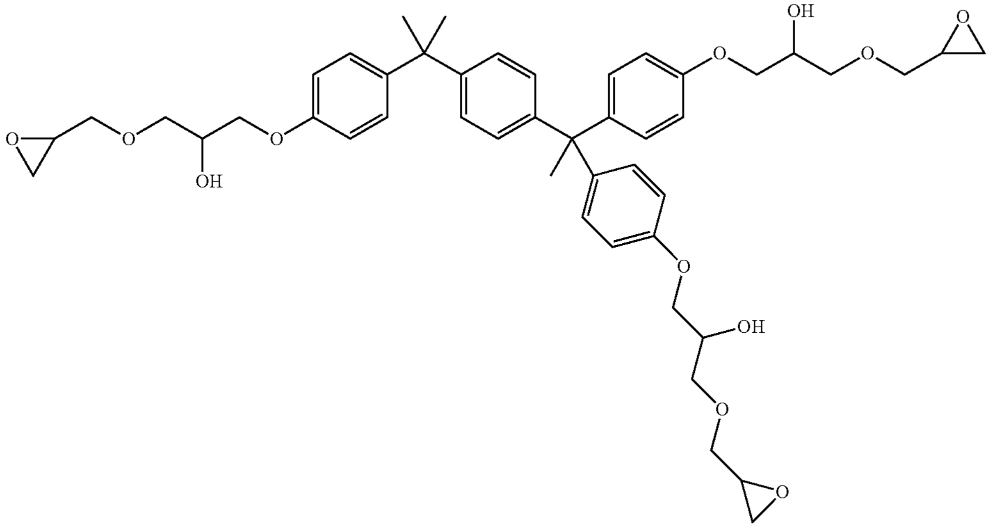

The dicyclopentadiene phenol type epoxy compounds include, for example, TACTIX-556 (manufactured by The Dow Chemical Company) and EPICLON HP-7200 (manufactured by DIC Corporation).

The alicyclic diglycidyl ether compounds include, for example, cyclohexanedimethanol diglycidyl ether compounds and RIKARESIN DME-100 (manufactured by New Japan Chemical Co., Ltd.).

The aliphatic polyglycidyl ether compounds include, for example, ethylene glycol diglycidyl ether (following Formula EP-8), diethylene glycol diglycidyl ether (following Formula EP-9), polyethylene glycol diglycidyl ether, polypropylene glycol diglycidyl ether (following Formula EP-10), tripropylene glycol diglycidyl ether (following Formula EP-11), polypropylene glycol diglycidyl ether, neopentyl glycol diglycidyl ether (following Formula EP-12), 1,4-butandiol diglycidyl ether (following Formula EP-13), 1,6-hexandiol diglycidyl ether (following Formula EP-14), dibromoneopentyl glycol diglycidyl ether (following Formula EP-15), Denacol EX-810, Denacol EX-851, Denacol EX-8301, Denacol EX-911, Denacol EX-920, Denacol EX-931, Denacol EX-211, Denacol EX-212, and Denacol EX-313 (all manufactured by Nagase ChemteX Corporation), DD-503 (manufactured by ADEKA CORPORATION), RIKARESIN W-100 (manufactured by New Japan Chemical Co., Ltd.), 1,3,5,6-tetraglycidyl-2,4-henxanediol (following Formula EP-16), glycerin polyglycidyl ether, sorbitol polyglycidyl ether, trimethylolpropane polyglycidyl ether, pentaerythritol polyglycidyl ether, and Denacol EX-313, Denacol EX-611, Denacol EX-321, and Denacol EX-411 (all manufactured by Nagase ChemteX Corporation):

(EP-8)

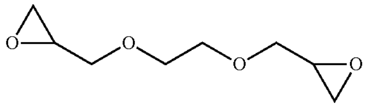

(EP-9)

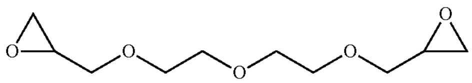

-continued (EP-10)

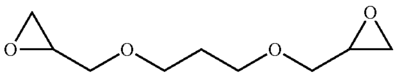

(EP-11)

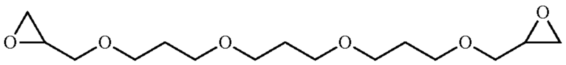

(EP-12)

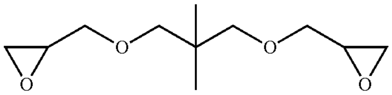

(EP-13)

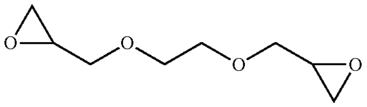

(EP-14)

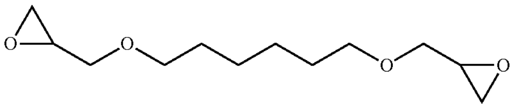

(EP-15)

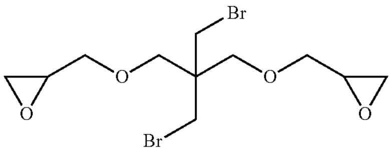

(EP-16)

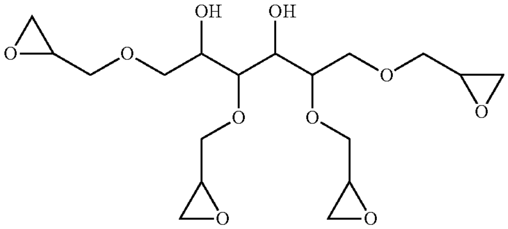

The polysulfide type diglycidyl ether compounds include, for example, FLDP-50 and FLDP-60 (all manufactured by Toray Thiokol Co., Ltd.).

The biphenol type epoxy compounds include, for example, YX-4000 and YL-6121H (all manufactured by Mitsubishi Chemical Corporation), and NC-3000P and NC3000S (all manufactured by Nippon Kayaku Co., Ltd.).

The diglycidyl ester compounds include, for example, diglycidyl terephthalate (following Formula EP-17), diglycidyl phthalate (following Formula EP-18), bis(2-methyloxyranylmethyl) phthalate (following Formula EP-19), diglycidyl hexahydrophthalate (following Formula EP-20), a compound represented by the following Formula EP-21, a compound represented by the following Formula EP-22, and a compound represented by the following Formula EP-23:

(EP-17)

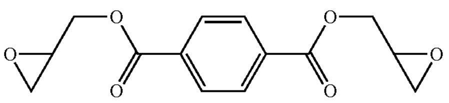

(EP-18)

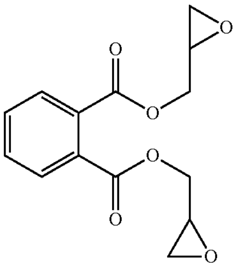

(EP-19)

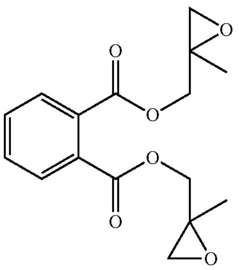

(EP-20)

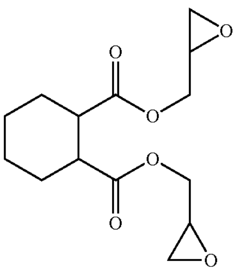

(EP-21)

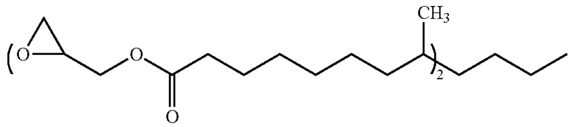

(EP-22)

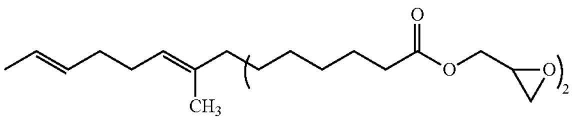

-continued (EP-23)

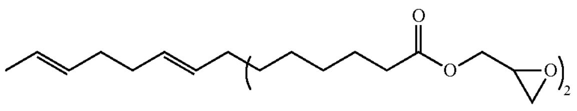

The glycidyl ester epoxy compounds include, for example, jER871 and jER872 (all manufactured by Mitsubishi Chemical Corporation), EPICLON 200 and EPICLON 400 (all manufactured by DIC Corporation), and Denacol EX-711 and Denacol EX-721 (all manufactured by Nagase ChemteX Corporation).

The polyglycidylamine compounds include, for example, N,N-diglycidylaniline (following Formula EP-24), N,N-diglycidyl-o-toluidine (following Formula EP-25), N,N-diglycidyl-m-toluidine (following Formula EP-26), N,N-diglycidyl-2,4,6-tribromoaniline (following Formula EP-27), 3-(N,N-diglycidyl)aminopropyltrimethoxysilane (following Formula EP-28), N,N,O-triglycidyl-p-aminophenol (following Formula EP-29), N,N,O-triglycidyl-m-aminophenol (following Formula EP-30), N,N,N',N',-tetraglycidyl-4,4'-diaminodiphenylmethane (following Formula EP-31), N,N,N',N'-tetraglycidyl-m-xylylenediamine (TETRAD-X (manufactured by Mitsubishi Gas Chemical Company, Inc.), following Formula EP-32), 1,3-bis(N,N-diglycidylaminomethyl)cyclohexane (TETRAD-C (manufactured by Mitsubishi Gas Chemical Company, Inc.), following Formula EP-33), 1,4-bis(N,N-diglycidylaminomethyl)cyclohexane (following Formula EP-34), 1,3-bis(N,N-diglycidylamino)cyclohexane (following Formula EP-35), 1,4-bis(N,N-diglycidylamino)cyclohexane (following Formula EP-36), 1,3-bis(N,N-diglycidylamino)benzene (following Formula EP-37), 1,4-bis(N,N-diglycidylamino)benzene (following Formula EP-38), 2,6-bis(N,N-diglycidylaminomethyl)bicyclo[2.2.1]heptane (following Formula EP-39), N,N,N',N'-tetraglycidyl-4,4'-diaminodicyclohexylmethane (following Formula EP-40), 2,2'-dimethyl-(N,N,N',N'-tetraglycidyl)-4,4'-diaminobiphenyl (following Formula EP-41), N,N,N',N'-tetraglycidyl-4,4'-diaminodiphenyl ether (following Formula EP-42), 1,3,5-tris(4-(N,N-diglycidyl)aminophenoxy)benzene (following Formula EP-43), 2,4,4'-tris(N,N-diglycidylamino)diphenyl ether (following Formula EP-44), tris(4-(N,N-diglycidyl)aminophenyl)methane (following Formula EP-45), 3,4,3',4'-tetrakis (N,N-diglycidylamino)biphenyl (following Formula EP-46), 3,4,3',4'-tetrakis(N,N-diglycidylamino)diphenyl ether (following Formula EP-47), a compound represented by the following Formula EP-48, and a compound represented by the following Formula EP-49:

(EP-24)
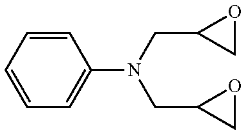
(EP-25)
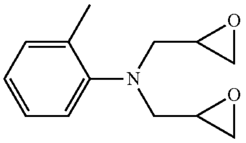
(EP-26)
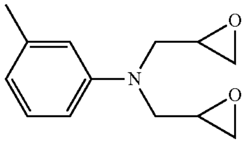
(EP-27)
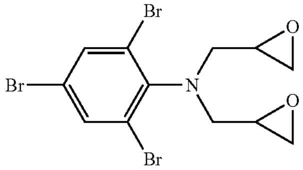
(EP-28)
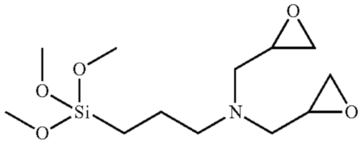
(EP-29)
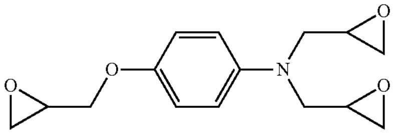
(EP-30)
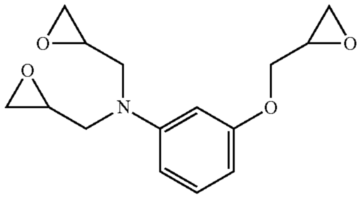
(EP-31)
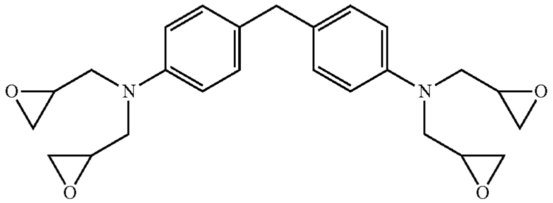
(EP-32)
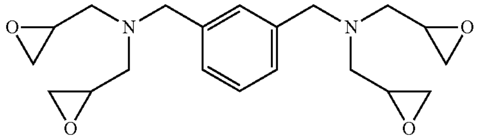
(EP-33)
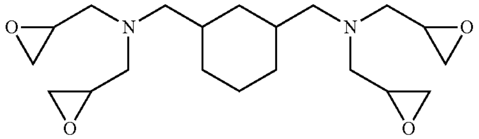
(EP-34)
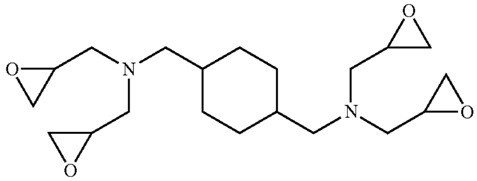
(EP-35)
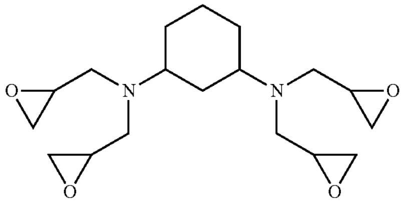
(EP-36)
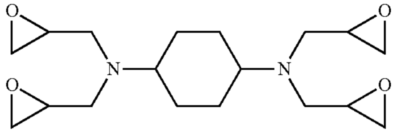
(EP-37)
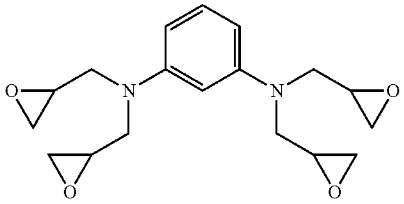
(EP-38)
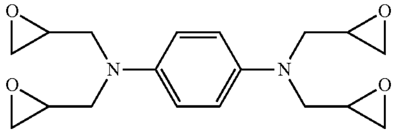
(EP-39)
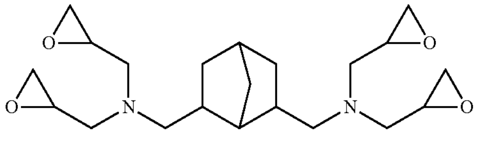

-continued
(EP-40)
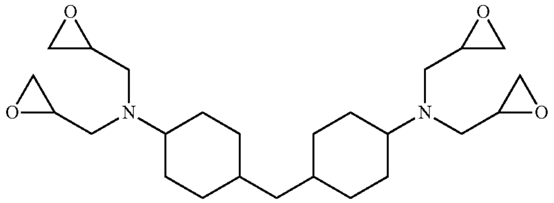
(EP-41)
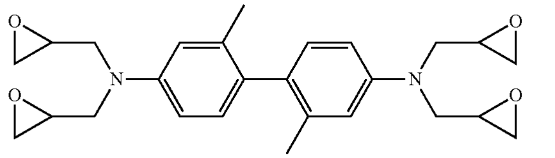
(EP-42)
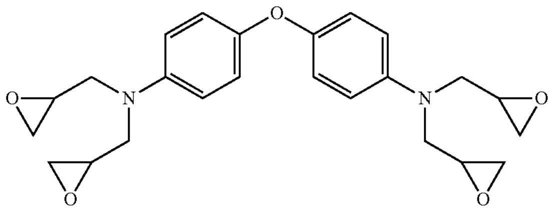
(EP-43)
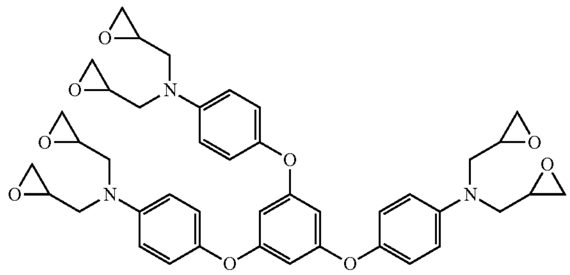
(EP-44)
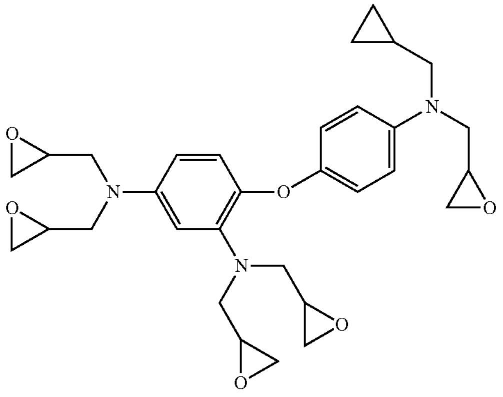
(EP-45)
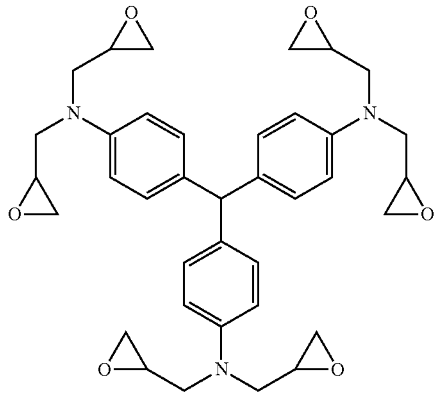
(EP-46)
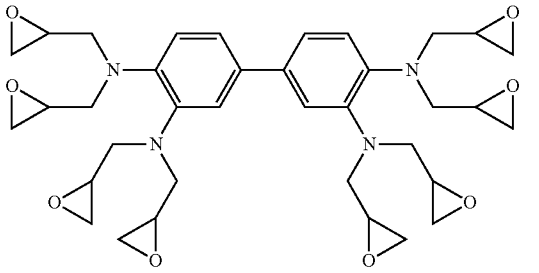
(EP-47)
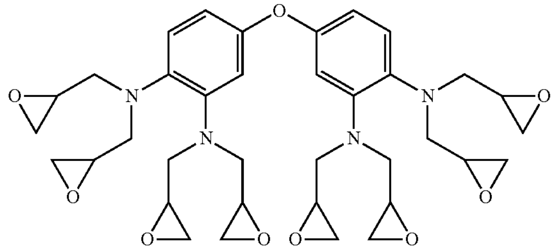
(EP-48)
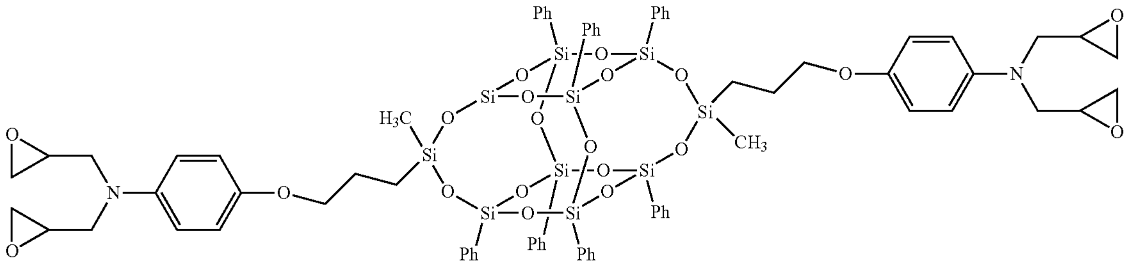

-continued (EP-49)

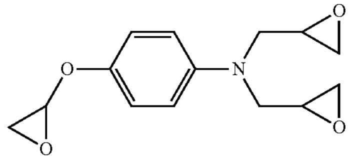

The homopolymers of the monomers having oxyranyl include, for example, polyglycidyl methacrylate. The copolymers of the monomers having oxyranyl include, for example, N-phenylmaleimide-glycidyl methacrylate copolymers, N-cyclohexylmaleimide-glycidyl methacrylate copolymers, benzyl methacrylate-glycidyl methacrylate copolymers, butyl methacrylate-glycidyl methacrylate copolymers, 2-hydroxyethyl methacrylate-glycidyl methacrylate copolymers, (3-ethyl-3-oxetanyl)methyl methacrylate-glycidyl methacrylate copolymers, and styrene-glycidyl methacrylate copolymers.

The monomers having oxyranyl include, for example, glycidyl (meth)acrylate, 3,4-epoxycyclohexyl (meth)acrylate, and methylglycidyl (meth)acrylate.

Other monomers than the monomers having oxyranyl in the copolymers of the monomers having oxyranyl include, for example, (meth)acrylic acid, methyl (meth)acrylate, ethyl (meth)acrylate, isopropyl (meth)acrylate, butyl (meth) acrylate, iso-butyl (meth)acrylate, t-butyl (meth)acrylate, cyclohexyl (meth)acrylate, benzyl (meth)acrylate, 2-hydroxyethyl (meth)acrylate, 2-hydroxypropyl (meth)acrylate, styrene, methylstyrene, chloromethylstyrene, (3-ethyl-3-oxetanyl)methyl (meth)acrylate, N-cyclohexylmaleimide, and N-phenylmaleimide.

Glycidyl isocyanurate includes, for example, 1,3,5-triglycidyl-1,3,5-triazine-2,4,6-(1H,3H,5H)-trione (following Formula EP-50), 1,3-diglycidyl-5-allyl-1,3,5-triazine-2,4,6-(1H,3H,5H)-trione (following Formula EP-51), and glycidyl isocyanurate type epoxy resins:

(EP-50)

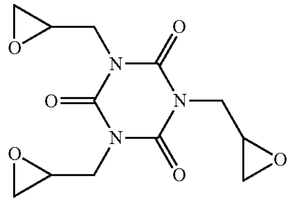

(EP-51)

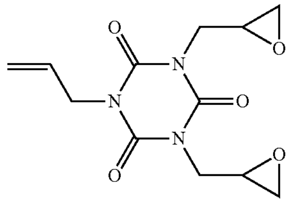

The linear aliphatic epoxy compounds include, for example, epoxidized polybutadiene and EPOLEAD PB3600 (manufactured by DAICEL CORPORATION).

The cyclic aliphatic epoxy compounds include, for example, 3,4-epoxycyclohexenylmethyl-3',4'-epoxycyclohexenecarboxylate (CELLOXIDE 2021 (manufactured by DAICEL CORPORATION), following Formula EP-52), 2-methyl-3,4-epoxycyclohexylmethyl-2'-methyl-3',4'-epoxycyclohexylcarboxylate (following Formula EP-53), 2,3-epoxycyclopentane-2',3'-epoxycyclopentaneether (following Formula EP-54), ϵ-caprolactone-modified 3,4-epoxycyclohexylmethyl-3',4'-epoxycyclohexanecarboxylate, 1,2:8,9-diepoxylimonene (CELLOXIDE 3000 (manufactured by DAICEL CORPORATION), following Formula EP-55), a compound represented by the following Formula EP-56, CY-175, CY-177 and CY-179 (all manufactured by The Ciba-Geigy Chemical Corp. (available from Huntsman Japan Inc.)), EHPD-3150 (manufactured by DAICEL CORPORATION), and cyclic aliphatic epoxy resins:

(EP-52)

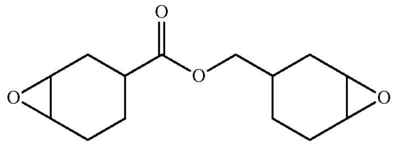

(EP-53)

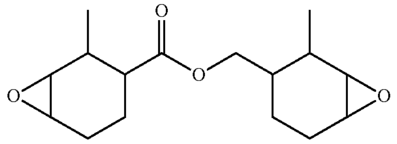

(EP-54)

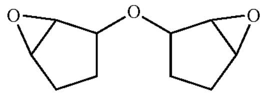

(EP-55)

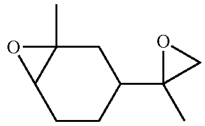

(EP-56)

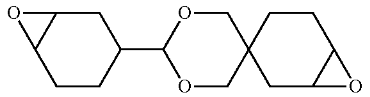

The epoxy compound is preferably at least one of the polyglycidylamine compounds, the bisphenol A novolac type epoxy compounds, the cresol novolac type epoxy compounds, and the cyclic aliphatic epoxy compounds, and it is preferably at least one of N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, trade name: “TECHMORE VG3101L”, 3,4-epoxycyclohexenylmethyl-3',4'-epoxycyclohexenecarboxylate, the N-phenylmaleimide-glycidyl methacrylate copolymers, N,N,O-triglycidyl-p-aminophenol, the bisphenol A novolac type epoxy compounds, and the cresol novolac type epoxy compounds.

<Other Polymers>

The liquid crystal aligning agent of the present invention may further contain, for example, polymers other than the polyamic acid and derivative thereof for the purpose of controlling the electric characteristics and an aligning property of the liquid crystal display device. The above polymers include polymers soluble in organic solvents. The above polymers may be used alone or in combination of two or more kinds thereof. From the viewpoint of the purpose described above, a content of the above polymers is preferably 0.01 to 100 parts by weight, more preferably 0.1 to 70 parts by weight and further preferably 0.1 to 50 parts by weight based on 100 parts by weight of the polyamic acid or derivative thereof. The above polymers include, for example, polyamides, polyurethanes, polyureas, polyesters, polyepoxides, polyesterpolyols, silicone-modified polyurethanes, silicone-modified polyesters, polyacrylic acid alkyl esters, polymethacrylic acid alkyl esters, acrylic acid alkyl esters and methacrylic acid alkyl esters copolymers, polyoxyethylene glycol diacrylate, polyoxyethylene glycol dimethacrylate, polyoxypropylene glycol diacrylate, and polyoxypropylene glycol dimethacrylate.

<Low Molecular Compound>

The liquid crystal aligning agent of the present invention may further contain, for example, a low molecular compound. The low molecular compound includes, for example, 1) when the coating property is desired to be enhanced, a surfactant which meets the above purpose, 2) when the antistatic property is required to be enhanced, an antistatic agent, 3) when the adhesive property with the substrate and the rubbing resistance are desired to be enhanced, a silane coupling agent and a titanium base coupling agent, and 4) when the imidization is promoted at low temperature, an imidization catalyst. From the viewpoints described above, a content of the low molecular compound is preferably 0.1 to 50 parts by weight, more preferably 0.1 to 40 parts by weight and further preferably 0.1 to 20 parts by weight based on 100 parts by weight of the polyamic acid or derivative thereof.

The silane compounds having an epoxy group which are listed as the examples of the epoxy compounds are included as well in the silane coupling agent. For the purpose of stabilizing the electric characteristics over a long period of time in addition to enhancing the adhesive property with the substrate and the rubbing resistance, the silane coupling agent having an epoxy group may be added to the liquid crystal aligning agent of the present invention.

The silane coupling agent includes, for example, vinyitrimethoxysilane, vinyltriethoxysilane, N-(2-aminoethyl)-3-aminopropylmethyldimethoxysilane, N-(2-aminoethyl)-3-aminopropylmethyltrimethoxysilane, paraaminophenyltrimethoxysilane, paraaminophenyltriethoxysilane, metaminophenyltrimethoxysilane, metaaminophenyl-triethoxysilane, 3-aminopropyltrimethoxysilane, 3-aminopropyltriethoxysilane, 3-chloropropylmethyl-dimethoxysilane, 3-chloropropyltrimethoxysilane, 3-methacryloxypropyltrimethoxysilane, 3-mercaptopropyltrimethoxysilane, N-(1,3-dimethylbutylidene)-3-(triethoxysilyl)-1-propylamine, and N,N'-bis[3-(trimethoxysilyl)propyl]ethylenediamine. The silane coupling agent having an epoxy group includes 3-glycidoxypropyltrimethoxysilane, 3-glycidoxypropylmethyldimethoxysilane, and 2-(3,4-epoxycyclohexyl)ethyltrimethoxysilane.

The preferred silane coupling agent includes 3-glycidoxypropyltrimethoxysilane, 2-(3,4-epoxycyclohexyl)ethyltrimethoxysilane, paraminophenyltrimethoxysilane, and 3-aminopropyltriethoxysilane.

The imidization catalyst includes, for example, aliphatic amines such as trimethylamine, triethylamine, tripropylamine, tributylamine, and the like; aromatic amines such as N,N-dimethylaniline, N,N-diethylaniline, methyl-substituted aniline, hydroxy-substituted aniline, and the like; and cyclic amines such as pyridine, methyl-substituted pyridine, hydroxy-substituted pyridine, quinoline, methyl-substituted quinoline, hydroxy-substituted quinoline, isoquinoline, methyl-substituted isoquinoline, hydroxy-substituted isoquinoline, imidazole, methyl-substituted imidazole, hydroxy-substituted imidazole, and the like. The imidization catalyst is preferably at least one selected from N,N-dimethylaniline, o-hydroxyaniline, m-hydroxyaniline, p-hydroxyaniline, o-hydroxypyridine, m-hydroxypyridine, p-hydroxypyridine, and isoquinoline.

<Solvent>

The aligning agent of the present invention is a solution obtained by dissolving the polyamic acid or derivative thereof in a solvent. The solvent can suitably be selected from solvents used in producing and using publicly known polyamic acids according to the use purposes. The examples of the above solvents are shown below.

The examples of aprotic organic solvents include N-methyl-2-pyrrolidone (NMP), dimethylimidazolidinone, N-methylcaprolactam, N-methylpropionamide, N,N-dimethylacetamide, dimethyl sulfoxide, N,N-dimethylformamide (DMF), N,N-diethylformamide, N,N-diethylacetamide (DMAc), and lactones such as γ-butyrolactone (GBL) and the like.

The preferred examples of solvents which are solvents other than those described above and which are used for the purpose of improving the coating property and the like include alkyl butyrate, 3-methyl-3-methoxybutanol, tetralin, isophorone, ethylene glycol monoalkyl ethers (examples: ethylene glycol monobutyl ether (BC)), diethylene glycol monoalkyl ethers (examples: diethylene glycol monoethyl ether), ethylene glycol monophenyl ether, triethylene glycol monoalkyl ethers, propylene glycol monoalkyl ethers (examples: propylene glycol monobutyl ether), dialkyl malonate (examples: diethyl malonate), dipropylene glycol monoalkyl ethers (examples: dipropylene glycol monomethyl ether), and ester compounds of the above glycol monoethers. Among them, MMP, dimethylimidazolidinone, GBL, BCS, diethylene glycol monoethyl ether, propylene glycol monobutyl ether, and dipropylene glycol monomethyl ether are particularly preferred.

A concentration of the polymers in the aligning agent of the present invention is preferably 0.1 to 40% by weight, more preferably 1 to 10% by weight. When a layer thickness thereof has to be controlled in coating the aligning agent on the substrate, a concentration of the polymers contained can be controlled in advance by diluting it with a solvent.

A viscosity of the aligning agent of the present invention is varied in a preferred range according to a coating method, a concentration of the polyamic acid or derivative thereof, the kind of the polyamic acid or derivative thereof used, and the kind and a proportion of the solvent. When coating it by means of, for example, a printing machine, the viscosity is 5 to 100 mPa·s (more preferably 10 to 80 mPa·s). If it is smaller than 5 mPa·s, it is difficult to obtain the sufficiently large layer thickness, and if it exceeds 100 mPa·s, unevenness in printing is increased in a certain case. In a case of coating by spin coating, the viscosity is suitably 5 to 200 mPa·s (more preferably 10 to 100 mPa·s). When coating by means of an ink jet coating equipment, the viscosity is suitably 5 to 50 mPa·s (more preferably 5 to 20 mPa·s). A viscosity of the liquid crystal aligning agent is measured by a rotation viscosity measuring method, and it is measured (measuring temperature: 25° C.) by means of, for example, a rotational viscometer (model TVE-20L, manufactured by Toki Sangyo Co., Ltd.).

<Liquid Crystal Alignment Layer>

The liquid crystal alignment layer of the present invention can be formed, as is the case with preparing conventional liquid crystal alignment layers, by coasting the liquid crystal aligning agent of the present invention on a substrate in the liquid crystal display device. The substrate described above includes a glass-made substrate on which an electrode such as ITO (indium tin oxide), IZO ($In_2O_3$—ZnO), IGZO (In—Ga—$ZnO_4$) electrodes and the like, a color filter and the like may be provided. Also, a spinner method, a printing method, a dipping method, a dropping method, an ink jet method and the like are usually known as a method for coating the liquid crystal aligning agent.

<Production Step for Liquid Crystal Alignment Layer>

A method for carrying out heating treatment in an oven or an infrared furnace, a method for carrying out heating treatment on a hot plate, and the like are usually known as the heating and drying step described above. The heating and drying step is carried out preferably at temperature falling in a range in which the solvent can be vaporized, and it is carried out more preferably at a relatively low temperature as compared with temperature in the heating and baking step. To be specific, the heating and drying temperature falls in a range of preferably 30 to 150° C., more preferably 50 to 120° C.

The heating and baking step described above can be carried out on a condition which is required for the polyamic acid or derivative thereof described above to be subjected to dehydrating cyclization. A method for carrying out heating treatment in an oven or an infrared furnace, a method for carrying out heating treatment on a hot plate, and the like are usually known as the method for baking the coating layer described above. The above methods can be applied as well in the present invention. In general, the heating and baking step is carried out preferably at a temperature of 100 to 300° C. for 1 minute to 3 hours, more preferably 120 to 280° C. and further preferably 150 to 250° C.

A method for forming the liquid crystal alignment layer of the present invention by a photo-aligning method shall specifically be explained. The liquid crystal alignment layer of the present invention can be formed by using the photo-aligning method, wherein the coating layer is dried by heating and then irradiated with a linearly polarized or non-polarized radial ray to thereby provide the coating layer with anisotropy, and the layer is heated and baked. Or, it can be formed by heating and drying the coating layer, heating and baking and then irradiating it with a linearly polarized or non-polarized radial ray. From the viewpoint of the aligning property, the step of irradiating with a radial ray is carried out preferably before the heating and baking step.

Further, in order to enhance a liquid crystal aligning ability of the liquid crystal alignment layer, the coating layer can be irradiated as well with a linearly polarized or non-polarized radial ray while heating it. Irradiation of the coating layer with a radial ray may be carried out in the step of heating and drying the coating layer or the step of heating and baking it, or it may be carried out between the heating and drying step and the heating and baking step. A heating and drying temperature in the above step falls in a range of preferably 30 to 150° C., more preferably 50 to 120° C. Also, a heating and baking temperature in the above step falls in a range of preferably 30 to 300° C., more preferably 50 to 250° C.

A UV ray or a visible light containing light having a wavelength of, for example, 150 to 800 nm can be used as the radial ray, and a UV ray containing light having a wavelength of 300 to 400 nm is preferred. Also, a linearly polarized or non-polarized ray can be used. The above rays shall not specifically be restricted as long as they can provide the coating layer with a liquid crystal aligning ability, and when a strong aligning regulation force is desired to be exerted on the liquid crystal, a linearly polarized ray is preferred.

The liquid crystal alignment layer of the present invention can show a high liquid crystal aligning ability even by irradiating with a ray having a low energy. A dose of the linearly polarized ray in the radial ray irradiation step described above is preferably 0.05 to 20 $J/cm^2$, more preferably 0.5 to 10 $J/cm^2$. Also, a wavelength of the linearly polarized ray is preferably 200 to 400 nm, more preferably 300 to 400 nm. An irradiation angle of the linearly polarized ray to the surface of the layer shall not specifically be restricted, and when the strong aligning regulation force is desired to be exerted on the liquid crystal, it is preferably as vertical to the surface of the layer as possible from the viewpoint of shortening the aligning treatment time. Also, in the liquid crystal alignment layer of the present invention, the liquid crystal can be aligned in a direction vertical to a polarizing direction of the linearly polarized ray by irradiating with the linearly polarized ray.

When a pre-tilt angle is desired to be exerted, a ray irradiated on the layer may be either a linearly polarized ray or a non-polarized ray as described above. A dose of the ray irradiated on the layer when a pre-tilt angle is desired to be exerted is preferably 0.05 to 20 $J/cm^2$, particularly preferably 0.5 to 10 $J/cm^2$, and a wavelength thereof is preferably 250 to 400 nm, particularly preferably 300 to 380 nm. An irradiation angle of the ray to the surface of the layer when a pre-tilt angle is desired to be exerted shall not specifically be restricted, and it is preferably 30 to 60 degrees from the viewpoint of shortening the aligning treatment time.

An ultrahigh pressure mercury lamp, a high pressure mercury lamp, a low pressure mercury lamp, a Deep UV lamp, a halogen lamp, a metal halide lamp, a high power metal halide lamp, a xenon lamp, a mercury xenon lamp, an excimer lamp, a KrF excimer laser, a fluorescent lamp, an LED lamp, a sodium lamp, a microwave-excited electrodeless lamp and the like can be used for a light source used in the step of irradiating with a linearly polarized or non-polarized radial ray without limitations.

The liquid crystal alignment layer of the present invention is suitably obtained by a method further including other steps than the steps described above. For example, a step of rinsing the layer with a cleaning solution after baking or irradiating with a radial ray is not essential in the liquid crystal alignment layer of the present invention, but the rinsing step can be provided due to convenience of the other steps.

The rinsing method with a cleaning solution includes brushing, jet spraying, steam cleaning, ultrasonic cleaning and the like. The above methods may be carried out alone or in combination. Capable of being used as the cleaning solution are purified water or various alcohols such as methyl alcohol, ethyl alcohol, isopropyl alcohol and the like, aromatic hydrocarbons such as benzene, xylene, toluene and the like, halogenated solvents such as methylene chloride and the like, ketones such as acetone, methyl ethyl ketone and the like, but it shall not be restricted to them. It is a matter of course that the solutions which are sufficiently refined and contain fewer impurities are used for the above cleaning solutions. The above rinsing method can be applied as well to the rinsing step described above in forming the liquid crystal alignment layer of the present invention.

In order to enhance a liquid crystal aligning ability of the liquid crystal alignment layer of the present invention, annealing treatment by heat or light can be used before and after the heating and baking step, the rubbing step or the step of irradiating with a polarized or non-polarized radial ray. In the above annealing treatment, an annealing temperature is 30 to 180° C., preferably 50 to 150° C., and an annealing time is preferably 1 minute to 2 hours. An annealing light used for the annealing treatment includes a UV lamp, a fluorescent lamp, an LED lamp and the like. A dose of the light is preferably 0.3 to 10 J/$cm^2$.

A layer thickness of the liquid crystal alignment layer of the present invention shall not specifically be restricted and is preferably 10 to 300 nm, more preferably 30 to 150 nm. A layer thickness of the liquid crystal alignment layer of the present invention can be measured by means of publicly known layer thickness measuring devices such as a step gauge, an ellipsometer and the like.

The liquid crystal alignment layer of the present invention is characterized by having a particularly large aligning anisotropy. A size of the above anisotropy can be evaluated by a method using polarized IR described in JP-A 2005-275364 and the like. Also, it can be evaluated as well by a method using an ellipsometry as shown in the following examples. When the alignment layer of the present invention is used as an alignment layer for a liquid crystal composition, it is considered that a material having a larger anisotropy of the layer has a larger aligning regulation force to the liquid crystal composition.

The liquid crystal alignment layer of the present invention can be used for controlling alignment of optical compensation materials and other all liquid crystal materials in addition to uses of aligning liquid crystal compositions for liquid crystal displays. Also, the liquid crystal alignment layer of the present invention has a large anisotropy and therefore can be used alone for uses in optical compensation materials.

<Liquid Crystal Display Device>

The liquid crystal display device of the present invention comprises a pair of substrates, a liquid crystal layer containing liquid crystal molecules and formed between a pair of the substrates described above, an electrode for applying a voltage to the liquid crystal layer and a liquid crystal alignment layer for aligning the liquid crystal molecules described above to a prescribed direction. The liquid crystal alignment layer of the present invention is used for the liquid crystal alignment layer described above.

The glass-made substrate described above in the liquid crystal alignment layer of the present invention can be used for the substrate, and as described in the liquid crystal alignment layer of the present invention, the ITO, IZO and IGZO electrodes formed on the glass-made substrate can be used for the electrode described above.

The liquid crystal layer is formed by the liquid crystal composition tightly sealed in a space between a pair of the substrates, wherein the substrates are provided oppositely so that a face on which the liquid crystal alignment layer is formed in one substrate of a pair of the substrates described above is faced to the other substrate.

The liquid crystal composition shall not specifically be restricted, and various liquid crystal compositions having a positive or negative dielectric anisotropy can be used. The preferred liquid crystal compositions having a positive dielectric anisotropy include liquid crystal compositions disclosed in Japanese Patent No. 3086228, Japanese Patent No. 2635435, JP-A (through PCT) 1993-501735, JP-A 1996-157826, JP-A 1996-231960, JP-A 1997-241644 (EP885272A1), JP-A 1997-302346 (EP806466A1), JP-A 1996-199168 (EP722998A1), JP-A 1997-235552, JP-A 1997-2555956, JP-A 1997-241643 (EP885271A1), JP-A 1998-204016 (EP844229A1), JP-A 1998-204436, JP-A 1998-231482, JP-A 2000-087040, JP-A 2001-48822 and the like.

The preferred liquid crystal compositions having a negative dielectric anisotropy include liquid crystal compositions disclosed in JP-A 1982-114532, JP-A 1990-4725, JP-A 1992-224885, JP-A 1996-40953, JP-A 1996-104869, JP-A 1998-168076, JP-A 1998-168453, JP-A 1998-236989, JP-A 1998-236990, JP-A 1998-236992, JP-A 1998-236993, JP-A 1998-236994, JP-A 1998-237000, JP-A 1998-237004, JP-A 1998-237024, JP-A 1998-237035, JP-A 1998-237075, JP-A 1998-237076, JP-A 1998-237448 (EP967261A1), JP-A 1998-287874, JP-A 1998-287875, JP-A 1998-291945, JP-A 1999-029581, JP-A 1999-080049, JP-A 2000-256307, JP-A 2001-019965, JP-A 2001-072626, JP-A 2001-192657 and the like It is no matter to add at least one optically active compound to the liquid crystal composition having a positive or negative dielectric anisotropy.

The liquid crystal display device of the present invention is obtained by forming the liquid crystal alignment layer of the present invention on at least one of a pair of the substrates, providing oppositely a pair of the substrates via spacers so that the liquid crystal alignment layer is turned to an inside and sealing the liquid crystal composition in a space formed between the substrates to form a liquid crystal layer. An additional step of sticking a polarizing layer on the substrate may be included, if necessary, in the production step of the liquid crystal aligning device of the present invention.

In the liquid crystal display device of the present invention, liquid crystal display devices for various electric field systems can be formed. The above liquid crystal display devices for electric field systems include liquid crystal display devices of a lateral electric field system in which a voltage is applied to the liquid crystal layer by the electrode in a horizontal direction toward the surface of the substrate and liquid crystal display devices of a vertical electric field system in which a voltage is applied to the liquid crystal layer by the electrode in a vertical direction toward the surface of the substrate.

The liquid crystal alignment layer prepared by using the liquid crystal aligning agent of the present invention as the raw material can be applied to liquid crystal display devices of various display drive systems by suitably selecting the polymers which are the raw material thereof.

The liquid crystal display device of the present invention may further comprise factors other than the constitutional factors described above. Constitutional factors usually used for liquid crystal display devices, such as a polarizing plate (polarizing film), a wavelength plate, a light diffusion layer, a driving circuit and the like may be mounted as the above other constitutional factors in the liquid crystal display device of the present invention.

EXAMPLES

The present invention shall be explained below with reference to examples. Evaluating methods and compounds used in the examples are shown below.

<Evaluating Method of Liquid Crystal Alignment Layer>

1. Transmittance:

A transmittance of the substrate on which a liquid crystal alignment layer described later was formed was measured to calculate an average value of absorbances in 380 to 780 nm. A UV and visible spectrophotometer V-660 (manufactured by JASCO Corporation) was used for a UV and visible spectrophotometer.

2. Volume Resistivity:

A volume resistivity of the substrate on which a liquid crystal alignment layer described later was formed was measured. ULTRA HIGH RESISTANCE METER P8340A (manufactured by ADVANTEST Corporation) was used for a measuring device.

<Tetracarboxylic Acid Dianhydride>

Acid dianhydride (A1): pyromellitic acid dianhydride: (AN-3-2)

Acid dianhydride (A2): 1,8-bis(3,4-phenyl dicarboxylate) octane dianhydride (AN-4-17 (m=8))

Acid dianhydride (A3): 1,2,3,4-cyclobutanetetracarboxylic acid dianhydride (AN-2-1)

Acid dianhydride (A4): azobenzene-3,3',4,4'-tetracarboxylic acid dianhydride (VII-3)

Acid dianhydride (A5): butanetetracarboxylic acid dianhydride (AN-1-1)

Acid dianhydride (AG6): 1,2,4,5-cyclohexanetetracarboxylic acid dianhydride: (AN-3-1)

Acid dianhydride (A7): 3,3',4,4'-biphenyltetracarboxylic acid dianhydride: (AN-c)

Acid dianhydride (A8): ethylenediaminetetraacetic acid dianhydride (AN-1-13)

Acid dianhydride (A9): 5,5'-p-phenylenebis(isobenzofuran-1,3-dione): (AN-16-14)

Acid dianhydride (A10): 3,3',4,4'-diphenylethertetracarboxylic acid dianhydride: (AN-4-21)

<Diamine>

Diamine (D1): 4,4'-diaminoazobenznene (VII-1-1)

Diamine (D2): 4,4'-diaminostilbene (VI-1-1)

Diamine (D3): 4,4'-diaminodiphenyl-1,4-butadiyne (II-1-1)

Diamine (D4): 4,4'-diaminodiphenylethane (DI-5-1 (m=2))

Diamine (D5): 4,4'-diaminodiphenylbutane (DI-5-1 (m=4))

Diamine (D6): 4,4'-diaminodiphenylhexane (DI-5-1 (m=6))

Diamine (D7): 4,4'-diaminodiphenyloctane (DI-5-1 (m=8))

Diamine (D8): 4,4'-diaminodiphenylmethane (DI-5-1 (m=1))

Diamine (D9): 2,2'-dimethyl-4,4'-diaminodiphenylmethane (DI-5-5)

Diamine (D10): 4,4'-N,N'-bis(4-aminophenyl)-N,N'-dimethylethylenediamine (DI-5-29 (k=2))

Diamine (D11): 4,4'-N,N'-bis(4-aminophenyl)piperazine (DI-9-1)

Diamine (D12): 1,4-cyclohexanediamine (DI-2-1)

Diamine (D13): 1,6-diaminohexane (DI-1-3)

Diamine (D14): 1,4-phenylenediamine (DI-4-1)

Diamine (D15): 1,8-diaminooctane (DI-1 (m=8))

Diamine (D16): 3-amino-5-(4-dodecylbenzyl)phenylamine (DI-13-2 ($R^{34}$=—$C_{12}H_{25}$))

Diamine (D17): 1,1-bis(4-((aminophenyl)methyl)phenyl)-4-butylcyclohexane (DI-16-2 ($R^{40}$=—$C_4H_9$))

Diamine (D18): 1,1-bis((aminophenoxy)phenyl)-4-(n-pentylcyclohexyl)cyclohexane (DI-16-4 ($R^{41}$=—$C_5H_{11}$))

Diamine (D19): 3,5-diamino-N-((dihydroxymethyl)methyl) benzamide: (DI-4-12)

Diamine (D20): 3,5-diamino-N-((trihydroxymethyl)methyl) benzamide: (DI-4-13)

Monoamine (M1): aniline

<Solvents>

N-methyl-2-pyrrolidone: NMP

Butyl cellosolve (ethylene glycol monobutyl ether): BC

<Additives>

Additive (Ad1): 3-aminopropyltriethoxysilane

Additive (Ad2): bis[4-(allylbicyclo[2.2.1]hept-5-ene-2,3-dicarboxylmide)phenyl]methane Additive (Ad3): 1,3-bis(4,5-dihydro-2-oxazolyl)benzene Additive (Ad4): 2-(3,4-epoxycyclohexyl)ethyltrimethoxysilane <1. Synthesis of Polyamic Acid>

Synthetic Example 1

A four neck flask of 100 mL equipped with a thermometer, a stirrer, a raw material-charging port and a nitrogen gas-introducing port was charged with 1.61 g of diamine (D1), 1.14 g of diamine (D5) and 50 g of dehydrated NMP, and the mixture was dissolved by stirring under dry nitrogen flow. Then, 3.85 g of acid dianhydride (A2) and 24 g of dehydrated NMP were added thereto, and the mixture was continued to be stirred at room temperature for 24 hours. BC 20 g was added to the above reaction solution to obtain a polyamic acid solution having a polymer solid concentration of 6% by weight. This polyamic acid solution is designated as PA1. The polyamic acid contained in PA1 had a viscosity of 10 mPa·s and a weight average molecular weight of 22,000.

The weight average molecular weight of the polyamic acid was determined by measuring a molecular weight by means of a 2695 separation module•2414 differential refractometer (manufactured by Waters Corporation) according to a GPC method and reducing it to polystyrene. The polyamic acid thus obtained was diluted by a phosphoric acid-DMF mixed solution (phosphoric acid/DMF=0.6/100: weight ratio) so that a concentration of the polyamic acid was about 2% by weight. HSPgel RT MB-M (manufactured by Waters Corporation) was used for the column, and the mixed solution described above was used for the developer to carry out the measurement on the conditions of a column temperature of 50° C. and a flow rate of 0.40 ml/minute. TSK standard polystyrene manufactured by Tosoh Corp. was used for standard polystyrene.

A viscosity of the polyamic acid solution was measured at 25° C. by means of a viscometer (TV-22, manufactured by Toki Sangyo Co., Ltd.).

Synthetic Examples 2 to 36

Polyamic acid solutions (PA2) to (PA36) having a polymer solid concentration of 6% by weight were prepared according to Synthetic Example 1, except that the tetracarboxylic acid dianhydride and the diamine were changed as shown in Tables 1 to 3. In Synthetic Examples 27, 29, 32 and 33 out of them, the polyamic acid solutions were prepared by adding Ad1 to Ad4 respectively as shown in Table 1. To be specific, in Synthetic Example 27, the additive Ad1 was added in a proportion of 10% by weight based on a weight of the polymer to the polyamic acid solution having a polymer solid concentration of 6% by weight which was prepared according to Synthetic Example 1 by using the tetracarboxylic acid dianhydride and the diamine each shown in Table 1; in Synthetic Example 29, the additive Ad2 was added thereto in a proportion of 20% by weight based on a weight of the polymer; in Synthetic Example 32, the additive Ad3 was added thereto in a proportion of 5% by weight based on a weight of the polymer; and in Synthetic Example 33, the additive Ad4 was added thereto in a proportion of 15% by weight based on a weight of the polymer. The measured results of a viscosity and a weight average molecular weight of the polyamic acids obtained including the results obtained in Synthetic Example 1 were summarized in Tables 1 to 3.

<2. Preparation of Substrate for Evaluating Transmittance>

Example 1

The polyamic acid solution (PA1) having a polymer solid concentration of 6% by weight which was prepared in

TABLE 1

| Synthetic Example | Polyamic acid solution | Tetracarboxylic acid dianhydride (mol %) | | | | | Diamine (M1 is monoamine) (mol %) | | | | | | | | | | | | | Viscosity (mPa · | Weight average molecular |
|---|---|---|---|---|---|---|---|---|---|---|---|---|---|---|---|---|---|---|---|---|---|
| No. | No. | A1 | A2 | A3 | A4 | A10 | D1 | D2 | D3 | D4 | D5 | D6 | D7 | D16 | D17 | D18 | D19 | D20 | M1 | s) | weight |
| 1 | PA1 | | 100 | | | | 50 | | | | 50 | | | | | | | | | 10 | 22,000 |
| 2 | PA2 | | 100 | | | | 50 | | | | 42 | | | | | | | | 16 | 11 | 23,000 |
| 3 | PA3 | | 100 | | | | | 50 | | | 50 | | | | | | | | | 12 | 31,000 |
| 4 | PA4 | | 100 | | | | | | 100 | | | | | | | | | | | 13 | 28,000 |
| 5 | PA5 | 100 | | | | | 50 | | | | 50 | | | | | | | | | 11 | 18,000 |
| 6 | PA6 | 50 | | 50 | | | | 50 | | | 50 | | | | | | | | | 12 | 16,000 |
| 7 | PA7 | 50 | | 50 | | | | | 100 | | | | | | | | | | | 12 | 30,000 |
| 8 | PA8 | | | | 100 | | | | | | 100 | | | | | | | | | 10 | 19,000 |
| 9 | PA9 | | 100 | | | | 50 | | | | | | 50 | | | | | | | 12 | 27,000 |
| 10 | PA10 | | 100 | | | | 50 | | | | | 50 | | | | | | | | 11 | 25,000 |
| 11 | PA11 | | 100 | | | | 50 | | | 50 | | | | | | | | | | 9 | 24,000 |
| 12 | PA12 | | 50 | | | 50 | 60 | | | | 35 | | | 5 | | | | | | 13 | 21,000 |
| 13 | PA13 | 30 | 70 | | | | 70 | | | 15 | | | | | 15 | | | | | 15 | 19,000 |
| 14 | PA14 | | 70 | | | 30 | 80 | | | | | | | | | 20 | | | | 11 | 9,500 |
| 15 | PA15 | | 100 | | | | 90 | | | | | | | | | | 10 | | | 10 | 8,900 |
| 16 | PA16 | 50 | | | | 50 | 80 | | | | | | | | | | | 20 | | 14 | 26,000 |
| 17 | PA17 | 50 | | | | 50 | 80 | | | | | | | | | 10 | | 10 | | 14 | 23,000 |

TABLE 2

| Synthetic Example | Polyamic acid solution | Tetracarboxylic acid dianhydride (mol %) | | | | | | Diamine (mol %) | | | | | | | | | Addi- | Viscosity (mPa · | Weight average molecular |
|---|---|---|---|---|---|---|---|---|---|---|---|---|---|---|---|---|---|---|---|
| No. | No. | A1 | A3 | A5 | A6 | A7 | A8 | D4 | D7 | D8 | D9 | D10 | D11 | D12 | D13 | D14 | tive | s) | weight |
| 18 | PA18 | 50 | 50 | | | | | | | 100 | | | | | | | | 50 | 95,000 |
| 19 | PA19 | 50 | | | | | 50 | | | 100 | | | | | | | | 52 | 110,000 |
| 20 | PA20 | 50 | | | | | 50 | 100 | | | | | | | | | | 50 | 100,000 |
| 21 | PA21 | | 95 | 5 | | | | | | 90 | 10 | | | | | | | 56 | 120,000 |
| 22 | PA22 | | 95 | 5 | | | | | 100 | | | | | | | | | 57 | 125,000 |
| 23 | PA23 | | 100 | | | | | 80 | | | | 20 | | | | | | 63 | 150,000 |
| 24 | PA24 | | 100 | | | | | | | 80 | | | 20 | | | | | 67 | 155,000 |
| 25 | PA25 | 100 | | | | | | | | | | | | | 100 | | | 45 | 59,000 |
| 26 | PA26 | | | | | 100 | | | | | | | | | 100 | | | 43 | 62,000 |
| 27 | PA27 | | 80 | | 20 | | | | | 100 | | | | | | | Ad1 | 53 | 97,000 |
| 28 | PA28 | | 80 | | 20 | | | | | 100 | | | | | | | | 53 | 109,000 |
| 29 | PA29 | 30 | 70 | | | | | | | 80 | | | 20 | | | | Ad2 | 51 | 95,000 |
| 30 | PA30 | | 100 | | | | | | | 50 | | | | 50 | | | | 60 | 98,000 |
| 31 | PA31 | | 100 | | | | | | | | | | | | | 100 | | 65 | 79,000 |
| 32 | PA32 | 50 | | | | | 50 | | | 50 | | | | | | 50 | Ad3 | 80 | 189,000 |
| 33 | PA33 | 30 | 30 | | | 40 | | | | | 50 | | | | | 50 | Ad4 | 71 | 167,000 |

TABLE 3

| Synthetic Example | Polyamic acid solution | Tetracarboxylic acid dianhydride (mol %) | | | Diamine (mol %) | | Viscosity | Weight average molecular |
|---|---|---|---|---|---|---|---|---|
| No. | No. | A1 | A3 | A9 | D1 | D15 | (mPa · s) | weight |
| 34 | PA34 | | 100 | | 100 | | 13 | 26,000 |
| 35 | PA35 | 100 | | | 100 | | 11 | 31,000 |
| 36 | PA36 | | | 100 | | 100 | 55 | 65,000 |

Synthetic Example 1 and the polyamic acid solution (PA8) having a polymer solid concentration of 6% by weight which was prepared in Synthetic Example 18 were mixed so that PA1: PA18 was 30:70 (weight ratio), and a mixed solvent of NMP/BC=4/1 (weight ratio) was added thereto to dilute the solution to a polymer solid concentration of 4% by weight, whereby a liquid crystal aligning agent was prepared. The liquid crystal aligning agent thus obtained was used to prepare a substrate for evaluating a transmittance in the following manner.

<Preparing Method of Substrate for Evaluating Transmittance>

The liquid crystal aligning agent was coated on a glass substrate by means of a spinner (spin coater (1H-DX2), manufactured by Mikasa Co., Ltd.). In the subsequent examples and comparative examples, a rotation speed of the spinner was controlled according to a viscosity of the liquid crystal aligning agent so that the alignment layers were controlled to the following thicknesses. After coated, the layer was dried by heating at 80° C. for 2 minutes on a hot plate (EC Hot Plate (EC-1200N), manufactured by AS ONE Corporation), and then it was irradiated with a linearly polarized UV ray via a polarizing plate from a direction vertical to the substrate by means of Multilight ML-501C/B, manufactured by USHIO INC. In the above case, the luminous energy was measured by means of a UV ray integration actinometer UIT-150 (optical receiver UVD-S365), and the exposure time was controlled so that the exposure energy was 5.0±0.1 J/cm$^2$ at a wavelength of 365 nm. The UV ray was radiated at room temperature in the air, wherein a whole part of the equipment was covered with a UV preventing film. Then, the layer was subjected to heat treatment at 230° C. for 15 minutes in a clean oven (Clean Oven (PVHC-231), manufactured by ESPEC Corp.) to form an alignment layer having a layer thickness of 100±10 nm.

<Evaluation of Transmittance>

A transmittance of the alignment layer was measured by means of a UV-Vis spectral measuring device (V-660, manufactured by JASCO Corporation). A glass substrate on which the alignment layer was not formed was used as a reference. The measurement was carried out every 1 nm in a range of a wavelength of 380 to 780 nm at a scanning speed of 400 nm/minute. An average value of the transmittances in the wavelength region described above was designated as a transmittance of the alignment layer. It is shown that the larger the above value is, the better the transmittance is.

Examples 2 to 36 and Comparative Examples 1 to 4

Substrates for evaluating a transmittance were prepared according to Example 1 to measure transmittances thereof, except that the polyamic acids as the polymer and the proportions thereof were changed as shown in Tables 4 and 5. The measured results thereof including the results obtained in Example 1 are shown in Tables 4 and 5.

TABLE 4

| | Polymer used for preparing liquid crystal aligning agent | | | | |
|---|---|---|---|---|---|
| | Polyamic acid having photoreactive structure | | Polyamic acid having no photoreactive structure | | Transmit- |
| Example No. | Name | Proportion (weight part) | Name | Proportion (weight part) | tance (%) |
| 1 | PA1 | 30 | PA18 | 70 | 94.6 |
| 2 | PA1 | 30 | PA19 | 70 | 93.4 |
| 3 | PA1 | 30 | PA20 | 70 | 93.5 |
| 4 | PA1 | 30 | PA21 | 70 | 95.5 |
| 5 | PA1 | 30 | PA22 | 70 | 95.7 |
| 6 | PA1 | 30 | PA23 | 70 | 95.3 |
| 7 | PA1 | 30 | PA24 | 70 | 95.2 |
| 8 | PA1 | 30 | PA25 | 70 | 94.7 |
| 9 | PA1 | 30 | PA26 | 70 | 94.2 |
| 10 | PA1 | 30 | PA27 | 70 | 95.4 |
| 11 | PA1 | 30 | PA28 | 70 | 95.4 |
| 12 | PA1 | 30 | PA29 | 70 | 94.9 |
| 13 | PA1 | 30 | PA30 | 70 | 96.9 |
| 14 | PA1 | 30 | PA31 | 70 | 94.6 |
| 15 | PA2 | 30 | PA21 | 70 | 95.3 |
| 16 | PA3 | 30 | PA21 | 70 | 95.6 |
| 17 | PA4 | 30 | PA28 | 70 | 92.4 |
| 18 | PA5 | 30 | PA28 | 70 | 93.1 |
| 19 | PA6 | 30 | PA18 | 70 | 93.3 |
| 20 | PA7 | 30 | PA18 | 70 | 90.5 |
| 21 | PA8 | 30 | PA18 | 70 | 94.5 |
| 22 | PA9 | 30 | PA19 | 70 | 94.1 |
| 23 | PA10 | 30 | PA20 | 70 | 93.8 |
| 24 | PA11 | 30 | PA20 | 70 | 93.3 |
| 25 | PA1 | 50 | PA28 | 50 | 94.2 |
| 26 | PA3 | 50 | PA22 | 50 | 93.7 |
| 27 | PA1 | 80 | PA28 | 20 | 91.1 |
| 28 | PA3 | 80 | PA22 | 20 | 91.0 |
| 29 | PA1 | 20 | PA28 | 80 | 97.0 |
| 30 | PA3 | 20 | PA22 | 80 | 96.4 |
| 31 | PA12 | 20 | PA30 | 80 | 96.8 |
| 32 | PA13 | 15 | PA31 | 85 | 97.0 |
| 33 | PA14 | 30 | PA32 | 70 | 94.0 |
| 34 | PA15 | 15 | PA31 | 85 | 96.9 |
| 35 | PA16 | 30 | PA33 | 70 | 94.1 |
| 36 | PA17 | 15 | PA33 | 85 | 96.7 |

TABLE 5

| | Polymer used for preparing liquid crystal aligning agent | | | | |
|---|---|---|---|---|---|
| Comparative | Polyamic acid having photoreactive structure | | Polyamic acid having no photoreactive structure | | Transmit- |
| Example No. | Name | Proportion (weight part) | Name | Proportion (weight part) | tance (%) |
| 1 | PA34 | 30 | PA36 | 70 | 89.5 |
| 2 | PA35 | 30 | PA36 | 70 | 85.6 |
| 3 | PA34 | 50 | PA36 | 50 | 87.8 |
| 4 | PA34 | 30 | — | — | 85.1 |

In comparing the layers having the same thickness, a content of an azobenzene structure in the liquid crystal alignment layer is large in Comparative Examples 1 to 4, and therefore the transmittances thereof are notably inferior. It can be found that the alignment layers of the present invention prepared in Examples 1 to 36 have a good transmittance and are less colored.

<3. Preparation of Substrate for Evaluating Volume Resistivity>

Example 37

The polyamic acid solution (PA1) having a polymer solid concentration of 6% by weight which was prepared in Synthetic Example 1 and the polyamic acid solution (PA18) having a polymer solid concentration of 6% by weight which was prepared in Synthetic Example 18 were mixed so that PA1: PA18 was 30:70 (weight ratio), and a mixed solvent of NMP/BC=4/1 (weight ratio) was added thereto to dilute the solution to a polymer solid concentration of 4% by weight, whereby a liquid crystal aligning agent was prepared. The liquid crystal aligning agent thus obtained was used to prepare a substrate for evaluating a volume resistivity in the following manner.

<Preparing Method of Substrate for Evaluating Volume Resistivity>

The liquid crystal aligning agent was coated on an ITO-deposited substrate by means of a spinner (spin coater (1H-DX2), manufactured by Mikasa Co., Ltd.). In the subsequent examples and comparative examples, a rotation speed of the spinner was controlled according to a viscosity of the liquid crystal aligning agent so that the alignment layers were controlled to the following thicknesses. After coated, the layer was dried by heating at 80° C. for 2 minutes on a hot plate (EC Hot Plate (EC-1200N), manufactured by AS ONE Corporation), and then it was irradiated with a linearly polarized UV ray via a polarizing plate from a direction vertical to the substrate by means of Multilight ML-501C/B, manufactured by USHIO INC. In the above case, the luminous energy was measured by means of a UV ray integration actinometer UIT-150 (optical receiver UVD-S365) manufactured by USHIO INC., and the exposure time was controlled so that the exposure energy was 5.0±0.1 $J/cm^2$ at a wavelength of 365 nm. The UV ray was radiated at room temperature in the air, wherein a whole part of the equipment was covered with a UV preventing film. Then, the layer was subjected to heat treatment at 230° C. for 15 minutes in a clean oven (Clean Oven (PVHC-231), manufactured by ESPEC Corp.) to form an alignment layer having a layer thickness of 300±10 nm. Then, aluminum was deposited on the ITO-deposited substrate on which the alignment layer was formed by means of a vacuum depositing equipment to form an upper electrode (electrode area: 0.2927 $cm^2$). In this connection, a mask was provided so that the electrode area was controlled to a fixed level. This caused the alignment layer to stay in a state in which it was interposed between ITO and aluminum, whereby a substrate for evaluating volume resistivity was prepared.

<Evaluation of Volume Resistivity>

ULTRA HIGH RESISTANCE METER P8340A (manufactured by ADVANTEST Corporation) was used to apply a voltage of 3 V on the substrate for evaluating volume resistivity prepared and calculate a volume resistivity from an electric current value after 5 minutes. In order to compare a volume resistivity observed when a stress of light in long term operation was given to the substrate with a volume resistivity observed when a stress of light was not given thereto, the volume resistivity was measured in two states of a DARK state in which the substrate was not irradiated with a light in measuring and a LIGHT state in which the substrate was irradiated with a light of 8,000 $cd/cm^2$ by means of LED in measuring. A change degree of the above two measured values is shown by DARK/LIGHT, and it is set as standard of whether or not a flicker is liable to be brought about. It is judged that the smaller the DARK/LIGHT is, the less liable to be brought about the flicker is and that the larger the DARK/LIGHT is, the more liable to be brought about the flicker is. The evaluation results thereof are shown in Table 6-1.

Examples 38 to 72

Substrates for evaluating a volume resistivity were prepared according to Example 37 to measure volume resistivities thereof, except that the polyamic acids as the polymer and the proportions thereof were changed as shown in Table 6-1. The measured results thereof including the result obtained in Example 37 are shown in Table 6-1.

TABLE 6-1

| | Polymer used for preparing liquid crystal aligning agent | | | | | | |
|---|---|---|---|---|---|---|---|
| | Polyamic acid having photoreactive structure | | Polyamic acid having no photoreactive structure | | Volume resistivity DARK | Volume resistivity LIGHT | |
| Example No. | Name | Proportion (wt part) | Name | Proportion (wt part) | state ($\Omega/cm^2$) | state ($\Omega/cm^2$) | DARK/LIGHT |
| 37 | PA1 | 30 | PA18 | 70 | 7.6E+16 | 5.1E+16 | 1.5 |
| 38 | PA1 | 30 | PA19 | 70 | 6.4E+15 | 4.7E+14 | 13.6 |
| 39 | PA1 | 30 | PA20 | 70 | 4.9E+15 | 3.1E+14 | 15.8 |
| 40 | PA1 | 30 | PA21 | 70 | 2.4E+17 | 1.4E+17 | 1.7 |
| 41 | PA1 | 30 | PA22 | 70 | 4.5E+17 | 3E+17 | 1.5 |
| 42 | PA1 | 30 | PA23 | 70 | 1.8E+17 | 9.5E+16 | 1.9 |
| 43 | PA1 | 30 | PA24 | 70 | 6.6E+17 | 4.5E+17 | 1.5 |
| 44 | PA1 | 30 | PA25 | 70 | 4.3E+16 | 2.3E+16 | 1.9 |
| 45 | PA1 | 30 | PA26 | 70 | 7.1E+16 | 4.8E+16 | 1.5 |
| 46 | PA1 | 30 | PA27 | 70 | 3.3E+17 | 8.5E+16 | 3.9 |
| 47 | PA1 | 30 | PA28 | 70 | 5.3E+17 | 2E+16 | 26.5 |
| 48 | PA1 | 30 | PA29 | 70 | 6E+16 | 8E+15 | 7.5 |
| 49 | PA1 | 30 | PA30 | 70 | 4.5E+16 | 4E+16 | 1.1 |
| 50 | PA1 | 30 | PA31 | 70 | 3.9E+15 | 1.6E+15 | 2.4 |
| 51 | PA2 | 30 | PA21 | 70 | 4.3E+17 | 1.5E+17 | 2.9 |
| 52 | PA3 | 30 | PA21 | 70 | 3.3E+17 | 1.1E+17 | 3.0 |
| 53 | PA4 | 30 | PA28 | 70 | 1.2E+17 | 7.9E+16 | 1.5 |

TABLE 6-1-continued

| Example No. | Polymer used for preparing liquid crystal aligning agent: Polyamic acid having photoreactive structure: Name | Proportion (wt part) | Polyamic acid having no photoreactive structure: Name | Proportion (wt part) | Volume resistivity DARK state (Ω/cm²) | Volume resistivity LIGHT state (Ω/cm²) | DARK/LIGHT |
|---|---|---|---|---|---|---|---|
| 54 | PA5 | 30 | PA28 | 70 | 5.1E+16 | 7.6E+15 | 6.7 |
| 55 | PA6 | 30 | PA18 | 70 | 8.5E+16 | 5.2E+16 | 1.6 |
| 56 | PA7 | 30 | PA18 | 70 | 4.7E+16 | 2.9E+16 | 1.6 |
| 57 | PA8 | 30 | PA18 | 70 | 7.3E+16 | 3.5E+16 | 2.1 |
| 58 | PA9 | 30 | PA19 | 70 | 6.6E+15 | 5.1E+14 | 12.9 |
| 59 | PA10 | 30 | PA20 | 70 | 5.4E+15 | 4.7E+14 | 11.5 |
| 60 | PA11 | 30 | PA20 | 70 | 4.9E+15 | 3.3E+14 | 14.8 |
| 61 | PA1 | 50 | PA28 | 50 | 8.3E+16 | 7.1E+15 | 11.7 |
| 62 | PA3 | 50 | PA22 | 50 | 9.6E+16 | 5.5E+15 | 17.5 |
| 63 | PA1 | 80 | PA28 | 20 | 2E+17 | 6E+15 | 33.3 |
| 64 | PA3 | 80 | PA22 | 20 | 1.2E+17 | 5.4E+15 | 22.2 |
| 65 | PA1 | 20 | PA28 | 80 | 9.8E+16 | 3.8E+16 | 2.6 |
| 66 | PA3 | 20 | PA22 | 80 | 2.3E+17 | 8.6E+16 | 2.7 |
| 67 | PA12 | 20 | PA30 | 80 | 8.5E+17 | 9.1E+16 | 9.3 |
| 68 | PA13 | 15 | PA31 | 85 | 8.3E+17 | 8E+16 | 10.4 |
| 69 | PA14 | 30 | PA32 | 70 | 2.9E+17 | 8.6E+16 | 3.4 |
| 70 | PA15 | 15 | PA31 | 85 | 2.3E+17 | 5.5E+16 | 4.2 |
| 71 | PA16 | 30 | PA33 | 70 | 9.9E+16 | 8.4E+16 | 1.2 |
| 72 | PA17 | 15 | PA33 | 85 | 1.8E+17 | 6.5E+16 | 2.8 |

Example 73

The polyamic acid solution (PA1) having a polymer solid concentration of 6% by weight which was prepared in Synthetic Example 1 and the polyamic acid solution (PA19) having a polymer solid concentration of 6% by weight which was prepared in Synthetic Example 19 were mixed so that PA1: PA19 was 30:70 (weight ratio), and a mixed solvent of NMP/BC (weight ratio) was added thereto to dilute the solution to a polymer solid concentration of 4% by weight, whereby a liquid crystal aligning agent was prepared. The liquid crystal aligning agent thus obtained was used to prepare a substrate for evaluating a volume resistivity in the following manner.

The liquid crystal aligning agent was coated on an ITO-deposited substrate by means of the spinner (spin coater (1H-DX2), manufactured by Mikasa Co., Ltd.). In the subsequent examples and comparative examples, a rotation speed of the spinner was controlled according to a viscosity of the liquid crystal aligning agent so that the alignment layers were controlled to the following thickness. After coated, the layer was dried by heating at 80° C. for 2 minutes on the hot plate (EC Hot Plate (EC-1200N), manufactured by AS ONE Corporation), and then it was irradiated with a linearly polarized UV ray via a polarizing plate from a direction vertical to the substrate by means of a UV lamp (UVL-1500M2-N1) manufactured by USHIO INC. In the above case, the luminous energy was measured by means of the UV ray integration actinometer UIT-150 (optical receiver UVD-S365) manufactured by USHIO INC., and the exposure time was controlled so that the exposure energy was 5.0±0.1 J/cm$^2$ at a wavelength of 365 nm. The UV ray was radiated at room temperature in the air, wherein a whole part of the equipment was covered with a UV preventing film. Then, the layer was subjected to heat treatment at 230° C. for 15 minutes in the clean oven (Clean Oven (PVHC-231), manufactured by ESPEC Corp.) to form an alignment layer having a layer thickness of 300±10 nm. Finally, the substrate after heated was annealed by heating at 120° C. for 30 minutes in the clean oven. Then, aluminum was deposited on the ITO-deposited substrate on which the alignment layer was formed by means of a vacuum depositing equipment to form an upper electrode (electrode area: 0.2927 cm$^2$). In this connection, a mask was provided so that the electrode area was controlled to a fixed level. This caused the alignment layer to stay in a state in which it was interposed between ITO and aluminum, whereby a substrate for evaluating a volume resistivity was prepared. The volume resistivity was evaluated according to Example 37.

Examples 74 to 78

Substrates for evaluating a volume resistivity were prepared according to Example 73 to evaluate volume resistivities thereof, except that the polyamic acids as the polymer and the proportions thereof were changed as shown in Table 6-2. The measured results thereof including the results obtained in Example 73 are shown in Table 6-2.

TABLE 6-2

| | Polymer used for preparing liquid crystal aligning agent | | | | | | |
|---|---|---|---|---|---|---|---|
| | Polyamic acid having photoreactive structure | | Polyamic acid having no photoreactive structure | | Volume resistivity DARK | Volume resistivity LIGHT | |
| Example No. | Name | Proportion (wt part) | Name | Proportion (wt part) | state ($\Omega/cm^2$) | state ($\Omega/cm^2$) | DARK/LIGHT |
| 78 | PA1 | 30 | PA19 | 70 | 6.8E+15 | 4.6E+14 | 14.8 |
| 74 | PA1 | 30 | PA27 | 70 | 3.3E+17 | 8.3E+16 | 4.0 |
| 75 | PA3 | 30 | PA21 | 70 | 3.5E+17 | 1.1E+17 | 3.2 |
| 76 | PA1 | 50 | PA28 | 50 | 8.2E+16 | 6.5E+15 | 12.6 |
| 77 | PA14 | 30 | PA32 | 70 | 2.6E+17 | 8.8E+16 | 3.0 |
| 78 | PA17 | 15 | PA33 | 85 | 1.6E+17 | 6.0E+16 | 2.7 |

Example 79

The polyamic acid solution (PA1) having a polymer solid concentration of 6% by weight which was prepared in Synthetic Example 1 and the polyamic acid solution (PA19) having a polymer solid concentration of 6% by weight which was prepared in Synthetic Example 19 were mixed so that PA1: PA19 was 30:70 (weight ratio), and a mixed solvent of NMP/BC (weight ratio) was added thereto to dilute the solution to a polymer solid concentration of 4% by weight, whereby a liquid crystal aligning agent was prepared. The liquid crystal aligning agent thus obtained was used to prepare a substrate for evaluating a volume resistivity in the following manner.

The liquid crystal aligning agent was coated on an ITO-deposited substrate by means of the spinner (spin coater (1H-DX2), manufactured by Mikasa Co., Ltd.). In the subsequent examples and comparative examples, a rotation speed of the spinner was controlled according to a viscosity of the liquid crystal aligning agent so that the alignment layers were controlled to the following thickness. After coated, the layer was dried by heating at 80° C. for 2 minutes on the hot plate (EC Hot Plate (EC-1200N), manufactured by AS ONE Corporation), and then it was irradiated with a linearly polarized UV ray via a polarizing plate from a direction vertical to the substrate by means of Multilight ML-501C/B, manufactured by USHIO INC. In the above case, the luminous energy was measured by means of the UV ray integration actinometer UIT-150 (optical receiver UVD-S365) manufactured by USHIO INC., and the exposure time was controlled so that the exposure energy was 5.0±0.1 J/cm$^2$ at a wavelength of 365 nm. The substrate was heated at a temperature of 50° C. while irradiated with a UV ray. The UV ray was radiated at room temperature in the air, wherein a whole part of the equipment was covered with a UV preventing film. Then, the layer was subjected to heat treatment at 230° C. for 15 minutes in the clean oven (Clean Oven (PVHC-231), manufactured by ESPEC Corp.) to form an alignment layer having a layer thickness of 300±10 nm. Then, aluminum was deposited on the ITO-deposited substrate on which the alignment layer was formed by means of a vacuum depositing equipment to form an upper electrode (electrode area: 0.2927 cm$^2$). In this connection, a mask was provided so that the electrode area was controlled to a fixed level. This caused the alignment layer to stay in a state in which it was interposed between ITO and aluminum, whereby a substrate for evaluating a volume resistivity was prepared. The volume resistivity was evaluated according to Example 37.

Examples 80 to 84

Substrates for evaluating a volume resistivity were prepared according to Example 79 to evaluate volume resistivities thereof, except that the polyamic acids as the polymer and the proportions thereof each shown in Table 6-3 were changed. The measured results thereof including the result obtained in Example 79 are shown in Table 6-3.

TABLE 6-3

| | Polymer used for preparing liquid crystal aligning agent | | | | | | |
|---|---|---|---|---|---|---|---|
| | Polyamic acid having photoreactive structure | | Polyamic acid having no photoreactive structure | | Volume resistivity DARK | Volume resistivity LIGHT | |
| Example No. | Name | Proportion (wt part) | Name | Proportion (wt part) | state ($\Omega/cm^2$) | state ($\Omega/cm^2$) | DARK/LIGHT |
| 79 | PA1 | 30 | PA19 | 70 | 6.2E+15 | 4.6E+14 | 13.5 |
| 80 | PA1 | 30 | PA27 | 70 | 3.0E+17 | 6.1E+16 | 4.9 |
| 81 | PA3 | 30 | PA21 | 70 | 3.3E+17 | 1.0E+17 | 3.3 |
| 82 | PA1 | 50 | PA28 | 50 | 7.3E+16 | 6.5E+15 | 11.2 |
| 83 | PA14 | 30 | PA32 | 70 | 2.4E+17 | 8.3E+16 | 2.9 |
| 84 | PA17 | 15 | PA33 | 85 | 1.6E+17 | 6.8E+16 | 2.4 |

Comparative Examples 5 to 8

Substrates for evaluating a volume resistivity were prepared according to Example 37 to evaluate volume resistivities thereof, except that the polyamic acids as the polymer and the proportions thereof were changed as shown in Table 7. The measured results thereof are shown in Table 7.

TABLE 7

| | Polymer used for preparing liquid crystal aligning agent | | | | | | |
|---|---|---|---|---|---|---|---|
| | Polyamic acid having photoreactive structure | | Polyamic acid having photoreactive structure | | Volume resistivity DARK | Volume resistivity LIGHT | |
| Comparative Example No. | Name | Proportion (wt part) | Name | Proportion (wt part) | state ($\Omega/cm^2$) | state ($\Omega/cm^2$) | DARK/ LIGHT |
| 5 | PA34 | 30 | PA36 | 70 | 3.7E+16 | 6.6E+14 | 56.1 |
| 6 | PA35 | 30 | PA36 | 70 | 8.9E+16 | 7.7E+14 | 115.6 |
| 7 | PA34 | 50 | PA36 | 50 | 9.2E+16 | 8.4E+14 | 109.5 |
| 8 | PA34 | 100 | — | — | 7.1E+17 | 5.2E+15 | 136.5 |

It has been found from the results obtained in Examples 37 to 84 and Comparative Examples 5 to 8 that use of the liquid crystal alignment layer of the present invention for the liquid crystal display device makes it possible to stand a photostress exerted in long term operation, that is, inhibit a flicker from being caused.

As shown above, when the alignment layer of the present invention is applied to an alignment layer for a liquid crystal display device, a high transmittance of the above alignment layer makes it possible to enhance a transmittance of the liquid crystal display device and inhibit a flicker from being caused, and therefore the liquid crystal display device is provided with sufficiently high characteristics which can stand practical use.

INDUSTRIAL APPLICABILITY

Use of the liquid crystal aligning agent of the present invention makes it possible to form a liquid crystal alignment layer capable of providing a liquid crystal display device which has a high transmittance and causes fewer flickers even after operated for a long time while maintaining various characteristics such as a voltage holding ratio and the like. Thus, the liquid crystal display device which comprises the above photo-alignment layer and which is excellent in display characteristics can be provided.

What is claimed is:

1. A photo-aligning liquid crystal aligning agent containing:

[A] polyamic acid or a derivative thereof having a photoreactive structure which is synthesized by reacting tetracarboxylic acid dianhydride and diamine, wherein the tetracarboxylic acid dianhydride and the diamine contain at least one tetracarboxylic acid dianhydride having a photoreactive structure and diamine having a photoreactive structure which are selected from the group of compounds represented by the following Formulas (I) to (VII), and at least one tetracarboxylic acid dianhydride having no photoreactive structure selected from the group of compounds represented by the following Formulas (AN-I) to (AN-VII), wherein a compound represented by the following Formula (AN-4-17) is required, and

[B] polyamic acid or a derivative thereof obtained by reacting tetracarboxylic acid dianhydride having no photoreactive structure and diamine having no photoreactive structure:

$$R^2—C{\equiv}C—R^3 \quad (I)$$

$$R^2—C{\equiv}C—C{\equiv}C—R^3 \quad (II)$$

$$R^2—C{\equiv}C—CH{=}CH—R^3 \quad (III)$$

$$R^2—C{\equiv}C—R^4—C{\equiv}C—R^3 \quad (IV)$$

$$R^2—C{\equiv}C—R^4—CH{=}CH—R^3 \quad (V)$$

$$R^2—CH{=}CH—R^3 \quad (VI)$$

$$R^2—N{=}N—R^3 \quad (VII)$$

in Formulas (I) to (VII), $R^2$ and $R^3$ each are independently a monovalent organic group having —$NH_2$ or a monovalent organic group having —CO—O—CO—, and $R^4$ is a divalent organic group having an aromatic ring, (AN-I)

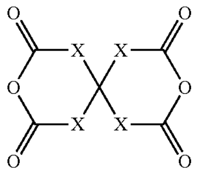

(AN-II)

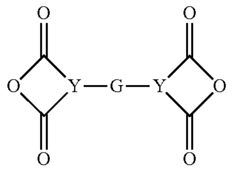

(AN-III)

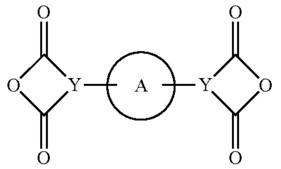

(AN-IV)

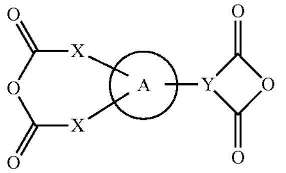

-continued (AN-V)

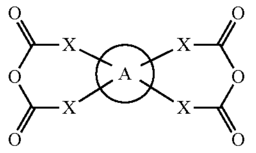

(AN-VI)

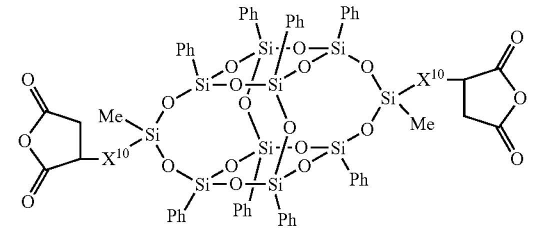

(AN-VII)

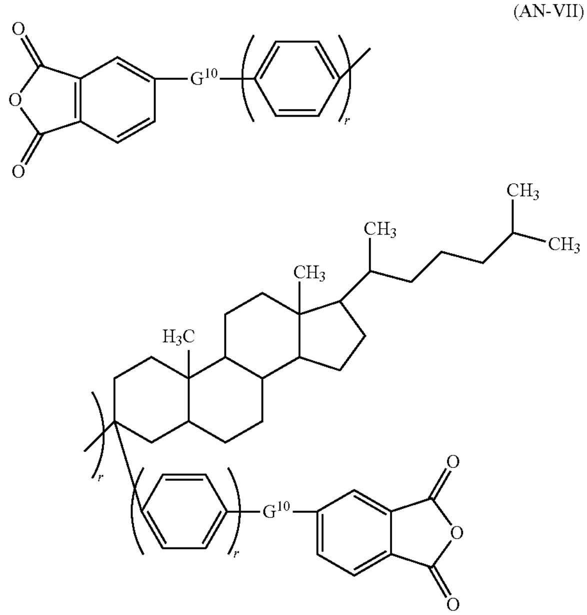

in Formulas (AN-I), (AN-IV) and (AN-V), plural X each are independently a single bond or $—CH_2—$;

in Formula (AN-II), G is a single bond, alkylene having 1 to 20 carbon atoms, —CO—, —O—, —S—, $—SO_2—$, $—C(CH_3)_2—$ or $—C(CF_3)_2—$; in Formulas (AN-II) to (AN-IV), plural Y each are independently one selected from the group of the following trivalent groups:

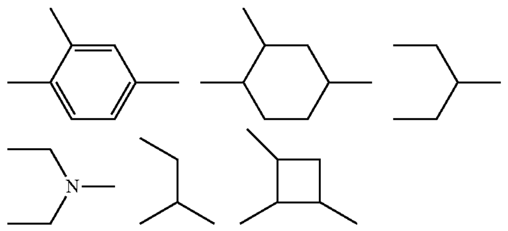

at least one hydrogen of the above groups may be substituted with methyl, ethyl or phenyl;

in Formulas (AN-III) to (AN-V), a ring A is a monocyclic hydrocarbon group having 3 to 10 carbon atoms or a condensed polycyclic hydrocarbon group having 6 to 30 carbon atoms; at least one hydrogen of the above group may be substituted with methyl, ethyl or phenyl; an atomic bonding coupled with the ring is connected with optional carbon constituting the ring, and two atomic bondings may be connected with the same carbon;

in Formula (AN-VI), $X^{10}$ is alkylene having 2 to 6 carbon atoms; Me represents methyl; and Ph represents phenyl;

in Formula (AN-VII), plural $G^{10}$ each are independently —O—, —COO— or —OCO—; and plural r each are independently 0 or 1;

(AN-4-17)

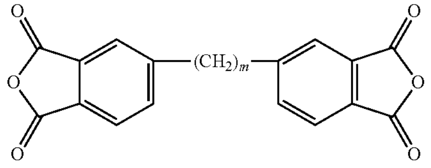

in Formula (AN-4-17), m is 8;

wherein in [B], the diamine having no photoreactive structure is at least one selected from the group of compounds represented by the following Formulas (DI-1) to (DI-12), wherein at least one compound represented by the following Formulas (DI-5-29) and (DI-9-1) is required, (DI-1)

$H_2N-(CH_2)_m-NH_2$ (DI-2)

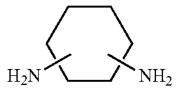

(DI-3)

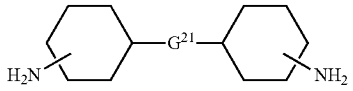

(DI-4)

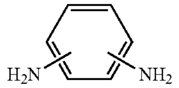

(DI-5)

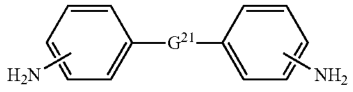

(DI-6)

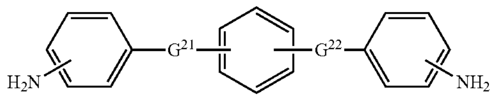

(DI-7)

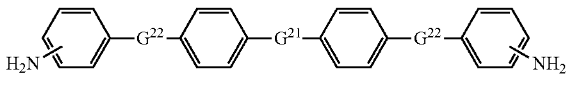

in Formula (DI-1), m is an integer of 1 to 12;

in Formulas (DI-3), (DI-5), (DI-6) and (DI-7), plural $G^{21}$ each are independently a single bond, 13 NH—, —O—, —S—, —S—S—, $—SO_2—$, CO—, —CONH—, —NHCO—, $—C(CH_3)_2—$, $—C(CF_3)_2—$, $—(CH_2)_{m'}—$, $—O—(CH_2)_{m'}—O—$, —$N(CH_3)$—$C(CH_2)_k$—$N(CH_3)$— or —S—$(CH_2)_{m'}$—S—; plural m' each are independently an integer of 1 to 12, and k is an integer of 1 to 5;

in Formulas (DI-6) and (DI-7), plural $G^{22}$ each are independently a single bond, —O—, —S—, CO—, —$C(CH_3)_2$—, —$C(CF_3)_2$— or alkylene having 1 to 10 carbon atoms;

at least one hydrogen of a cyclohexane ring and a benzene ring in Formulas (DI-2) to (DI-7) may be substituted with —F, —$CH_3$, —OH, —$CF_3$, —$CO_2H$—, —$CONH_2$ or benzyl, and in addition thereto, in Formula (DI-4), at least one hydrogen of the benzene ring may be substituted with at least one of group represented the following Formulas (DI-4-a) to (DI-4-c):

(DI-4-a)

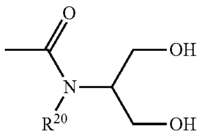

(DI-4-b)

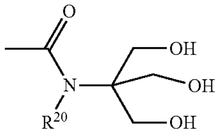

(DI-4-c)

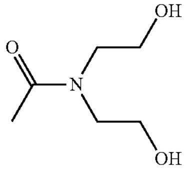

in Formulas (DI-4-a) and (DI-4-b), plural $R^{20}$ each are independently hydrogen or —$CH_3$;

in Formulas (DI-2) to (DI-7), groups in which bonding positions are not fixed to any of carbon atoms constituting the rings show that the bonding positions thereof in the rings are optional; and the bonding position of —$NH_2$ in the cyclohexane ring or the benzene ring is an optional position excluding the bonding position of $G^{21}$ or $G^{22}$;

(DI-8)

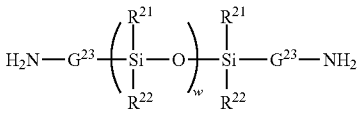

(DI-9)

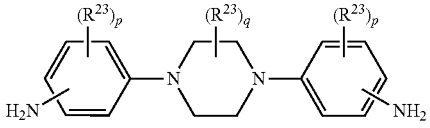

(DI-10)

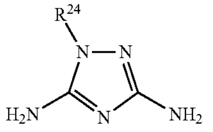

-continued (DI-11)

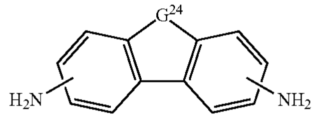

(DI-12)

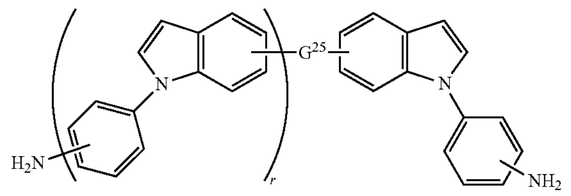

in Formula (DI-8), $R^{21}$ and $R^{22}$ each are independently alkyl having 1 to 3 carbon atoms or phenyl;

plural $G^{23}$ each are independently alkylene having 1 to 6 carbon atoms, phenylene or phenylene substituted with alkyl;

w is an integer of 1 to 10;

in Formula (DI-9), plural $R^{23}$ each are independently alkyl having 1 to 5 carbon atoms, alkoxy having 1 to 5 carbon atoms or Cl;

plural p each are independently an integer of 0 to 3, and q is an integer of 0 to 4;

in Formula (DI-10), $R^{24}$ is hydrogen, alkyl having 1 to 4 carbon atoms, phenyl or benzyl;

in Formula (DI-11), $G^{24}$ is —$CH_2$— or —NH—;

in Formula (DI-12), $G^{25}$ is a single bond, alkylene having 2 to 6 carbon atoms or 1,4-phenylene; and r is 0 or 1;

in Formula (DI-12), groups in which bonding positions are not fixed to any of carbon atoms constituting the rings show that the bonding positions thereof in the rings are optional;

in Formulas (DI-9), (DI-11) and (DI-12), the bonding positions of —$NH_2$ bonded to the benzene rings are optional positions;

(DI-5-29)

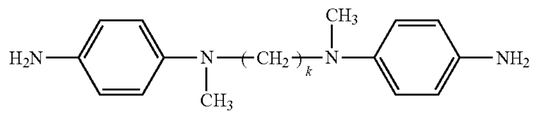

(DI-9-1)

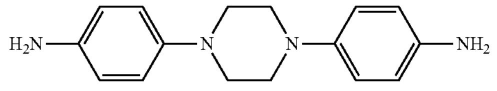

in Formula (DI-5-29), k is an integer of 1 to 5.

2. The photo-aligning liquid crystal aligning agent as described in claim 1, wherein in [A], the photoreactive structure is present in a principal chain of the polyamic acid or the derivative thereof.

3. The photo-aligning liquid crystal aligning agent as described in claim 1, wherein in [A], the tetracarboxylic acid dianhydride having a photoreactive structure and the diamine having a photoreactive structure are at least one selected from the group of compounds represented by the following Formulas (I-1), (II-1), (III-1), (IV-1), (IV-2), (V-1), (VI-1) and (VII-1) to (VII-3):

(I-1)

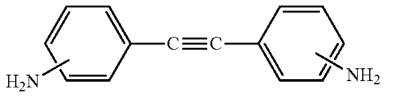

(II-1)

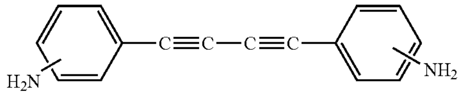

(III-1)

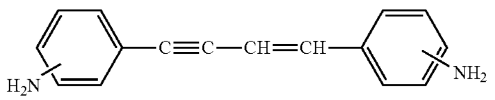

(IV-1)

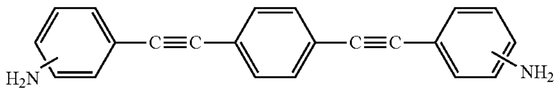

(IV-2)

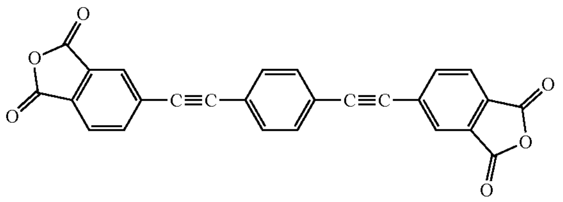

(V-1)

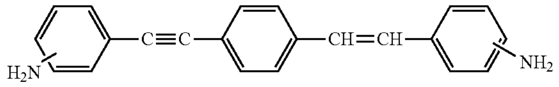

(VI-1)

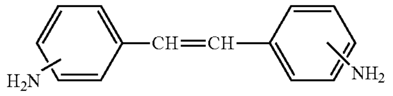

(VII-1)

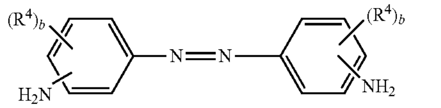

(VII-2)

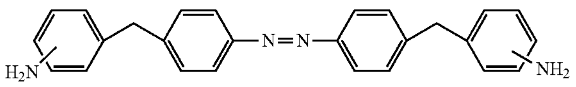

(VII-3)

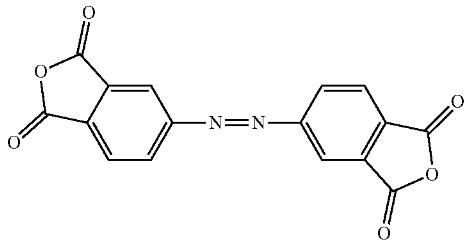

in Formulas (I-1), (II-1), (III-1), (IV-1), (V-1), (VI-1), (VII-1) and (VII-2), groups in which bonding positions are not fixed to any of carbon atoms constituting the rings show that the bonding positions thereof in the rings are optional;

in Formula (VII-1), plural $R^4$ each are independently $—CH_3$, $—OCH_3$, $—CF_3$ or $—COOCH_3$; and plural b each are independently an integer of 0 to 2.

4. The photo-aligning liquid crystal aligning agent as described in claim 3, wherein in [A], the tetracarboxylic acid dianhydride having a photoreactive structure and the diamine having a photoreactive structure are at least one selected from the group of compounds represented by the following Formulas (II-1-1), (VI-1-1), (VII- 1- 1) and (VII-3):

(II-1-1)

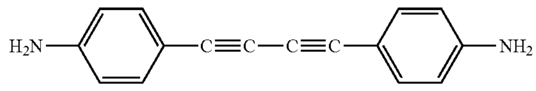

(VI-1-1)

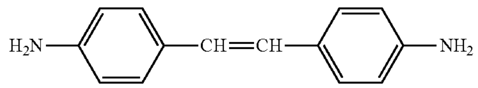

(VII-1-1)

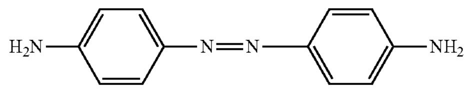

(VII-3)

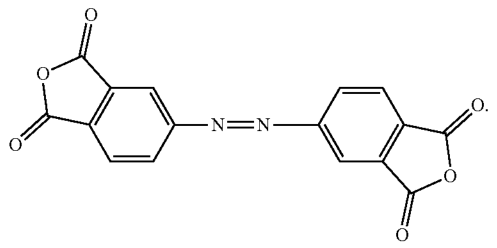

5. The photo-aligning liquid crystal aligning agent as described in claim 1, wherein in [B], the tetracarboxylic acid dianhydride having no photoreactive structure is at least one selected from the group of compounds represented by the following Formulas (AN-1) to (AN-VII):

(AN-I)

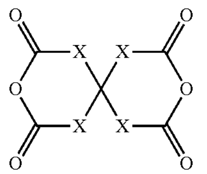

(AN-II)

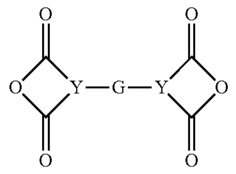

(AN-III)

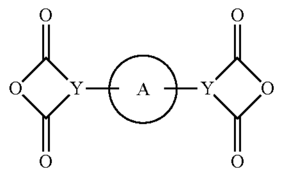

-continued (AN-IV)

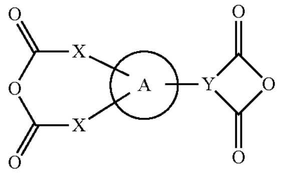

(AN-V)

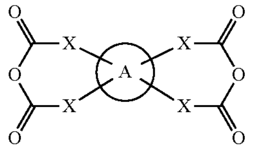

(AN-VI)

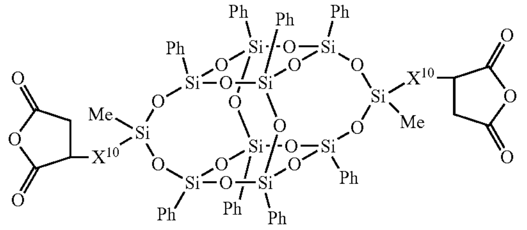

(AN-VII)

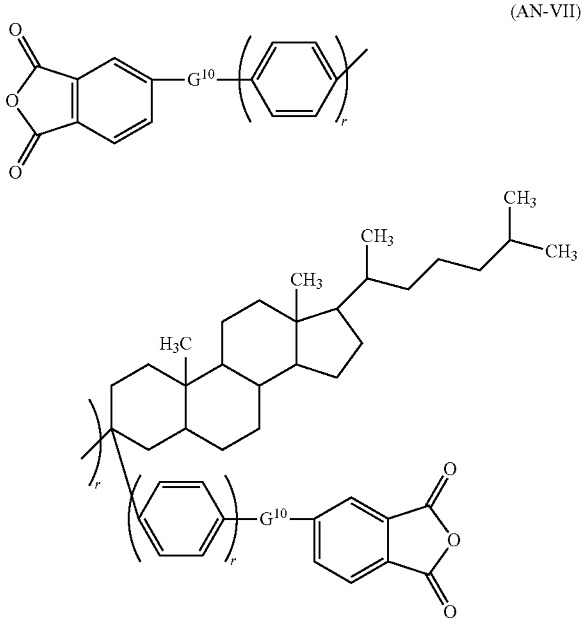

in Formulas (AN-I), (AN-IV) and (AN-V), plural X each are independently a single bond or $—CH_2—$;

in Formula (AN-II), G is a single bond, alkylene having 1 to 20 carbon atoms, —CO—, —O—, —S—, $—SO_2—$, $—C(CH_3)_2—$ or $—C(CF_3)_2—$; in Formulas (AN-II) to (AN-IV), plural Y each are independently one selected from the group of the following trivalent groups:

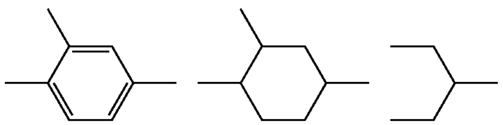

-continued

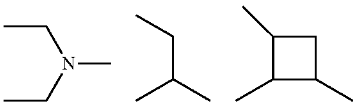

at least one hydrogen of the above groups may be substituted with methyl, ethyl or phenyl;

in Formulas (AN-III) to (AN-V), a ring A is a monocyclic hydrocarbon group having 3 to 10 carbon atoms or a condensed polycyclic hydrocarbon group having 6 to 30 carbon atoms; at least one hydrogen of the above group may be substituted with methyl, ethyl or phenyl; an atomic bonding coupled with the ring is connected with optional carbon constituting the ring, and two atomic bondings may be connected with the same carbon;

in Formula (AN-VI), $X^{10}$ is alkylene having 2 to 6 carbon atoms; Me represents methyl; and Ph represents phenyl;

in Formula (AN-VII), plural $G^{10}$ each are independently —O—, —COO— or —OCO—; and plural r each are independently 0 or 1.

6. The photo-aligning liquid crystal aligning agent as described in claim 5, wherein the tetracarboxylic acid dianhydride having no photoreactive structure is at least one selected from the group of compounds represented by the following Formulas (AN-2-1), (AN-3-2) and (AN-4-17):

(AN-2-1)

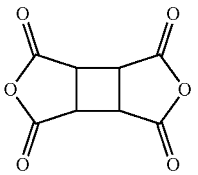

(AN-3-2)

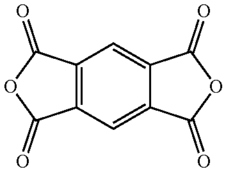

(AN-4-17)

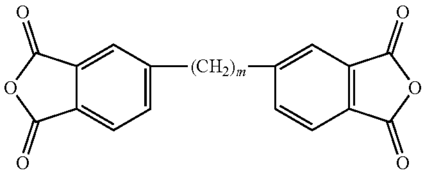

in Formula (AN-4-17), m is an integer of 1 to 12.

7. The photo-aligning liquid crystal aligning agent as described in claim 1, wherein in [A], a diamine having no photoreactive structure is at least one selected from the group of compounds represented by the following Formulas (DI-1) to (DI-17):

(DI-1)

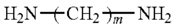

(DI-2)

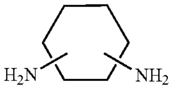

(DI-3)

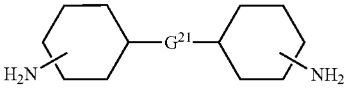

(DI-4)

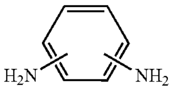

(DI-5)

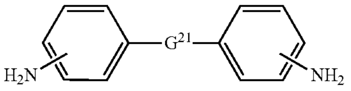

(DI-6)

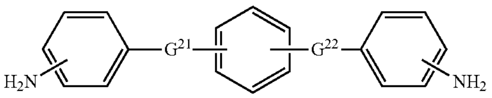

(DI-7)

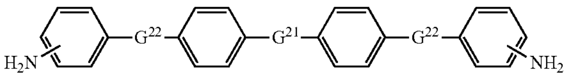

in Formula (DI-1), m is an integer of 1 to 12;

in Formulas (DI-3) and (DI-5) to (DI-7), plural $G^{21}$ each are independently a single bond, —NH—, —O—, —S—, —S—S—, —$SO_2$—, CO—, —CONH—, —NHCO—, —$C(CH_3)_2$—, —$C(CF_3)_2$—, —$(CH_2)_{m'}$—, —O—$(CH_2)_{m'}$—O—, —$N(CH_3)$—$C(CH_2)_k$—$N(CH_3)$— or —S—$(CH_2)_{m'}$—S—; plural m' each are independently an integer of 1 to 12, and k is an integer of 1 to 5;

in Formulas (DI-6) and (DI-7), plural $G^{22}$ each are independently a single bond, —O—, —S—, CO—, —$C(CH_3)_2$—, —$C(CF_3)_2$— or alkylene having 1 to 10 carbon atoms;

at least one hydrogen of a cyclohexane ring and a benzene ring in Formulas (DI-2) to (DI-7) may be substituted with —F, —$CH_3$, —OH, —$CF_3$, —$CO_2H$—, —$CONH_2$ or benzyl, and in addition thereto, in Formula (DI-4), at least one hydrogen of the benzene ring may be substituted with at least one of groups represented the following Formulas (DI-4-a) to (DI-4-c):

(DI-4-a)

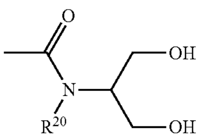

(DI-4-b)

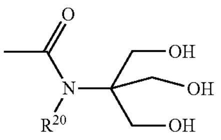

-continued (DI-4-c)

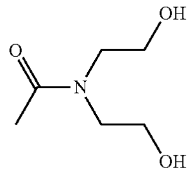

in Formulas (DI-4-a) and (DI-4-b), plural $R^{20}$ each are independently hydrogen or —$CH_3$;

in Formulas (DI-2) to (DI-7), groups in which bonding positions are not fixed to any of carbon atoms constituting the rings show that the bonding positions thereof in the rings are optional; and the bonding position of —$NH_2$ in the cyclohexane ring or the benzene ring is an optional position excluding the bonding position of $G^{21}$ or $G^{22}$;

(DI-8)

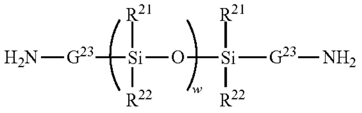

(DI-9)

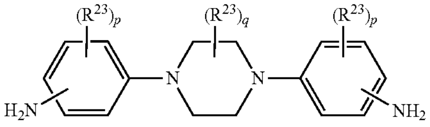

(DI-10)

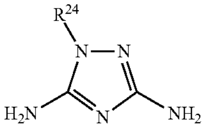

(DI-11)

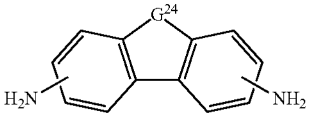

(DI-12)

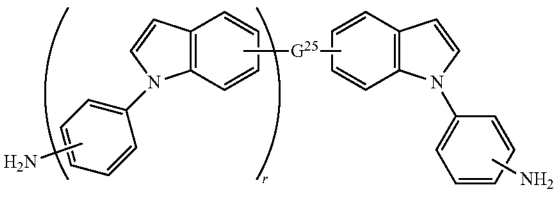

in Formula (DI-8), $R^{21}$ and $R^{22}$ each are independently alkyl having 1 to 3 carbon atoms or phenyl;

plural $G^{23}$ each are independently alkylene having 1 to 6 carbon atoms, phenylene or phenylene substituted with alkyl;

w is an integer of 1 to 10;

in Formula (DI-9), plural $R^{23}$ each are independently alkyl having 1 to 5 carbon atoms, alkoxy having 1 to 5 carbon atoms or Cl;

plural p each are independently an integer of 0 to 3, and q is an integer of 0 to 4;

in Formula (DI-10), $R^{24}$ is hydrogen, alkyl having 1 to 4 carbon atoms, phenyl or benzyl;

in Formula (DI-11), $G^{24}$ is —$CH_2$— or —NH—;

in Formula (DI-12), $G^{25}$ is a single bond, alkylene having 2 to 6 carbon atoms or 1,4-phenylene; and r is 0 or 1;

in Formula (DI-12), groups in which bonding positions are not fixed to any of carbon atoms constituting the rings show that the bonding positions thereof in the rings are optional;

in Formulas (DI-9), (DI-11) and (DI-12), the bonding positions of $—NH_2$ bonded to the benzene rings are optional positions:

(DI-13)

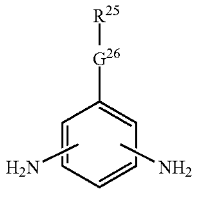

in Formula (DI-13), $G^{26}$ is a single bond, —O—, —COO—, —OCO—, —CO—, —CONH—, $—CH_2O—$, $—OCH_2—$, $—CF_2O—$, $—OCF_2—$ or $—O—(CH_2)_{m'}—$, and m' is an integer of 1 to 12;

$R^{25}$ is alkyl having 3 to 20 carbon atoms, phenyl, cyclohexyl, a group having a steroid skeleton or a group represented by the following Formula (DI-13-a); in the above alkyl, at least one hydrogen may be substituted with —F, and at least one $—CH_2—$ may be substituted with —O—; hydrogen of the above phenyl may be substituted with —F, $—CH_3$, $—OCH_3$, $—OCH_2F$, $—OCHF_2$, $—OCF_3$, alkyl having 3 to 20 carbon atoms or alkoxy having 3 to 20 carbon atoms; hydrogen of the above cyclohexyl may be substituted with alkyl having 3 to 20 carbon atoms or alkoxy having 3 to 20 carbon atoms; the bonding position of $—NH_2$ bonded to the benzene ring shows that it is an optional position in the above ring:

(DI-13-a)

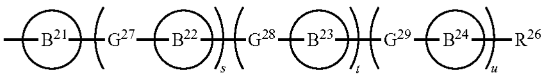

in Formula (DI-13-a), $G^{27}$, $G^{28}$ and $G^{29}$ represent a bonding group, and they each are independently a single bond or alkylene having 1 to 12 carbon atoms; at least one $—CH_2—$ in the above alkylene may be substituted with —O—, —COO—, —O—, —CONH— or —CH=CH—;

a ring $B^{21}$, a ring $B^{22}$, a ring $B^{23}$ and a ring $B^{24}$ each are independently 1,4-phenylene, 1,4-cyclohexylene, 1,3-dioxane-2,5-diyl, pyrimidine-2,5-diyl, pyridine-2,5-diyl, naphthalene-1,4-diyl, naphthalene-1,5-diyl, naphthalene-2,6-diyl, naphthalene-2,7-diyl or anthracene-9,10-diyl;

in the ring $B^{21}$, the ring $B^{22}$, the ring $B^{23}$ and the ring $B^{24}$, at least one hydrogen may be substituted with —F or $—CH_3$;

s, t and u each are independently an integer of 0 to 2, and a total thereof is 1 to 5;

when s, t or u is 2, two bonding groups in the respective parentheses may be the same or different, and two rings may be the same or different;

$R^{26}$ is —F, —OH, alkyl having 1 to 30 carbon atoms, fluorine-substituted alkyl having 1 to 30 carbon atoms, alkoxy having 1 to 30 carbon atoms, —CN, $—OCH_2F$, $—OCHF_2$ or $—OCF_3$, and at least one $—CH_2—$ in the above alkyl having 1 to 30 carbon atoms may be substituted with a divalent group represented by the following Formula (DI-13-b):

(DI-13-b)

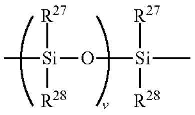

in Formula (DI-13-b), $R^{27}$ and $R^{28}$ each are independently alkyl having 1 to 3 carbon atoms; and v is an integer of 1 to 6;

(DI-14)

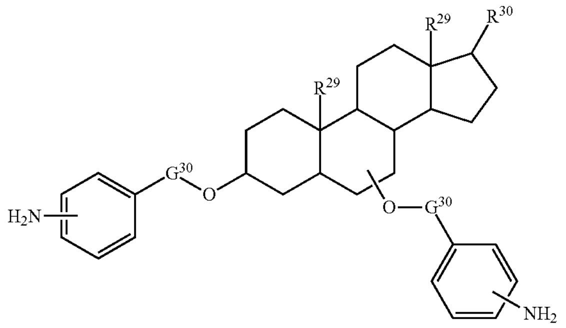

(DI-15)

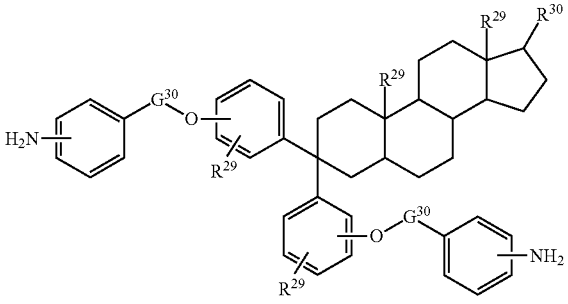

in Formulas (DI-14) and (DI-15), plural $G^{30}$ each are independently a single bond, —CO— or $—CH_2—$;

plural $R^{29}$ each are independently hydrogen or $—CH_3$;

$R^{30}$ is hydrogen, alkyl having 1 to 20 carbon atoms or alkenyl having 2 to 20 carbon atoms;

one hydrogen of a benzene ring in Formula (DI-15) may be substituted with alkyl having 1 to 20 carbon atoms or phenyl;

in Formulas (DI-14) and (DI-15), groups in which bonding positions are not fixed to any of carbon atoms constituting the rings show that the bonding positions thereof in the rings are optional;

$—NH_2$ bonded to the benzene ring shows that the bonding position thereof in the ring is optional:

(DI-16)

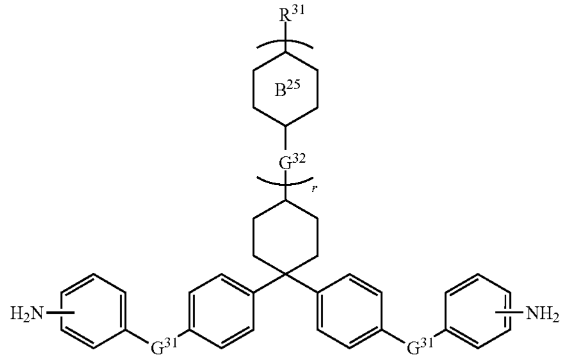

(DI-17)

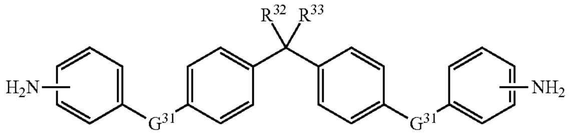

in Formulas (DI-16) and (DI-17), plural $G^{31}$ each are independently —O— or alkylene having 1 to 6 carbon atoms;

$G^{32}$ is a single bond or alkylene having 1 to 3 carbon atoms;

$R^{31}$ is hydrogen or alkyl having 1 to 20 carbon atoms, and at least one —$CH_2$— of the above alkyl may be substituted with —O—;

$R^{32}$ is alkyl having 6 to 22 carbon atoms;

$R^{33}$ is hydrogen or alkyl having 1 to 22 carbon atoms;

a ring $B^{25}$ is 1,4-phenylene or 1,4-cyclohexylene;

r is 0 or 1; and

—$NH_2$ bonded to the benzene ring shows that the bonding position thereof in the ring is optional.

8. The photo-aligning liquid crystal aligning agent as described in claim 7, wherein the diamine having no photoreactive structure is at least one of compounds represented by the following Formula (DI-5-1):

(DI-5-1)

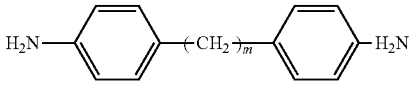

in Formula (DI-5-1), m is an integer of 1 to 12.

9. The photo-aligning liquid crystal aligning agent as described in claim 1, wherein in [B], the tetracarboxylic acid dianhydride having no photoreactive structure is at least one selected from the group of compounds represented by the following Formulas (AN-1-1), (AN-1-13), (AN-2-1), (AN-3-1), (AN-3-2), (AN-4-5), (AN-4-21), (AN-5-1) and (AN-16-1), and the diamine having no photoreactive structure is at least one selected from the group of compounds represented by the Formulas (DI-5-29) and (DI-9-1), and at least one compound selected from the group of compounds represented by the following Formulas (DI-1-3), (DI-2-1), (DI-4-1), (DI-5-1), (DI-5-5), (DI-5-9), (DI-5-12), (DI-5-27) to (DI-5-30), (DI-7-3), (DI-8-1) and (DI-9-1):

(AN-1-1)

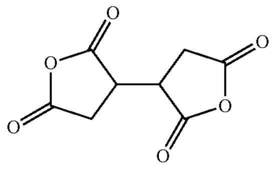

(AN-1-13)

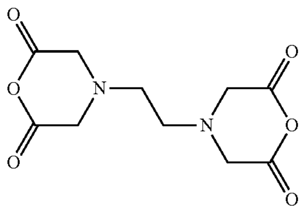

(AN-2-1)

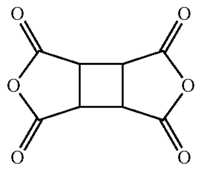

(AN-3-1)

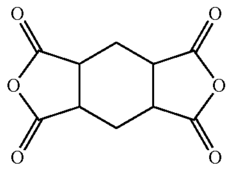

(AN-3-2)

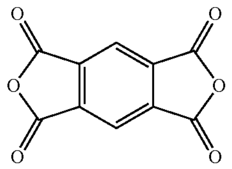

(AN-4-5)

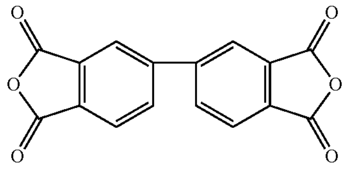

(AN-4-21)

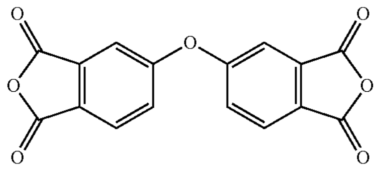

(AN-5-1)

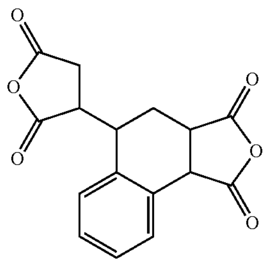

-continued (AN-16-1)

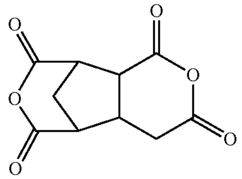

(DI-1-3)

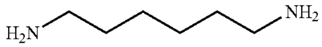

(DI-2-1)

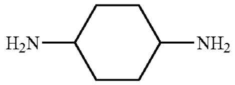

(DI-4-1)

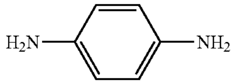

(DI-5-1)

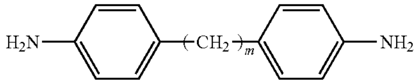

(DI-5-5)

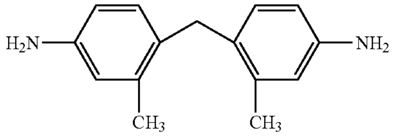

(DI-5-9)

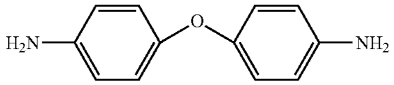

(DI-5-12)

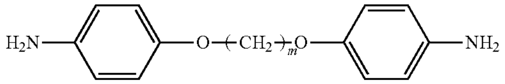

(DI-5-27)

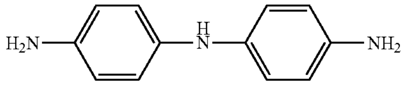

(DI-5-28)

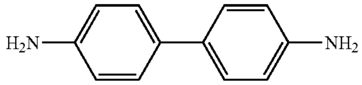

(DI-5-29)

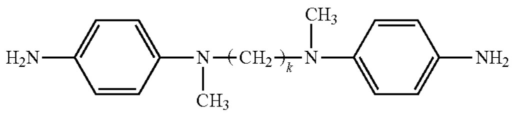

(DI-5-30)

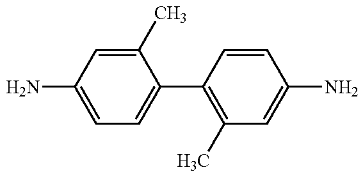

(DI-7-3)

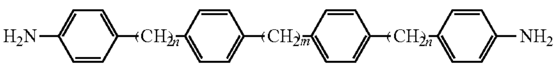

-continued (DI-8-1)

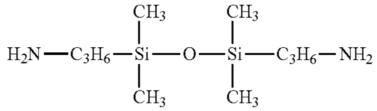

(DI-9-1)

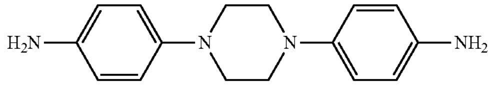

in Formulas (DI-5-1), (DI-5-12) and (DI-7-3), m is an integer of 1 to 12;

in Formula (DI-5-29), k is an integer of 1 to 5; and in Formula (DI-7-3), n is 1 or 2.

10. The photo-aligning liquid crystal aligning agent as described in claim 9, wherein in [B], the tetracarboxylic acid dianhydride having no photoreactive structure is at least one selected from the group of the compounds represented by the following Formulas (AN-1-1), (AN-1-13), (AN-2-1), (AN-3-1), (AN-3-2) and (AN-4-5), and the diamine having no photoreactive structure is at least one selected from the group of the compounds represented by the Formulas (DI-5-29) and (DI-9-1), and optionally at least one compound selected from the group of compounds represented by the following formulas (DI-1-3), (DI-2-1), (DI-4-1), (DI-5-1), and (DI 5-5):

(AN-1-1)

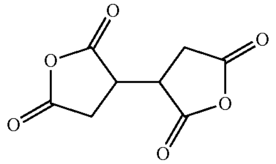

(AN-1-13)

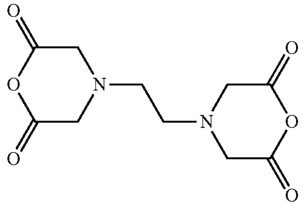

(AN-2-1)

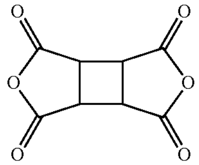

(AN-3-1)

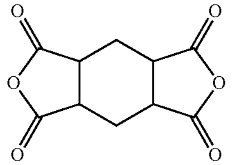

(AN-3-2)

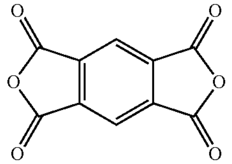

-continued (AN-4-5)

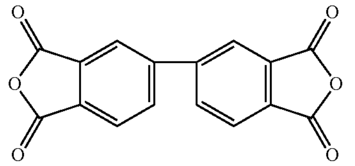

(DI-1-3)

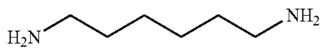

(DI-2-1)

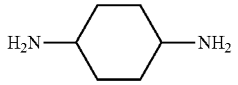

(DI-4-1)

(DI-5-1)

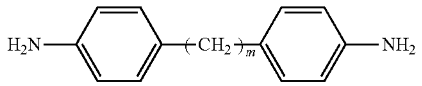

(DI-5-5)

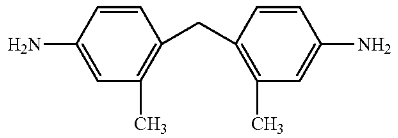

in Formula (DI-5-1), m is an integer of 1 to 12.

11. The photo-aligning liquid crystal aligning agent as described in claim 1, further comprising at least one selected from the group of compounds consisting of alkenyl-substituted nadiimide compounds, compounds having a radically polymerizable unsaturated double bond, oxazine compounds, oxazoline compounds, epoxy compounds and silane coupling agents.

12. The photo-aligning liquid crystal aligning agent as described in claim 11, wherein the alkenyl-substituted nadiimide compound is at least one selected from the group of compounds consisting of bis{4-(allylbicyclo[2.2.1]hept-5-ene-2,3-dicarboxyimide)phenyl }methane, N,N'-m-xylylene-bis(allylbicyclo[2.2.1]hept-5-ene-2,3-dicarboxyimide) and N,N'-hexamethylene-bis(allylbicyclo[2.2.1]hept-5-ene-2,3-dicarboxyimide).

13. The photo-aligning liquid crystal aligning agent as described in claim 11, wherein the compounds having a radically polymerizable unsaturated double bond is at least one selected from the group of compounds consisting of N,N'-ethylenebisacrylamide, N,N'-(1,2-dihydroxyethylene) bisacrylamide, ethylenebisacrylate and 4,4'-methylenebis (N,N-dihydroxyethyleneacrylateaniline).

14. The photo-aligning liquid crystal aligning agent as described in claim 11, wherein the epoxy compound is at least one selected from the group of compounds consisting of N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, 2-[4-(2,3-epoxypropoxy)phenyl]-2-[4-[1,1-bis[4-([2,3-epoxypropoxy] phenyl)]ethyl]phenyl]propane, 3,4-epoxycyclohexenylmethyl-3',4'-epoxycyclohexenecarboxylate, N-phneylmaleimide-glycidyl methacrylate copolymers, 2-(3,4-epoxycyclohexyl) ethyltrimethoxysilane, paraaminophenyltrimethoxysilane and 3-aminopropyltriethoxysilane.

15. The photo-aligning liquid crystal aligning agent as described in claim 11, wherein the silane coupling agent is at least one selected from the group of compounds consisting of 2-(3,4-epoxycyclohexyl)ethyltrimethoxysilane, paraaminophenyltrimethoxysilane and 3-aminopropyltriethoxysilane.

16. A photo-aligning liquid crystal alignment layer formed by the photo-aligning liquid crystal aligning agent as described in claim 1.

17. A liquid crystal display device comprising the photo-aligning liquid crystal alignment layer as described in claim 16.

18. A photo-aligning liquid crystal alignment layer formed by passing through a step of coating the photo-aligning liquid crystal aligning agent as described in claim 1 on a substrate, a step of heating and drying the substrate coated with the aligning agent and a step of irradiating the layer with a polarized UV ray.

19. A photo-aligning liquid crystal alignment layer formed by passing through a step of coating the photo-aligning liquid crystal aligning agent as described in claim 1 on a substrate, a step of heating and drying the substrate coated with the aligning agent, a step of irradiating the dried layer with a polarized UV ray and then a step of heating and baking the layer.

20. A photo-aligning liquid crystal alignment layer formed by passing through a step of coating the photo-aligning liquid crystal aligning agent as described in claim 1 on a substrate, a step of heating and drying the substrate coated with the aligning agent, a step of heating and baking the dried layer and then a step of irradiating the layer with a polarized UV ray.

* * * * *